United States Patent Office 3,154,523
Patented Oct. 27, 1964

3,154,523
POLYMERIZABLE TRIAZINES AND PRODUCTS THEREOF
Gaetano F. D'Alelio, South Bend, Ind., assignor, by direct and mesne assignments, to Dal Mon Research Co., Cleveland, Ohio, a corporation of Delaware
No Drawing. Filed Oct. 11, 1960, Ser. No. 61,809
18 Claims. (Cl. 260—78)

This invention relates to new monomers and to new polymeric materials derived therefrom and is particularly directed to the polymerization products obtained by polymerizing a mass comprising a triazinyl compound, as defined hereinafter, in the presence or absence of other ethylenic compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for sometime that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In facts, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C., or upon spinning from hot solutions. Such crosslinking causes spoliation of material by gelation during storage, embrittlement of fibers, fouling of spinning jets, and other production difficulties.

Recent attempts have been made to improve the dyeability of acrylonitrile polymers by using various polymerizable amine and amide compounds as copolymerizing monomers. However, it has been found that these comonomers cause undesirable salt formation and the products have a tendency to discolor upon exposure to light.

In accordance with the present invention, new triazinyl compounds, as defined hereinafter, have been found. It has been found further that these triazinyl compounds are polymerizable, either by themselves or in conjunction with other copolymerizable ethylenic compounds. Thus it has been found that these triazinyl compounds can be polymerized per se to form useful homopolymers. In addition it has been found that these triazinyl compounds can be polymerized with copolymerizable ethylenic compounds to form useful copolymers. Thus, in accordance with this invention, valuable polymerization products can be prepared by polymerizing a mass comprising one or more such triazinyl compounds, either in the presence or absence of other ethylenic copolymerizable compounds or their polymers. It has been found further that particularly valuable polymerization products having improved dyeing properties and improved resistance to salt formation and to discoloration in light are obtained by the polymerization of polymerizable masses comprising acrylonitrile and these triazinyl compounds, either in the presence or absence of other copolymerizable ethylenic compounds. It has been found further that valuable mixtures can be made comprising polymers of these triazinyl compounds and polymers of acrylonitrile. As used herein, the terms "polymers" and "polymerization products," unless specifically indicated otherwise, are intended to include copolymers and copolymerization products respectively.

The triazinyl compounds of this invention, hereinafter referred to as "triazine monomers," are represented by the following general formula:

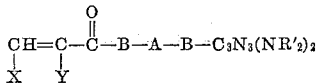

wherein B is oxygen or —N(R'')—; A is a divalent hydrocarbon radical having at least two carbon atoms between said valencies; and when that B to which the

group is attached is oxygen that part of A to which B is attached is aliphatic; R is hydrogen or a monovalent hydrocarbon radical; R' is hydrogen or a monovalent hydrocarbon radical, or two R's are a divalent hydrocarbon or hetero group with both valencies attached to the N; R'' is hydrogen, a monovalent hydrocarbon radical or a divalent hydrocarbon with the other valency connected to A or to the second B group when the latter also represents —N(R)— so as to form a heterocyclic group; X is hydrogen, cyano, —C(O)OR, —C(O)NR'$_2$, or —C(O)—B—A—B—C$_3$N$_3$(NR'$_2$)$_2$; Y is hydrogen, an alkyl group of no more than 6 carbon atoms, or when X is hydrogen, can also be chloro, fluoro, bromo, iodo, —CH$_2$C(O)OR, —CH$_2$C(O)NR'$_2$, or

—CH$_2$C(O)—B—A—B—C$_3$N$_3$(NR'$_2$)$_2$

C$_3$N$_3$ represents the symmetrical triazine (1,3,5-triazine) nucleus; and the hydrocarbon groups of A, R, R', and R'' can have chloro, fluoro, alkoxy, aryloxy, and acyloxy substituents thereon.

The polymeric products of this invention have repeating units in the polymer molecules of the formula:

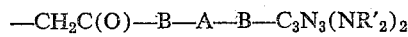

wherein X, Y, B, A, R, and R' are as defined above.

The alkoxy, aryloxy and acyloxy groups for A, R, R' and R'' are advantageously radicals of no more than about ten carbon atoms such as methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, etc. Other groups can be substituted on A, R, R' and R'' provided they are inert during the preparation and use of the triazine monomers. Moreover, A can have unsaturation therein of relatively inactive type such as —CH$_2$—CH=CH—CH$_2$—;

Typical examples of A include the following radicals:

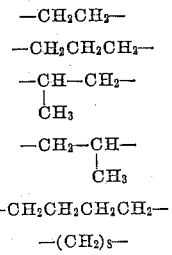

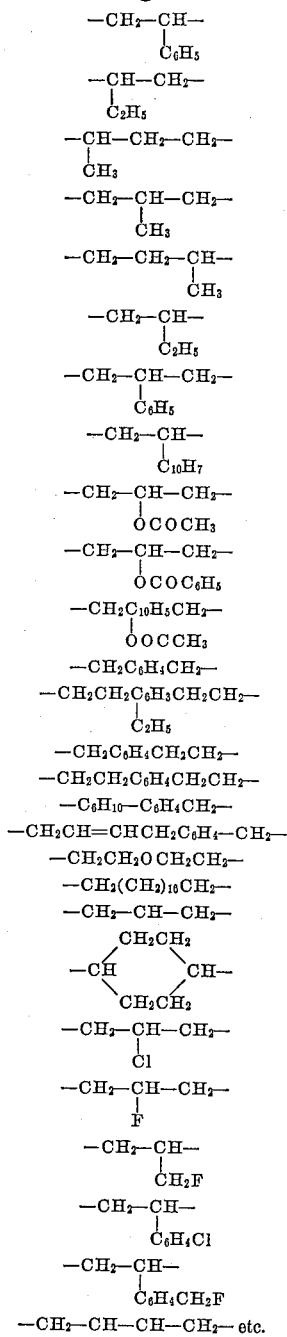

When that B to which the

group is attached is oxygen, that part of A to which that B is attached is preferably aliphatic. When that B is —N(R)—, both aliphatic and aromatic portions in A are suitable for connection to N. Accordingly A also includes as typical groups: —C₆H₄—; —C₁₀H₆—; —C₆H₄—C₆H₄—; —CH₂C₆H₄—; —CH₂CH₂C₆H₄—; —CH₂—C₁₀H₅—; etc.

The radical R can be various groups of the type indicated above including methyl, ethyl, propyl, isopropyl, n-butyl, sec-butyl, amyl, hexyl, decyl, chloromethyl, chloroethyl, fluoropropyl, cyclohexyl, methylcyclopentyl, propyl-cyclopentyl, amyl-cyclopentyl, methyl cyclohexyl, dimethyl-cyclohexyl, chloro-cyclohexyl, phenyl, chlorophenyl fluorophenyl, xenyl, naphthyl, tolyl, chloro-tolyl, fluoro-tolyl, xylyl, ethyl-phenyl, propyl-phenyl, isopropyl-phenyl, benzyl, chloro-benzyl, phenethyl, phenyl-propyl, phenyl-butyl, acetoxy-ethyl, acetoxy-phenyl, acetoxy-benzyl, acetoxy-tolyl, acetoxy-cyclohexyl, chlorophenoxy-ethyl, acetoxy-propyl, acetoxy-isopropyl, methoxy-propyl, ethoxy-propyl, methoxy-phenyl, methoxy-benzyl, methoxy-tolyl, methoxy-cyclohexyl, etc.

Typical R' groups include the hydrocarbon groups listed above for R, and two R' groups can be a divalent aliphatic or hetero-group linked to form with the nitrogen a heterocyclic group such as the piperidyl, piperazinyl or morpholino group.

Typical R'' groups include the monovalent groups listed above for R' and also the R'' groups attached to a nitrogen connected to A can be connected to form with A, or when a second nitrogen is connected to A, with the other nitrogen and A, a heterocyclic group such as a piperazinyl or piperidyl group.

While other hydrocarbon and substituted hydrocarbon groups are also effective as R, R' and R'' groups, the groups indicated above are preferred for reasons of availability and economy. Although many of the illustrations herein for NR'₂ groups show similar R' groups such as in dimethylamino, etc., it is intended that mixed groups are also covered hereby, that is methyl-ethylamino, etc., and that one NR'₂ can be dimethylamino, etc., and where there is another NR'₂ group in the same compound, it can be different, such as diethylamino, etc.

It has been found that A, R, R' and R'' groups of the sizes indicated above give the most effective results. While larger groups are also effective, triazine monomers containing such larger groups act more sluggishly and generally best results are obtained when such groups each have less than twelve carbon atoms.

Triazinyl amines from which the triazinyl portion of the above formula can be derived are those symmetrical triazines (1,3,5-triazine) whose nucleus is

and to which an amidifiable aminoalkyl hydrocarbon group or esterifiable hydrocarbon group is attached through an amino or ether linkage. This triazine nucleous is sometimes represented herein as C₃N₃. Triazinyl compounds which can be used in preparing the compositions of this invention have the structure

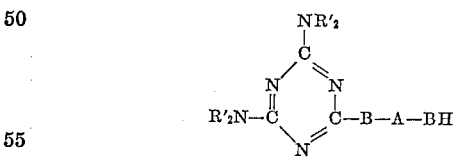

where R, R', B and A are as previously defined. Methods for preparing such intermediate compounds are known in the art. The monomers are prepared by forming the acrylic, alpha-methacrylic, beta-cyanoacrylic alpha-ethacrylic, itaconic, maleic, fumaric, mesaconic, citraconic, etc., ester and amide derivatives of the above intermediates to give products of the above general formula.

The monomers used in the practice of the invention can be formed by reacting the triazine compounds containing either an esterifiable hydroxyl group or an amino group containing an active hydrogen with a polymerizable ethylenic carboxylic acid or anhydride such as itaconic acid, itaconic acid anhydride, itaconic acid monoesters, itaconic acid monoamides, acrylic acid, alpha-methacrylic acid, beta-cyano-acrylic acid, maleic acid, maleic acid monoesters, maleic acid monoamides, corresponding mesaconic and citraconic acid derivatives, etc. The acyl chlorides, or other halides, of these acids can be used also.

When dibasic acids of the anhydrides thereof are used, one of the carboxylic groups can be esterified before the triazinyl amidation or triazinyl esterification. An amide group similarly can be introduced before the triazinyl amidation or esterification. Likewise when the dibasic acids or anhydrides thereof are used, the derivative can be carried either to the mono stage only, the remaining carboxylic acid group can then be esterified or amidated as desired. In these and other ways known to those skilled in the art monomers of this invention can be prepared.

The monomers of this invention are readily prepared by reacting the corresponding acid, acid anhydride or acid chloride with the corresponding triazine compound represented by the symbol K—H, e.g.:

(a) $CH_2=CHCOOH+K-H \longrightarrow CH_2=CHCOK+H_2O$ (b) 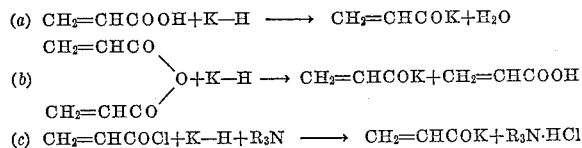 $+K-H \longrightarrow CH_2=CHCOK+CH_2=CHCOOH$ (c) $CH_2=CHCOCl+K-H+R_3N \longrightarrow CH_2=CHCOK+R_3N\cdot HCl$ The syntheses of the monomers of this invention are illustrated in Examples Ia through It.

The invention will be more fully described by the following examples. The invention is not to be regarded, however, as restricted in any way by these examples and they are to serve merely as illustrations. In these examples and throughout the specification, "parts" and "percentages" shall mean parts by weight and percentages by weight unless specifically provided otherwise.

Examples Ia through It illustrate methods of preparing various types of monomers of this invention. After each of these examples, a series of formulas are given of typical monomers. These monomers are identified by a series of Roman numerals and letters. The Roman numeral corresponds to a subsequent example illustrating the use of that particular monomer in the preparation of polymers. The capital letter in the polymer designation corresponds to the small letter in the designation of examples illustrating the method of producing that monomer. In the series of Roman numerals used to designate particular monomer formulas, I, II, and V are omitted since Examples I, II, and V are directed to procedures other than the preparation of polymers. After X, this listing has no particular significance since the examples illustrating polymerizations go no higher than X.

While the size and type of groups, as well as the number of substituents thereon, are disclosed quite broadly herein, the examples illustrate the size and type of compounds that are preferred for the practice of this invention. Particularly preferred are compounds in which hydrocarbon radicals A, R, R', and R'' each advantageously has no more than 18 carbon atoms therein, preferably no more than 10 carbon atoms, and advantageously has no more than one substituent group of the types defined, preferably no substituent groups. These hydrocarbon groups preferably are aliphatic, cycloaliphatic, or aromatic groups, or combinations thereof, advantageously having no acetylenic unsaturation therein. It is preferred also that either X or Y is hydrogen. When X is hydrogen, Y is preferably hydrogen, chlorine, an alkyl group of no more than 6 carbon atoms, —C(O)OR, —C(O)—R'$_2$, or —C(O)—B—A—B—C$_3$N$_3$(NR'$_2$)$_2$; and when Y is hydrogen, X is preferably hydrogen, a cyano group, or —C(O)R, —C(O)NR'$_2$, or

—C(O)—B—A—B—C$_3$N$_3$(NR'$_2$)$_2$

Also, where an amino group has been indicated as being part of a heterocyclic ring these are preferably piperazinyl, piperidinyl, or morpholino groups.

EXAMPLE I-a

Acrylyl chloride (18.1 parts) in 50 parts diethyl ether is added slowly and with stirring to a mixture of 45.2 parts 2,4-bis-(dimethylamino)-6-(beta-hydroxy-ethylamino)-1,-3,5-triazine and 150 parts diethyl ether containing 37 parts of tributyl amine. Upon completion of the addition of the acrylyl chloride, the mixture is refluxed for approximately one-half hour and allowed to cool to room temperature, after which it is washed with water to remove the amino hydrochloride. The ether is then evaporated and the ester again washed with water and recrystallized from acetone-water mixtures. There is obtained 2,4-bis-(dimethylamino)-6-(beta-acryloxyethylamino) - 1,3,5-triazine. Ultimate analyses for carbon, hydrogen, and nitrogen give values of 51.58%, 7.30% and 30.5% respectively, and molecular weight determination gives a value of 278.5, all of which values check closely with the theoretical values.

Substitution of equivalent quantities of methacrylyl chloride and alpha-chloracryl chloride respectively for the acrylyl chloride in the foregoing procedure, yields the corresponding triazine monomers. The ultimate analyses for carbon, hydrogen and nitrogen, and molecular weight determinations check closely as in the foregoing procedure. Likewise the various other triazines described above can be substituted for the starting triazine compound of Example I to prepare other triazine monomers of this invention.

For example, the following triazine monomers of this invention are prepared by the above procedure using the appropriate acrylic and triazine intermediates:

(a) 2,4-bis-(dimethylamino)-6-(gamma-acryloxypropylamino)-1,3,5-triazine; for which carbon, hydrogen and nitrogen analyses and molecular weight determination show values of 53.32%, 7.54%, 28.61% and 293.8, respectively, all of which values check closely with the theoretical values;

(b) 2,4-bis-(diethylamino)-6-(beta-methacryloxyethylamino)-1,3,5-triazine; for which carbon, hydrogen and nitrogen analyses and molecular weight determination show values of 58.36%, 8.66%, 24.12% and 349.4, respectively, all of which values check closely with the theoretical values;

(c) 2,4 - bis - (phenylamino)-6-(beta-acryloxy-alpha-phenyl-ethylamino)-1,3,5-triazine; for which carbon hydrogen and nitrogen analyses and molecular weight determination show values of 69.12%, 5.41%, 18.72% and 453.1, respectively, all of which values check closely with the theoretical values;

(d) 2,4 - dipiperidyl - 6-[beta-(alphachloroacryloxy)-ethylamino]-1,3,5-triazine; for which carbon, hydrogen, nitrogen and chlorine analyses and molecular weight determination show values of 54.83%, 6.94%, 21.38%, 9.11% and 3961, respectively, all of which values check closely with the theoretical values;

(e) 2,4 - bis - (dimethylamino) - 6 - (beta-acryloxy-alpha-acetoxy-ethylamino)-1,3,5-triazine; for which carbon, hydrogen, and nitrogen analyses and molecular weight determination show values of 49.82%, 6.64%, 24.92% and 336.9, respectively, all of which values check closely with the theoretical values.

In similar fashion, 2,4-diamino-6-(beta-acryloxyethylamino)-1,3,5-triazine is prepared by reacting acrylic anhydride with 2,4-diamino-6-(beta-hydroxyethylamino)-1,3,5-triazine, representing specific monomers of the structure,

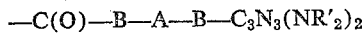 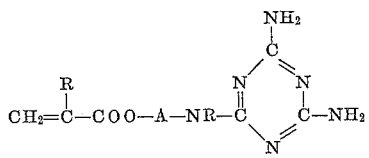

in which the 2,4-amino groups are unsubstituted and R, R' and A are as defined above. These compounds containing unsubstituted 2,4-amino groups are very useful in the preparation of homopolymers and certain copolymers, but because of their reduced solubility in other monomers, these triazinyl derivatives are preferred in which at least one, and preferably both hydrogens of the amino group are substituted by hydrocarbon groups, e.g.:

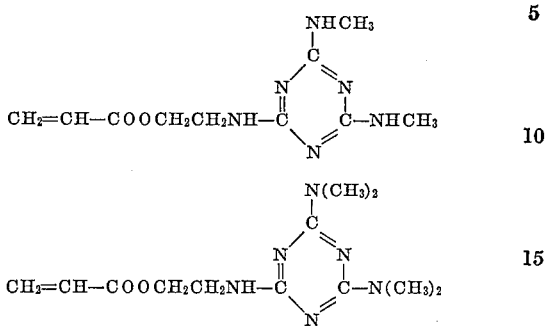

Other methods of preparing the triazine monomers of this invention can be used. For example, acrylic acid anhydride, as well as the corresponding alpha-methyl (methacrylic) and alpha-chloro (chloroacrylic) homologs can be used, according to well-known techniques for producing esters, with appropriate triazinyl alcohols to give desired triazine monomers. In certain cases, the triazine monomer can also be prepared by reacting an ester, such as methyl acrylate, with a triazinyl alcohol to give the corresponding triazine monomer by displacement of methyl alcohol. In other cases, where a stable aminoester of acrylic acid can be isolated, such as

it can be reacted with a cyanuric chloride derivative

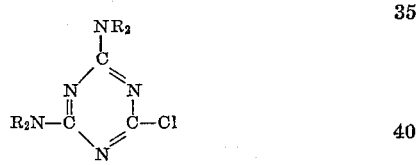

in the presence of an hydrohalide acceptor, such as NaOH, to produce triazine monomers by well-known procedures.

Typical symmetrical triazine alcohols that can be used to give desired monomers of this invention include:

(1) 2,4-di(methylamino)-6-beta-hydroxy-ethylamino)-1,3,5-triazine;
(2) 2,4-bis-(dimethylamino)-6-(beta-hydroxy-ethyl-amino)-1,3,5-triazine;
(3) 2,4-di-(ethylamino)-6-(gamma-hydroxy-propyl-amino)-1,3,5-triazine;
(4) 2,4-di-(butylamino)-6-(beta-hydroxy-ethylamino)-1,3,5-triazine;
(5) 2,4-bis-(dimethylamino)-6-(gamma-hydroxy-propyl-amino)-1,3,5-triazine;
(6) 2,4-di-(phenylamino)-6-(N-methyl-beta-hydroxy-ethylamino)-1,3,5-triazine;
(7) 2,4-di-(phenylamino)-6-(omega-hydroxy-octyl-amino)-1,3,5-triazine;
(8) 2,4-bis-(diethylamino)-6-[para-(beta-hydroxyethyl)-phenylamino]-1,3,5-triazine.

Various triazine monomers used hereinafter in the examples have the following structures:

Triazine Monomer III-A

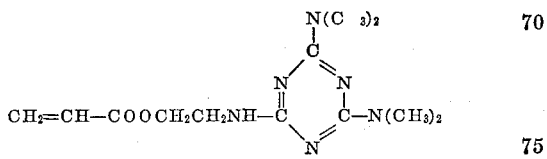

Triazine Monomer IV-A

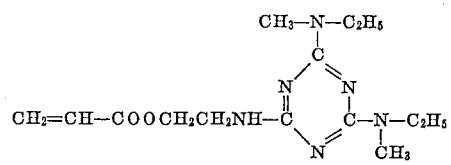

Triazine Monomer VI-A

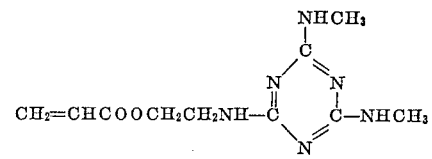

Triazine Monomer VII-A

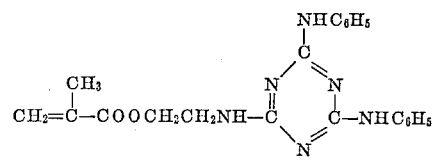

Triazine Monomer VIII-A

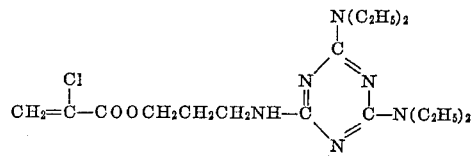

Triazine Monomer IX-A

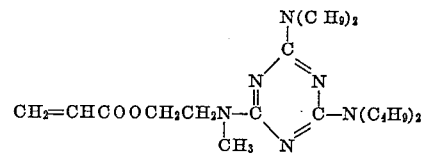

Triazine Monomer X-A

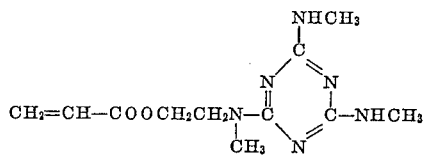

Triazine Monomer XI-A

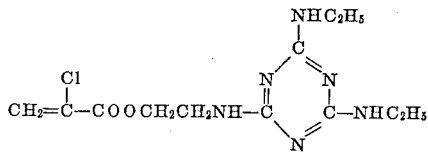

Triazine Monomer XII-A

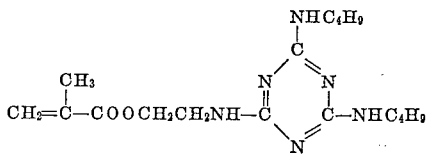

Triazine Monomer XIII-A

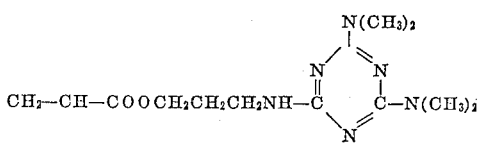

Triazine Monomer XIV-A

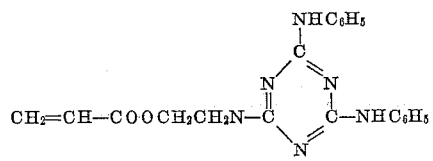

Triazine Monomer XV-A

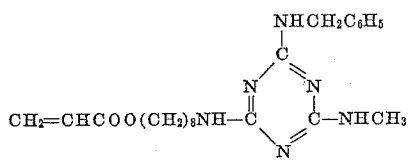

Triazine Monomer XVI-A

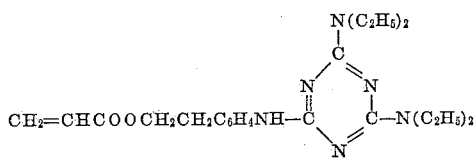

EXAMPLE I-b

*Preparation of Triazine Monomer*

Acrylyl chloride (18.1 parts) in 150 parts of diethyl ether is added slowly and with stirring to a mixture of 43 parts of 2,4 - bis-(dimethylamino)-6-(beta-amino-ethyl-amino)-1,3,5-triazine and 150 parts of diethyl ether containing 37 parts of tributyl amine. Upon completion of the addition of the acid chloride the mixture is refluxed for approximately one-half hour and allowed to cool to room temperature, after which it is washed with water to remove the amine hydrochloride. The ether is then evaporated and the ester again washed with water and recrystallized from acetone-water mixtures. There is obtained 2,4 - bis-(dimethylamino)-6 - (beta-acrylamido-ethyl-amino)-1,3,5-triazine. Ultimate analyses for carbon, hydrogen, and nitrogen and molecular weight determination gives values of 51.54%, 7.41%, 35.22%, and 277.8, respectively, all of which values are in close agreement with the theoretical values.

Substitution of equivalent quantities of methacrylyl chloride for the acrylyl chloride in the foregoing procedure, yields the corresponding triazine monomer. Ultimate analyses and molecular weight determination gives 53.3% carbon, 7.78% hydrogen, 33.5% nitrogen and molecular weight of 294.1, all of which values check closely with the theoretical values for 2,4-bis-(dimethylamino)-6-(beta-methacrylamido-ethylamino)-1,3,5-triazine.

In a similar fashion, 2,4-diamino-6-(beta-acrylamido-ethyl-amino)-1,3,5-triazine is prepared by reacting acrylyl chloride with 2,4 - diamino-6-(beta-amino-ethyl-amino)-1,3,5-triazine. This product represents specific monomers of the structure

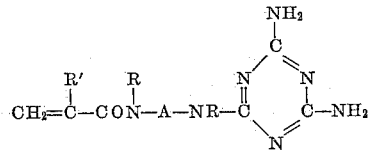

in which the amino groups are unsubstituted. These compounds containing unsubstituted 2,4-amino groups are very useful in the preparation of homopolymers and certain polymers, but because of their reduced solubility in other monomers, those triazinyl derivatives are preferred in which at least one, and preferably both hydrogens of the amino group are substituted by hydrocarbon groups, e.g.:

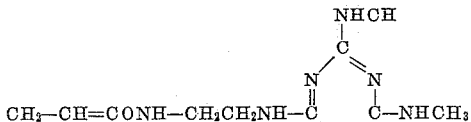

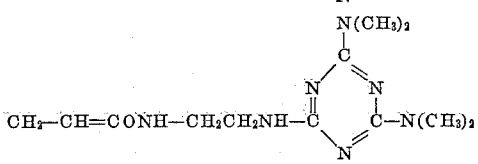

Typical triazinyl amines that can be used to give desired monomers of this invention include:

(1) $\underset{\overset{|}{CH_3}}{NHCH_2CH_2CH_2N}-C_3N_3(\underset{\overset{|}{CH_3}}{NH_2})_2$ (2) $NH_2(CH_2)_6NH-C_3N_3(NHCH_3)_2$ (3) $\underset{CH_2CH_2}{\overset{CH_2CH_2}{NH}}\!\!\diagdown\!\!\underset{}{N}-C_3N_3(N\underset{CH_2CH_2}{\overset{CH_2CH_2}{\diagup}}\!\!\diagdown\!\!O)_2$ (4) $NH_2-CH_2CH_2-\underset{\overset{|}{\underset{\overset{|}{CH_3COO-CH_2}}{CH_2}}}{N}-C_3N_3(NHC_6H_5)_2$ (5) $CH_3-NH-CH\underset{CH_2CH_2}{\overset{CH_2CH_2}{\diagup}}\!\!\diagdown\!\!CHNH-C_3N_3(NHCH_3)_2$ (6) $\underset{\overset{|}{C_6H_5}}{NH_2-CH_2CH-CH_2NH}-C_3N_3[N(C_4H_9)_2]_2$ (7) $NH\underset{CH_2CH_2}{\overset{CH_2CH_2}{\diagup}}\!\!\diagdown\!\!CH-NH-C_3N_3[N(CH_3)_2]_2$ Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4-diamino-6-(beta-acrylamido-ethyl-amino-)-1,3,5-triazine, with carbon, hydrogen, nitrogen and molecular weight values of 43.20%, 5.91%, 43.87% and 223.4, respectively;

(b) 2,4-dimethylamino-6 - (beta-chloracrylamido-ethyl-amino-)-1,3,5-triazine, with carbon, hydrogen, nitrogen, chlorine and molecular weight values of 6.31%, 31.42%, 11.42%, 46.09% and 314.3, respectively;

(c) 2,4-diphenylamino - 6 - (beta-acrylamino-ethyl-amino)-1,3,5-triazine, with carbon, hydrogen, nitrogen and molecular weight values of 64.06%, 5.54%, 26.85% and 374.2, respectively.

(d) 2,4-dipiperidyl-6-(beta-acrylamido-propyl-amino)-1,3,5-triazine, with carbon, hydrogen, nitrogen and molecular weight values of 61.22%, 8.39%, 26.34% and 372.7, respectively.

(e) 2,4-di-(dibutylamino) - 6 - (beta-acrylamindo-ethyl-amino)-1,3,5-triazine, with carbon, hydrogen, nitrogen and molecular weight values of 64.61%, 10.11%, 21.87% and 447.6, respectively.

Other methods of preparing the triazine monomers of this invention can be used. For example, acrylic acid anhydride, as well as the corresponding alpha-methyl (methacrylic) and alpha-chloro (chloroacrylic) homologs can be used, according to well-known techniques for producing amides, with appropriate triazinyl amines to give desired triazine monomers. In certain cases, the triazine monomer can also be prepared by reacting an amide, such as N,N-dimethyl-acrylamide, with a triazinyl amine to give the corresponding triazine monomer by displacement of dimethylamine. In some cases, where a stable amino-amide of acrylic acid can be isolated, such as $CH_2=CH-CONHCH_2=CH_2-NH-C_2H_5$, it can be reacted with a cyanuric chloride derivative

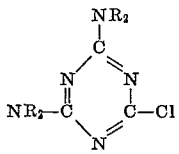

in the presence of an hydrohalide acceptor, such as NaOH, to produce triazine monomers by well-known procedures.

Various triazine monomers used hereinafter in the examples have the following structures:

Triazine Monomer III-B

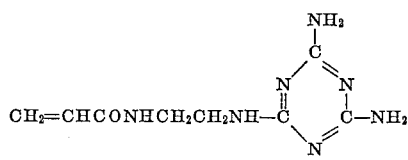

Triazine Monomer IV-B

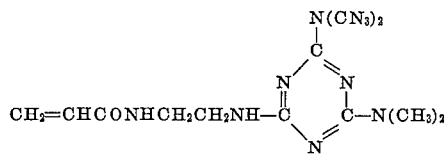

Triazine Monomer VI-B

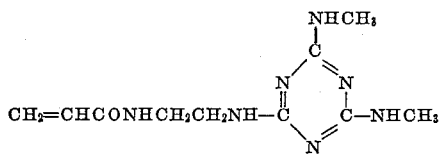

Triazine Monomer VII-B

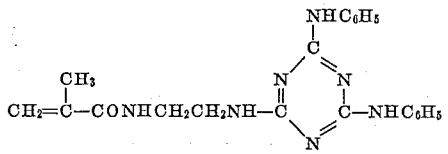

Triazine Monomer VIII-B

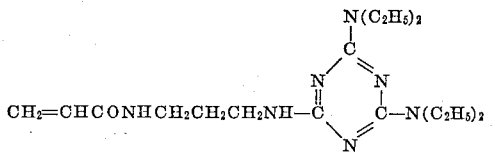

Triazine Monomer IX-B

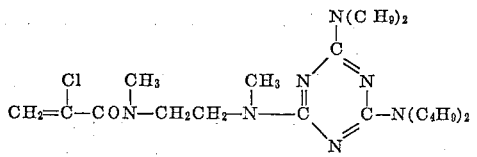

Triazine Monomer X-B

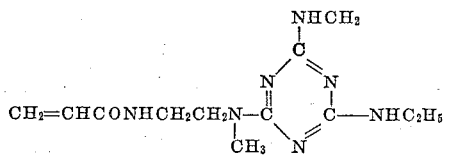

Triazine Monomer XI-B

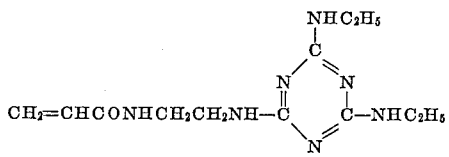

Triazine Monomer XII-B

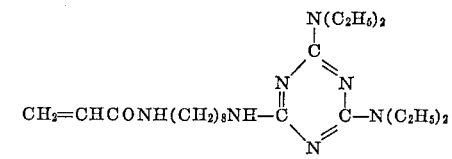

Triazine Monomer XIII-B

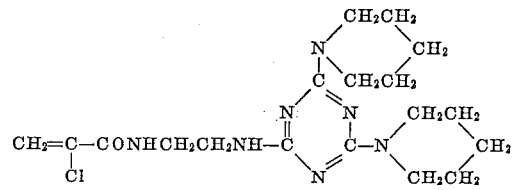

Triazine Monomer XIV-B

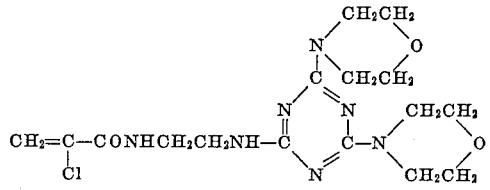

Triazine Monomer XV-B

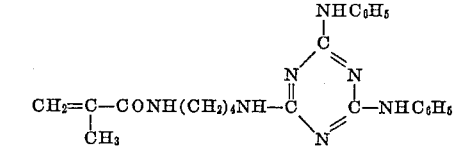

Triazine Monomer XVI-B

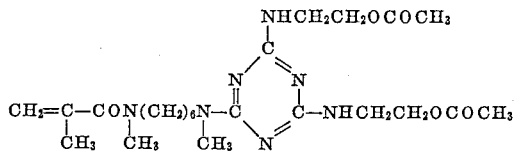

EXAMPLE I-c

*Preparation of Triazine Monomer*

Acrylyl chloride (18.1 parts) in 50 parts of diethyl ether is added slowly and with stirring to a mixture of 45 parts of 2,4 - bis - (dimethylamino) - 6 - (beta - hydroxyethoxy)-1,3,5-triazine and 150 parts of diethyl ether containing 37 parts of tributyl amine. Upon completion of the addition of the acid chloride, the mixture is refluxed for approximately one-half hour and allowed to cool to room temperature, after which it is washed with water to remove the amine hydrochloride. The ether is then evaporated and the ester again washed with water and recrystallized from acetone-water mixtures. There is obtained 2,4-bis-(dimethyl-amino)-6-(beta-acryloxyethoxy)-1,3,5-triazine. The compound is identified by ultimate analyses for carbon, hydrogen, and nitrogen and by molecular weight determination which give values of 51.36%, 6.87%, 25.11% and 279.6 respectively, which values are in close agreement with the theoretical values.

Substitution of equivalent quantities of methacrylyl chloride and of chloracrylyl chloride respectively for the acrylyl chloride in the foregoing procedure, yields the corresponding triazine monomers. These are identified by ultimate analyses and molecular weight determination as in the foregoing procedure. Likewise the various other triazine intermediates described above can be substituted for the triazine intermediate of the foregoing procedure to prepare other triazine monomers of this invention.

In a similar fashion, 2,4-diamino-6-(beta-acryloxy-ethoxy)-1,3,5-triazine is prepared by reacting acrylyl chloride with 2,4-diamino-6-(beta-hydroxyethoxy)-1,3,5-triazine. This product represents specific monomers of the structure:

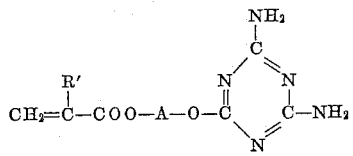

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

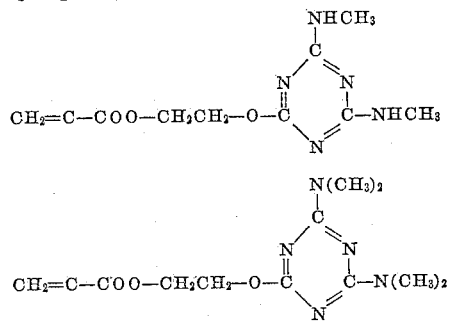

Various other triazine monomers of this invention can be prepared by the foregoing procedure using the appropriate acrylyl and triazine intermediates. For example, the following monomers prepared accordingly are identified by the analyses and molecular weights indicated, all of which check closely with the theoretical values:

(a) 2,4 - bis - (diethylamino) - 6 - (beta - acryloxy-ethoxy)-1,3,5-triazine, with carbon, hydrogen, nitrogen and molecular weight values of 56.89%, 8.12%, 21.96% 335.4, respectively;

(b) 2,4-bis-(dibutylamino)-6-(beta - acryloxyethoxy)-1,3,5-triazine, with carbon, hydrogen, nitrogen and molecular weight values of 64.32%, 9.72%, 15.73% and 447.7, respectively;

(c) 2,4-bis-(monoethylamino)-6-(gamma - methacryl-oxypropoxy) - 1,3,5-triazine, with carbon, hydrogen, nitrogen and molecular weight values of 51.38%, 6.90%, 25.10% and 281.6, respectively;

(d) 2,4-bis - (monophenylamino)-6-(beta - acryloxy-ethoxy)-1,3,5-triazine, with carbon, hydrogen, nitrogen and molecular weight values of 63.82%, 5.13%, 18.74% and 375.4, respectively;

(e) 2,4-dimorpholino-6-(beta-acryloxy-alpha - phenyl-ethoxy)-1,3,5-triazine, with carbon, hydrogen, nitrogen and molecular weight values of 64.72%, 6.74%, 17.32% and 407.9, respectively.

Other methods of preparing the triazine monomers of this invention can be used. For example, acrylic acid anhydride, as well as the corresponding alpha-methyl (methacrylic) and alpha-chloro (chloroacrylic) homologs can be used, according to well-known techniques for producing esters, with appropriate triazinyl alcohols to give desired triazine monomers. In certain cases, the triazine monomer can also be prepared by reacting an acrylic ester, such as methyl acrylate, with a triazinyl alcohol to give the corresponding triazine monomer by displacement of methanol. In other cases, where a stable alcohol ester of an acrylic acid can be isolated, such as beta-hydroxy-ethyl acrylate, it can be reacted with a cyanuric chloride derivative.

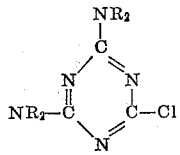

in the presence of an hydrohalide acceptor, such as NaOH, to produce triazine monomers by well-known procedures.

Typical triazinyl amines that can be used to give desired monomers of this invention include:

(1) 2,4-bis-(dimethylamine)-6-(beta-hydroxyethoxy)-1,3,5-triazine;
(2) 2,4-diamino-6-(beta-hydroxyethoxy)-1,3,5-triazine;
(3) 2,4-bis-(monomethylamino)-6-(gamma-hydroxy-propoxy)1-3,5-triazine;
(4) 2,4-di-phenylamino-6-(beta-hydroxy-alpha-phenyl-ethoxy)-1,3,5-triazine;
(5) 2,4-dimorpholino-6-(beta-hydroxy-alpha-methyl-ethoxy)-1,3,5-triazine;
(6) 2,4-dipiperazinyl-6-(beta-hydroxy-ethylphenoxy)-1,3,5-triazine; and
(7) 2,4-dipiperidinyl-6-(gamma-hydroxy-butoxy)-1,3,5-triazine, Various triazine monomers used hereinafter in the examples have the following structures:

Triazine Monomer III–C

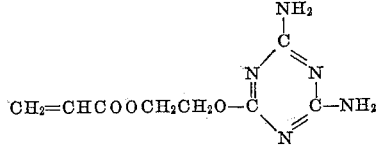

Triazine Monomer IV–C

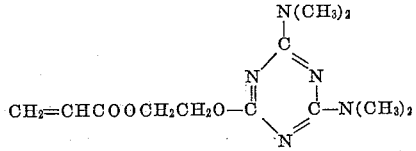

Triazine Monomer VI–C

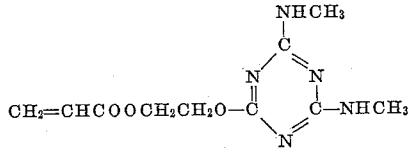

Triazine Monomer VII–C

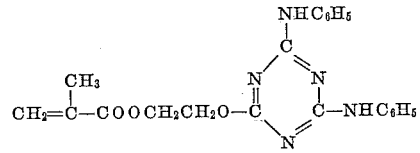

Triazine Monomer VIII–C

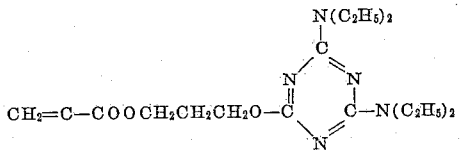

Triazine Monomer IX-C

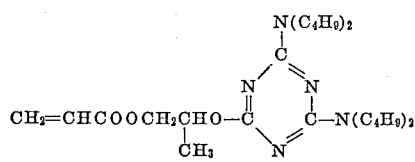

Triazine Monomer X-C

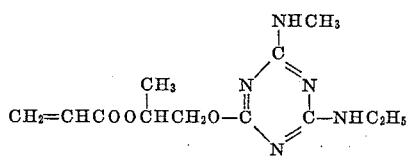

Triazine Monomer XI-C

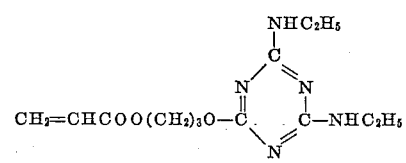

Triazine Monomer XII-C

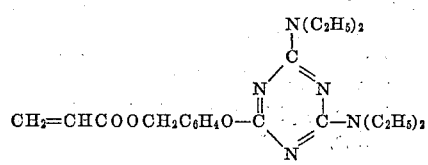

Triazine Monomer XIII-C

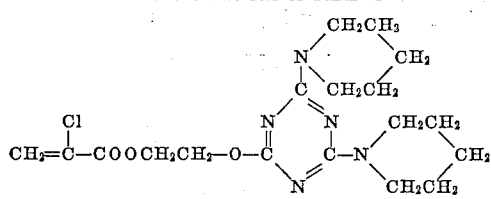

Triazine Monomer XIV-C

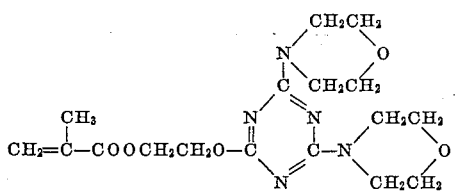

Triazine Monomer XV-C

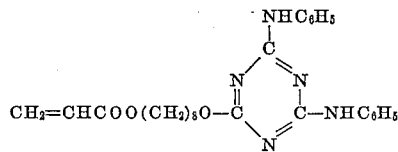

Triazine Monomer XVI-C

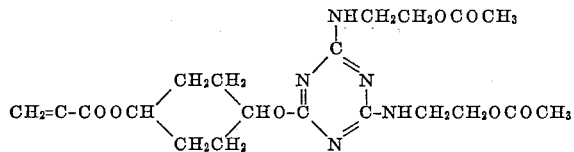

EXAMPLE I-d 2-chloro-4,6-dianilino-1,3,5-triazine (29.7 parts) is added to a mixture of 11 parts of beta-hydroxyethylacrylamide (prepared readily from acrylyl chloride and ethanolamine or by the reaction of ethylene oxide with acrylamide) and 4 parts of sodium hydroxide in 250 parts of dioxane at 50° C. and the mixture refluxed for 3 hours. The reaction product is then concentrated by evaporating the dioxane under reduced pressure. Salts and other soluble materials are removed by washing the product with water, and the amide product is recrystallized from aqueous ethanol. Ultimate analyses for carbon, hydrogen, and nitrogen and molecular weight determination give values of 63.72%, 5.38%, 21.26% and 377.1, all of which values check closely with the theoretical values of the 2,4-dianilino-6-(beta-acrylamido-ethoxy)-1,3,5-triazine.

When beta-hydroxyethylmethacrylamide is used in the foregoing procedure in place of its homolog, the corresponding 2,4 - dianilino - 6 - (beta - methacrylamide-ethoxy)-1,3,5-triazine is obtained for which ultimate analyses and molecular weight determination give values of 63.54% carbon, 5.69% hydrogen, 21.56% nitrogen, and molecular weight of 388.9 all of which values check closely with the theoretical values. The corresponding chloroacrylic intermediate is used to prepare the corresponding chloracrylic triazine monomer.

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4 - bis - (dimethylamino) - 6 - (beta - acrylamido-ethoxy)-1,3,5-triazine, with carbon, hydrogen, nitrogen and molecular weight values of 51.47%, 7.21%, 30.07% and 280.3, respectively;

(b) 2,4 - bis - (methylamino) - 6 - (beta - acrylamido-ethoxy)-1,3,5-triazine, with carbon, hydrogen, nitrogen and molecular weight values of 47.76%, 6.31%, 33.29% and 252.7%, respectively;

(c) 2,4 - bis - (diethylamino) - 6 - (gamma - acrylamido-hexoxy)-1,3,5-triazine, with carbon, hydrogen, nitrogen and molecular weight values of 61.33%, 9.16%, 21.44% and 391.6, respectively;

(d) 2,4 - dipiperidyl - 6 - (beta - chloracrylamido-ethoxy)-1,3,5-triazine, with carbon, hydrogen, nitrogen, chlorine and molecular weight values of 54.76% 6.79%, 21.36%, 8.91% and 393.9, respectively;

(e) 2,4 - bis - (phenylamino) - 6 - (gamma - methacryl-amido-butoxy)-1,3,5-triazine, with carbon, hydrogen, nitrogen and molecular weight values of 65.94%, 6.26%, 20.26% and 417.7, respectively.

2,4 - diamino - 6 - (beta - acrylamido - ethoxy) - 1,3,5-triazine represents monomers of the structure

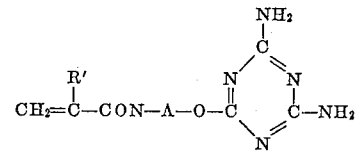

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

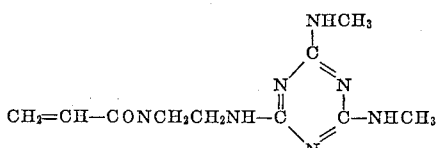

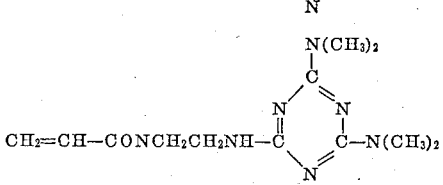

Methods other than that shown above can also be used for preparing the amides of this invention. For example, acrylyl acid chloride or anhydride, as well as the corresponding alpha-methyl (methacrylic) or alpha-chloro (chloroacrylic) acid chloride of anhydride, can be reacted with an amine of the formula

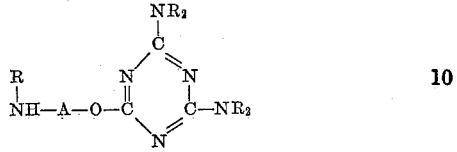

(wherein A and R are as defined above), in accordance with well-known procedures for making amides, to give the amides of this invention. In certain cases, the triazinyl acrylic amide can also be prepared by reacting an acrylic amide, such as N,N-dimethyl-acrylamide with a triazinyl amine of the above formula to give the corresponding triazine monomer by displacement of dimethylamine.

Typical acrylamido hydroxy compounds that can be used as intermediates to give desired monomers of this invention include:

(1) $CH_2=CHCONHCH_2CH_2CH_2OH$
(2) $CH_2=C(CH_3)CONH(CH_2)_4OH$
(3) $CH_2=C(Cl)CON(CH_3)C_6H_4OH$
(4) $CH_2=CHCON(C_6H_5)CH(CH_3)CH_2OH$
(5) $CH_2=CHCONHCH_2C_6H_4OH$
(6) $CH_2=CHCONHCH_2CH_2C_6H_4OH$
(7) $CH_2=CHCONHC_6H_4CH_2CH_2OH$
(8) $CH_2=C(CH_3)CONHC_6H_{10}OH$
(9) $CH_2=C(Cl)CONHCH_2C_6H_{10}OH$
(10) $CH_2=CHCONHC_{10}H_6OH$

Typical triazinyl amines that can be used to give desired monomers of this invention include:

(1) $NH_2—CH_2CH_2O—C_3N_3(NHCH_3)_2$
(2) $NH_2—CH_2CH_2O—C_3N_3[N(CH_3)_2]_2$
(3) $NH_2—CH—CH_2—O—C_3N_3[N(C_4H_9)_2]_2$
     $\quad\quad\quad\; |$
     $\quad\quad\quad CH_3$
(4) $NH_2—(CH_2)_6O—C_3N_3[N(C_2H_5)_2]_2$
(5) $CH_3—NH—CH_2CH_2O—C_3N_3(N(CH_2CH_2)_2(CH_2)_2CH_2CH_2)_2$
(6) $NH_2—CH_2—C_6H_4—O—C_3N_3(N(CH_2CH_2)_2O)_2$
(7) $NH_2—(CH_2)_4O—C_3N_3(NHC_6H_5)_2$
(8) $NH_2—(CH_2)_3O—C_3N_3(NHCH_2C_6H_5)_2$
(9) $CH_3—NH—(CH_2)_3O—C_3N_3(NHCH_2CH_2OCOCH_3)_2$
(10) $CH_3—NHC_6H_4O—C_3N_3(NHCH_2CH_2OC_2H_5)_2$ Various triazine monomers used hereinafter in the examples have the following structures:

Triazine Monomer III–D

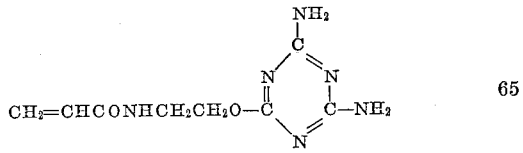

Triazine Monomer IV–D

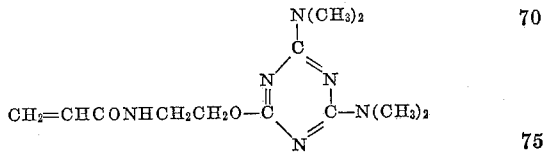

Triazine Monomer VI–D

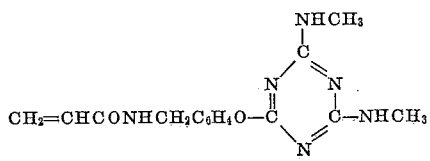

Triazine Monomer VII–D

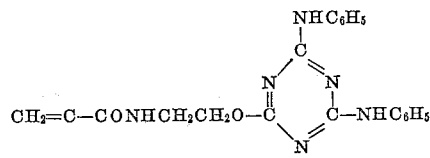

Triazine Monomer VIII–D

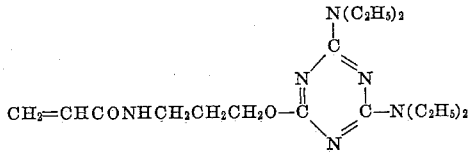

Triazine Monomer IX–D

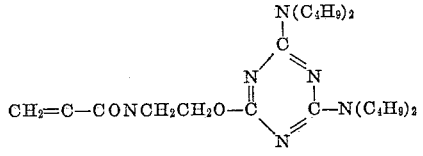

Triazine Monomer X–D

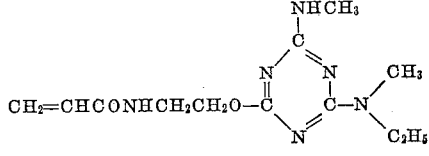

Triazine Monomer XI–D

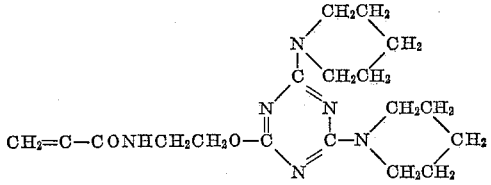

Triazine Monomer XII–D

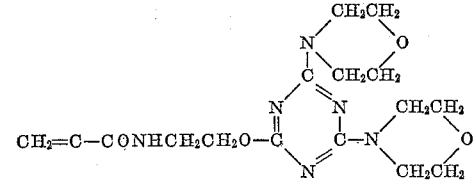

Triazine Monomer XIII–D

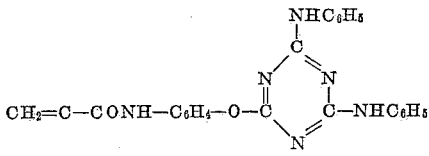

Triazine Monomer XIV–D

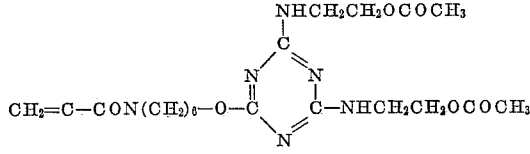

Triazine Monomer XV-D

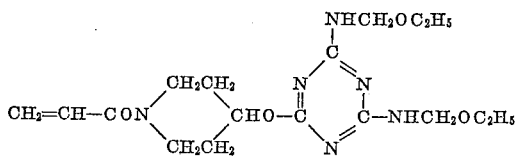

Triazine Monomer XVI-D

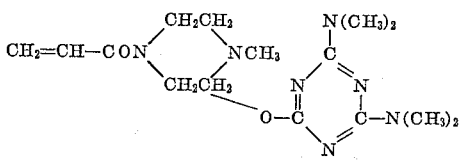

EXAMPLE I-e

Preparation of Triazine Monomer

Acrylyl chloride (18.1 parts) in 150 parts of diethyl ether is added slowly and with stirring to a mixture of 54.6 parts of 2,4-bis-(dimethylamino)-6-(ortho-aminophenyl-amino)-1,3,5-triazine and 150 parts of diethyl ether containing 37 parts of tributyl amine in a flask equipped with means for refluxing. Upon completion of the addition of the acid chloride the mixture is refluxed for approximately one-half hour and allowed to cool at room temperature, after which it is washed with water to remove the amine hydrochloride. The ether is then evaporated and the ester again washed with water and recrystallized from acetone-water mixtures. There is obtained 2,4-bis-(dimethylamino) - 6 - (ortho - acrylamido - phenylamino)-1,3,5-triazine. Ultimate analyses for carbon, hydrogen, and nitrogen and molecular weight determination give values of 59.62%, 6.49%, 29.86%, and 327.8, respectively, all of which values are in close agreement with the theoretical values.

Substitution of an equivalent quantity of methacrylyl chloride for the acrylyl chloride in the foregoing procedure, yields the corresponding triazine monomer. Ultimate analyses and molecular weight determination give 59.82% carbon, 6.79% hydrogen, 28.77% nitrogen and molecular weight of 339.8, all of which values check closely with the theoretical values. The corresponding chloracrylic derivative is prepared by use of chloracrylyl chloride.

In a similar fashion, 2,4-diamino-6-(para-acrylamido-phenylamino)-1,3,5-triazine is prepared by reacting acrylyl chloride with 2,4-diamino-6-(para-amino-phenylamino)-1,3,5-triazine. This product represents specific monomers of the structure

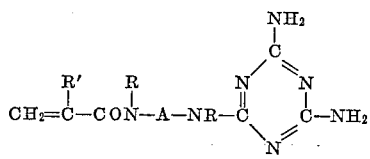

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

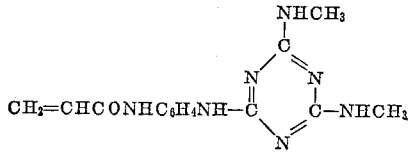

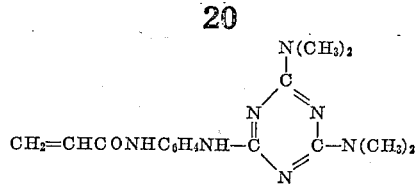

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4-bis(dimethylamino)-6-(para-acrylamido-ortho-methyl-phenylamino)-1,3,5-triazine, with carbon, hydrogen, nitrogen and molecular weight values of 59.76%, 6.69%, 28.85% and 342.1, respectively;

(b) 2,4-bis-(diethylamino)-6-(para-acrylamido-phenyl-amino)-1,3,5-triazine, with carbon, hydrogen, nitrogen and molecular weight values of 62.76%, 7.60%, 25.67% and 382.7, respectively;

(c) 2,4 - bis - (dibutylamino)-6-[N-methyl-(N-methyl-methacrylamido) - phenyl - amino] - 1,3,5 - triazine, with carbon, hydrogen, nitrogen and molecular weight values of 69.38%, 9.55%, 18.32% and 536.4, respectively;

(d) 2,4 - bis-(beta-ethoxyethylamino)-6-(7-chloroacryl-amido-2-naphthylamino)-1,3,5-triazine, with carbon, hydrogen, nitrogen and molecular weight values of 57.84%, 6.06%, 19.74% and 499.1, respectively;

(e) 2,4-bis-(diethylamino)-6-(para-acrylamido-benzyl-amino)-1,3,5-triazine, with carbon, hydrogen, nitrogen and molecular weight values of 63.58%, 7.90%, 24.73% and 397.8, respectively;

(f) 2,4 - bis - (dimethylamino) - 6 - (para - meth-acrylamido - beta-phenethylamino) - 1,3,5 - triazine, with carbon, hydrogen, nitrogen and molecular weight values of 61.87%, 7.28, 26.68% and 370.1, respectively;

(g) 2,4-bis-(phenylamino)-6-p-(beta-acrylamido-alpha-methyl-ethyl)-phenylamino - 1,3,5 - triazine, with carbon, hydrogen, nitrogen and molecular weight values of 69.66%, 5.87%, 21.19% and 464.3, respectively;

(h) 2,4 - bis - (dibutylamino)-6-p-(p-chloracrylamido-phenoxy)-phenylamino-1,3,5-triazine, with carbon, hydrogen, nitrogen, chlorine and molecular weight values of 65.79%, 7.66%, 16.86%, 5.67% and 622.3, respectively;

(i) 2,4-dimorpholino-6-p-(p-acrylamidophenylamino)-phenylamino-1,3,5-triazine, with carbon, hydrogen, nitrogen and molecular weight values of 62.29%, 5.92%, 22.38% and 501.4, respectively.

Other methods can also be used for preparing the amides of this invention. For example, acrylic acid anhydride, as well as the corresponding alpha-methyl (methacrylic) and alpha-chloro (chloracrylic) homologs, can be used, according to well-known procedures for producing amides, with triazinyl amines to produce desired monomers of the formula defined above. In certain cases the triazinyl acrylic amide can also be prepared by reacting an acrylic amide, such as N,N-dimethylacrylamide, with a triazinyl amine to give the corresponding triazine monomer by displacement of dimethylamine. In other cases, where a stable aminoarylamide of acrylic acid can be isolated, such as $CH_2=CHCONHC_6H_4NHC_2H_5$, it can be reacted with a cyanuric chloride derivative

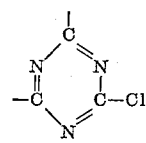

in the presence of an hydrohalide acceptor, such as NaOH, to produce a desired triazine monomer by well-known procedures.

Typical triazinyl amines that can be used to give desired monomers of this invention include:

(1) NH₂—C₆H₄—NH—C₃N₃(NHCH₃)₂
(2) NH₂—C₆H₄—NH—C₃N₃[N(C₂H₅)₂]₂
(3) NH₂—C₆H₄—NH—C₃N₃(N(CH₂CH₂)₂CH₂)₂
(4) NH₂—C₆H₄—NH—C₃N₃(N(CH₂CH₂)₂O)₂
(5) NH₂—C₆H₄—C₆H₄—NH—C₃N₃(NHC₆H₅)₂
(6) NH₂—C₁₀H₆—NH—C₃N₃[N(C₄H₉)₂]₂
(7) NH₂—CH₂C₆H₄NH—C₃N₃(NHCH₃)₂
(8) NH₂—CH₂C₆H₄NH—C₃N₃[N(C₂H₅)₂]₂
(9) NH₂—CH₂CH₂C₆H₄NH—C₂N₃(N(CH₂CH₂)₂CH₂)₂
(10) NH₂—C₆H₄CH₂CH₂NH—C₃N₃(N(CH₂CH₂)₂NH)₂
(11) NH₂—C₆H₄—CH₂—C₆H₄—NH—C₃N₃(NHC₆H₅)₂
(12) NH₂—C₁₀H₆—CH₂—NH—C₃N₃[N(C₄H₉)₂]₂

Various triazine monomers used hereinafter in the examples have the following structures:

Triazine Monomer III-E

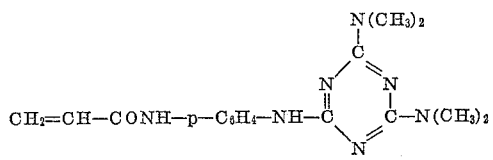

Triazine Monomer IV-E

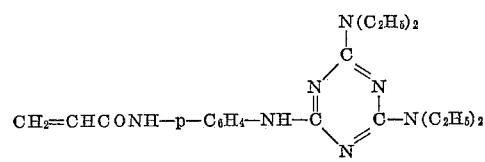

Triazine Monomer VI-E

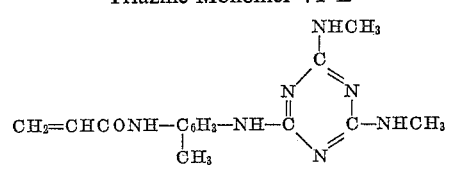

Triazine Monomer VII-E

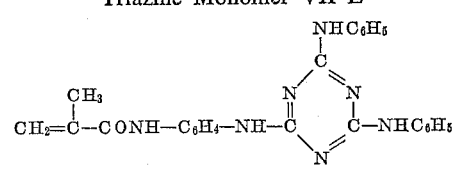

Triazine Monomer VIII-E

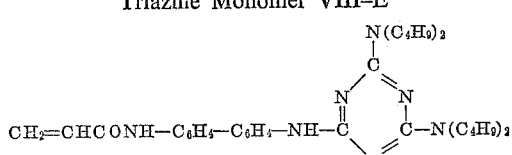

Triazine Monomer IX-E

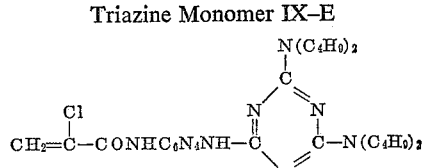

Triazine Monomer X-E

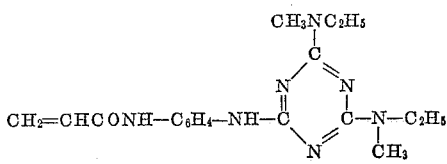

Triazine Monomer XI-E

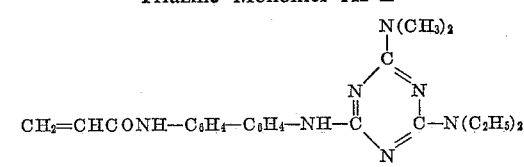

Triazine Monomer XII-E

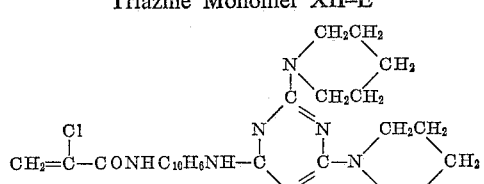

Triazine Monomer XIII-E

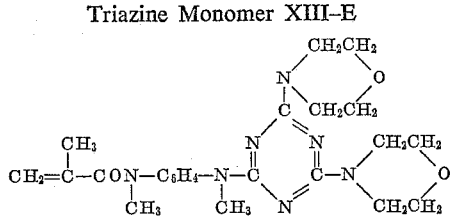

Triazine Monomer XIV-E

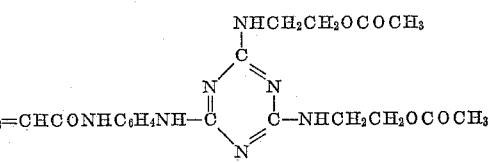

Triazine Monomer XV-E

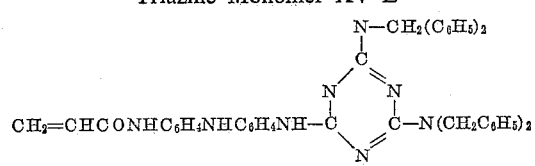

Triazine Monomer XVI-E

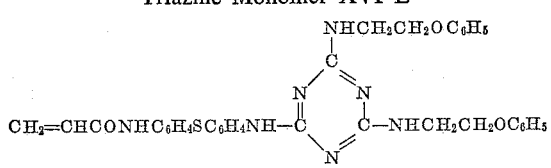

EXAMPLE I-f

*Preparation of Triazine Monomers*

(a) Itaconic anhydride (11.2 parts) in 50 parts of benzene is added slowly and with stirring to a mixture of 22.6 parts of 2,4-di-(dimethylamino)-6 (beta-hydroxyethylamino)-1,3,5-triazine and 150 ml. diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the itaconic acid monoester of the above triazine compound. Ultimate analyses for carbon, hydrogen, and nitrogen give values of 49.52%, 6.44% and 24.55% and molecular weight determination shows a value of 337.2, respectively, all of which values are in close agreement with the theoretical values.

Substitution of equivalent quantities of the various other triazinyl alcohols described above for the one used in the foregoing procedure yields various monoesters of itaconic acid of this invention. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl or other alkyl esters. These esters may also be prepared as in the following procedure (b).

(b) Monomethyl itaconyl monochloride (16.3 parts) in 50 parts of diethyl ether is added slowly and with stirring to a mixture of 22.6 parts of 2,4-di-(dimethylamino)-6-(beta-hydroxyethylamino)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the ester again washed with water and the product recrystallized from acetone-water mixtures. There is obtained the monomethyl itaconic ester of 2,4-di-(dimethylamino)-6-(beta-hydroxyethylamino)-1,3,5-triazine. Ultimate analyses for carbon, hydrogen and nitrogen give values of 51.31%, 6.97% and 23.98%, respectively, and molecular weight determination gives a value of 353.2, all of which values check closely with the theoretical values. Substitution of equivalent quantities of the various monoesters and of various triazinyl alcohols, as described above, for the monoester and triazinyl alcohol of the foregoing procedure yields various itaconic esters of this invention. These are characterized by ultimate analyses and molecular weight determinations as above.

(c) In place of the mono-acid chloride of (b), there is used 16.75 parts of itaconic dichloride, together with 45.2 parts of 2,4-di-(dimethylamino)-6-(beta-hydroxyethylamino)-1,3,5-triazine and 37 parts of tributyl amine, and according to the same procedure for the itaconyl monochloride, there is obtained the itaconic diester of this triazinyl alcohol. Ultimate analyses for carbon, hydrogen and nitrogen give values of 50.61%, 7.03%, and 30.92%, respectively, and molecular weight determination gives a value of 544.7, all of which values check closely with the theoretical values. When the various other triazinyl alcohols described above are substituted respectively in equivalent quantities in this foregoing procedure, the corresponding itaconic di-esters are obtained.

(d) In place of the monomethyl itaconyl monochloride of (b), there is used an equivalent amount of mono-(dimethylamide)-itaconyl monochloride. (This monoamide can be prepared by reacting, mole per mole, dimethylamine and itaconic acid anhydride and subsequently converting the free acid group of the resulting mono-(dimethylamide)-itaconic mono-acid to an acid chloride group by the ordinary methods of converting acids to acyl chlorides, such as, for example, by reacting with thionyl chloride.) The procedure of (b) is followed to produce mono-(dimethylamido)itaconic monoester of 2,4-di-(dimethylamino) - 6 - (beta-hydroxyethylamino)-1,3,5-triazine. Ultimate analyses for carbon, hydrogen and nitrogen show values of 59.41%, 8.85%, and 24.34%, respectively, and molecular weight determination gives a value of 406.7, all of which check closely with the theoretical values. Substitution of various other monoamides of itaconic acid, including the morpholine, piperidyl and piperazinyl monoamides, and of various other triazinyl alcohols, as described above for the monoamide and triazinyl alcohol of the foregoing procedure yields various itaconic amide ester triazine monomers of this invention.

The following compounds of this invention, prepared according to the foregoing procedures, show the following values:

(e) Morpholino monoamide of itaconic monoester of 2,4-diamino-6-(gamma-hydroxypropylamino) - 1,3,5 - triazine; carbon 49.51%; hydrogen 6.42%, nitrogen 26.97%; and molecular weight 363.9, all of which values check closely with theoretical;

(f) Piperidyl monoamide of itaconic monoester of 2,4-di-(dibutylamino)-6-(gamma-hydroxybutylamino) - 1,3,5-triazine; carbon 65.99%, hydrogen 9.88%; nitrogen 16.49%; and molecular weight 602.1, all of which values check closely with theoretical.

(g) Monobutyl itaconic ester of 2,4-di-(dipropylamino)-6-(beta-hydroxy-ethylphenylamino) - 1,3,5 - triazine; carbon 67.72%, hydrogen 6.41%, nitrogen 14.94%; and molecular weight 567.3, all of which values check closely with theoretical;

(h) Piperazinyl monoamide of itaconic monoester of 2,4-di-(dimethylamino)-6-(beta-hydroxyethylamino) - 1,3,5-triazine; carbon 53.31%; hydrogen 7.45%; nitrogen 27.74%; and molecular weight 407.2, all of which values check closely with theoretical.

Various triazine monomers used hereinafter in the examples have the following structures:

Triazine Monomer III–F

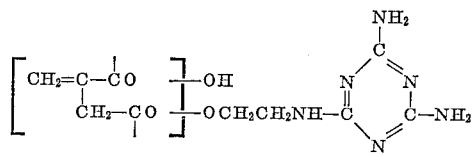

Triazine Monomer IV–F

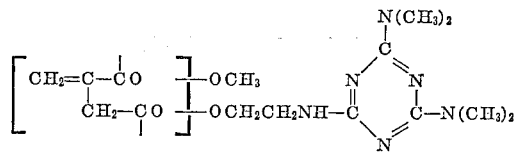

Triazine Monomer VI–F

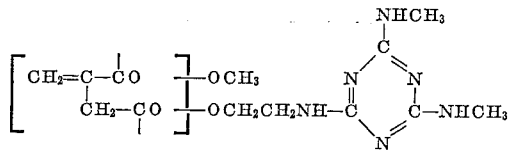

Triazine Monomer VII–F

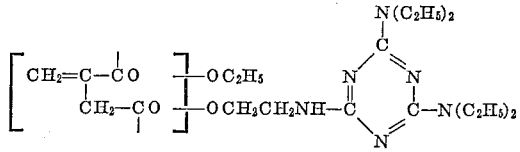

Triazine Monomer VIII–F

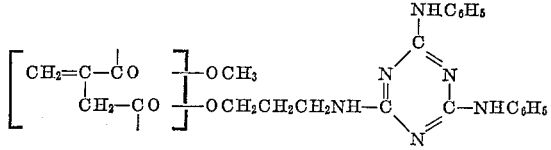

Triazine Monomer IX–F

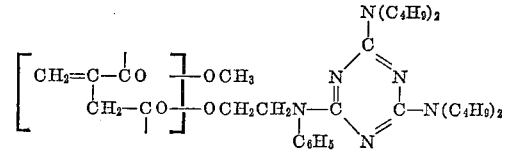

Triazine Monomer X–F

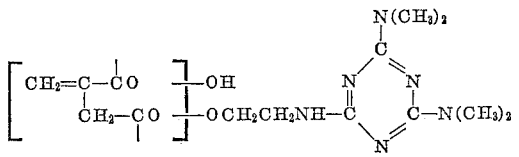

Triazine Monomer XI–F

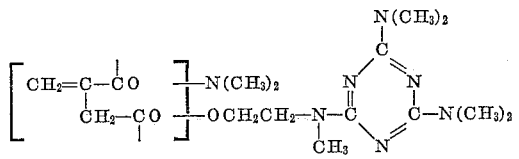

Triazine Monomer XII–F

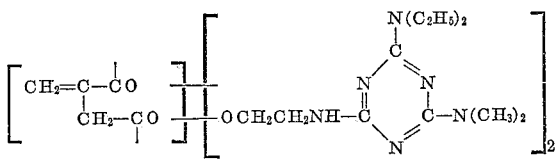

Triazine Monomer XIII–F

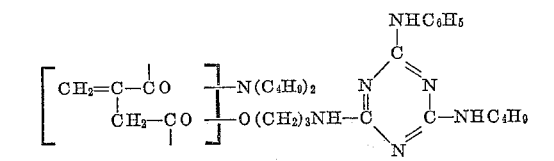

Triazine Monomer XIV–F

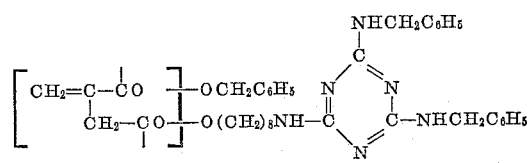

Triazine Monomer XV–F

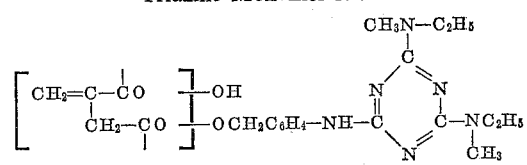

Triazine Monomer XVI–F

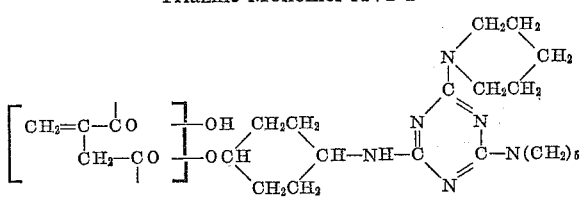

EXAMPLE I–g

*Preparation of Triazine Monomers*

(a) Itaconic anhydride (11.2 parts) in 150 parts of benzene is added slowly and with stirring to a mixture of 22.5 parts of 2,4-di-(dimethylamino)-6-(beta-amino-ethylamino) - 1,3,5 - triazine and 150 pts. diethyl ether, equipped for stirring and reflux. Upon completion of the addition of the anhydride, the mixture is refluxed for approximately one hour, after which it is allowed to cool to room temperature and is washed with water. The ether and benzene are then evaporated and the amide is recrystallized from acetone-water mixtures. There is obtained the itaconic acid monoamide of the above triazine compound. Ultimate analyses for carbon, hydrogen, and nitrogen, and molecular weight determination give values which are in close agreement with the theoretical values.

Substitution of equivalent quantities of the various other triazinyl amines described above for the one used in the foregoing procedure yields various monoamides of itaconic acid of this invention. These are identified by ultimate analyses and molecular weight determinations as above. These monoamides can be used as such or can be converted to monoesters by reacting their sodium salts in the standard manner, with dialkyl sulfates, etc., as for example with dimethyl or diethyl sulfate to produce the corresponding methyl, ethyl, or other alkyl esters. These esters may also be prepared as in the following procedure (b).

(b) Monomethyl itaconyl monochloride (16.3 parts) in 150 parts of diethyl ether is added slowly and with stirring to a mixture of 22.5 parts of 2,4-di-(dimethylamino)-6-(beta-aminoethylamino)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the ester-amide again washed with water and the product recrystallized from actone-water mixtures. There is obtained the monomethyl itaconic monoamide of 2,4 - di - (dimethylamino) - 6 - (beta-aminoethylamino)-1,3,5-triazine. Ultimate analyses for carbon, hydrogen, and nitrogen, and molecular weight determination give values which check closely with the theoretical values. Substitution of equivalent qualities of the various monoesters and of various triazinyl amines, as described above, for the monoester and triazinyl amine of the foregoing procedure yields various itaconic ester-amides of this invention. These are characterized by ultimate analyses and molecular weight determinations as above.

(c) In place of the mono-acid chloride of (b), there is used 16.75 parts of itaconic dichloride, together with 43 parts of 2,4-di-(dimethylamino)-6-(beta-aminoethylamino)-1,3,5-triazine and 37 parts of tributylamine, and according to the same procedure for the itaconyl monochloride, there is obtained the itaconic diamide of this triazine amine. Ultimate analyses for carbon, hydrogen, and nitrogen, and molecular weight determination give values which check closely with the theoretical values. When the various other triazinyl amines described above are substituted respectively in equivalent quantities in this foregoing procedure, the corresponding itaconic diamides are obtained.

(d) In place of the monomethyl itaconyl monochloride of (b), there is used an equivalent amount of mono-(dimethylamide)-itaconyl monochloride. (This monoamide can be prepared by reacting, mole per mole, dimethylamine and itaconic acid anhydride and subsequently converting the free acid group of the resulting mono-(dimethylamide)-itaconic mono-acid to an acid chloride group by the ordinary methods of converting acids to acyl chlorides, such as, for example, by reacting with thionyl chloride.) The procedure of (b) is followed to produce mono-(dimethylamide)-itaconyl monoamide of 2,4-di-(dimethylamino)-6-(beta-amino-ethylamine) - 1,3,5-triazine. Ultimate analyses for carbon, hydrogen, and nitrogen, and molecular weight determination show values which check closely with the theoretical values. Substitution of various other monoamides of itaconic acid, including the morpholino, piperidyl and piperazinyl monoamides, and of various other triazinyl amines, as described above for the monoamide and triazinyl amine of the foregoing procedure yields various itaconic mixed amide triazine monomers of this invention.

The following compounds of this invention, prepared according to the foregoing procedures, give values for ultimate analyses and molecular weight which check closely with the theoretical values:

Morpholino monoamide of itaconic monoamide of 2,4-diamino-6-(gamma-amino-propylamino) - 1,3,5 - triazine;

Piperidyl monoamide of itaconic monoamide of 2,4-di-(butyl - amino) - 6 - (gamma - amino - butylamino)-1,3,5-triazine;

Monobutyl ester of the itaconic monoamide of 2,4-di-dipropylamino) - 6 - (beta - amino-ethylphenylamino)-1,3,5-triazine;

Piperazinyl monoamide of itaconic monoamide of 2,4-di-(dimethylamino) - 6 - (beta-amino-ethylamino) - 1,3,5-triazine;

Other methods of preparing the triazine monomers of this invention can also be used. For example, the appropriate itaconic compound and an appropriate cyanuric chloride derivative, such as Cl—C₃N₃(NR₂)₂ can be reacted in accordance with conditions known in the art for this type of reaction to give the desired triazine monomer.

Various triazine monomers used hereinafter in the examples have the following structures:

Triazine Monomer III-G

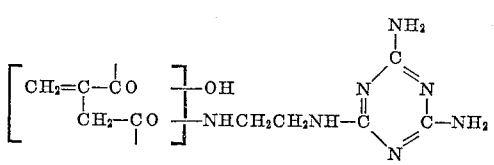

Triazine Monomer IV-G

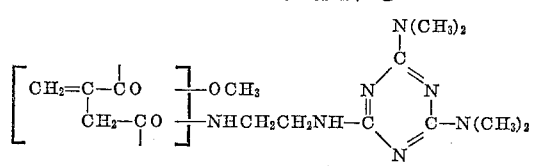

Triazine Monomer VI-G

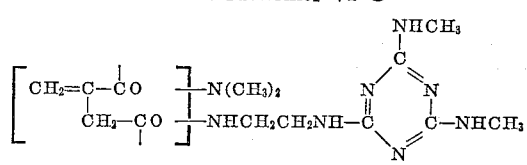

Triazine Monomer VII-G

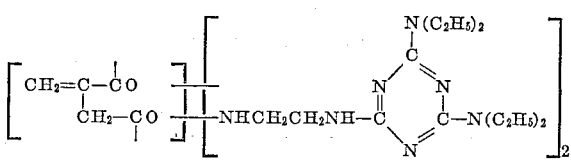

Triazine Monomer VIII-G

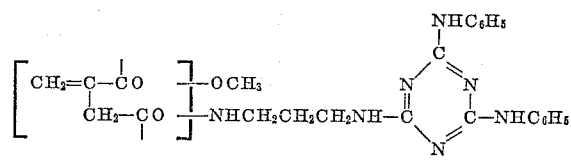

Triazine Monomer IX-G

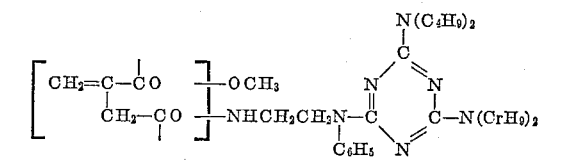

Triazine Monomer X-G

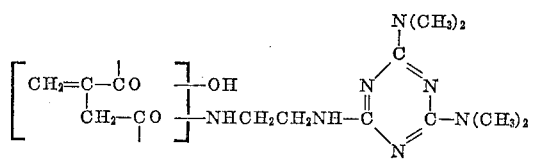

Triazine Monomer XI-G

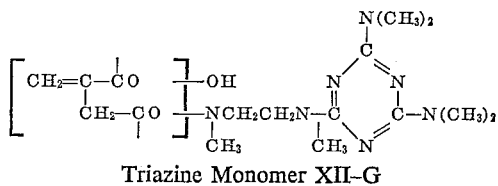

Triazine Monomer XII-G

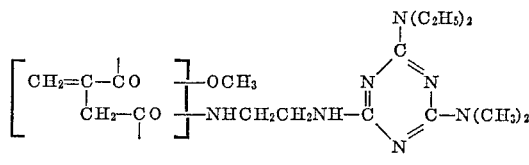

Triazine Monomer XIII-G

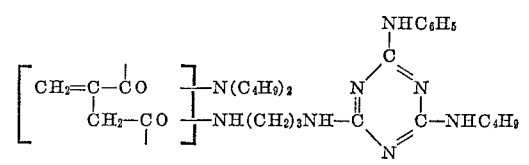

Triazine Monomer XIV-G

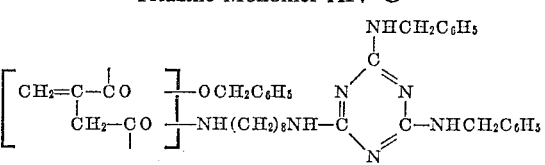

Triazine Monomer XV-G

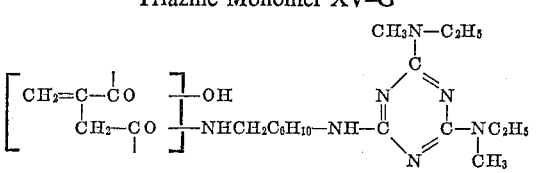

Triazine Monomer XVI-G

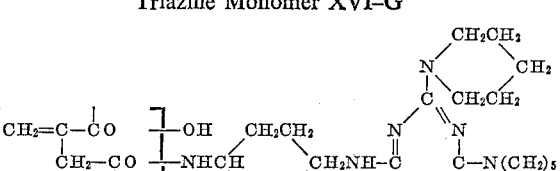

EXAMPLE I-h

*Preparation of Triazine Monomers*

(a) Itaconic anhydride (11.2 parts) in 50 parts of benzene is added slowly and with stirring to a mixture of 22.5 parts of 2,4-di-(dimethylamino)-6-(beta-hydroxy-ethoxy)-1,3,5-triazine and 150 pts. diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the itaconic acid monoester of the above triazine compound. Ultimate analyses for carbon, hydrogen, and nitrogen, and molecular weight determination give values which are in close agreement with the theoretical values.

Substitution of equivalent quantities of the various other triazinyl alcohols described above for the one used in the foregoing procedure yields various monoesters of itaconic acid of this invention. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl or other alkyl esters.

These esters may also be prepared as in the following procedure (b).

(b) Monomethyl itaconyl monochloride (16.3 parts) in 50 parts of diethyl ether is added slowly and with stirring to a mixture of 22.5 parts of 2,4-di-(dimethylamino)-6-(beta-hydroxyethoxy)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the ester again washed with water and the product recrystallized from acetone-water mixtures. There is obtained the monomethyl itaconic ester of 2,4-di - (dimethylamino) - 6 - (beta-hydroxyethoxy) - 1,3,5-triazine. Ultimate analyses for carbon, hydrogen, and nitrogen, and molecular weight determination give values which check closely with the theoretical values. Substitution of equivalent quantities of the various monoesters and of various triazinyl alcohols, as described above, for the monoester and triazinyl alcohol of the foregoing procedure yields various itaconic esters of this invention. These are characterized by ultimate analyses and molecular weight determinations as above.

(c) In place of the mono-acid chloride of (b), there is used 16.75 parts of itaconic dichloride, together with 45 parts of 2,4-di-(dimethylamino)-6-(beta-hydroxyethoxy)-1,3,5-triazine and 37 parts of tributyl amine, and according to the same procedure for the itaconyl monochloride, there is obtained the itaconic diester of this triazinyl alcohol. Ultimate analyses for carbon, hydrogen, and nitrogen, and molecular weight determination give values which check closely with the theoretical values. When the various other triazinyl alcohols described above are substituted respectively in equivalent quantities in this foregoing procedure, the corresponding itaconic diesters are obtained.

(d) In place of the monomethyl itaconyl monochloride of (b), there is used an equivalent amount of mono-(dimethylamide)-itaconyl monochloride. (This monoamide can be prepared by reacting, mole per mole, dimethylamine and itaconic acid anhydride and subsequently converting the free acid group of the resulting mono-(dimethylamide)-itaconic monoacid to an acid chloride group by the ordinary methods of converting acids to acyl chlorides, such as, for example, by reacting with thionyl chloride.) The procedure of (b) is followed to produce mono-(dimethylamide)-itaconic monoester of 2,4-di-(dimethylamino) - 6 - (beta-hydroxyethoxy)-1,3,5-triazine. Ultimate analyses for carbon, hydrogen, and nitrogen, and molecular weight determination show values which check closely with the theoretical values. Substitution of various other monoamides of itaconic acid, including the morpholino, piperidyl and piperazinyl monoamides, and of various other triazinyl alcohols, as described above for the monoamide and triazinyl alcohol of the foregoing procedure yields various itaconic amide ester triazine monomers of this invention.

The following compounds of this invention, prepared according to the foregoing procedures gives values for ultimate analyses and molecular weight which check closely with the theoretical values: morpholino monoamide of itaconic monoester of 2,4-diamino-6-(gamma-hydroxypropoxy)-1,3,5-triazine; piperidyl monoamide of itaconic monoester of 2,4-di-(dibutylamino)-6-(gamma-hydroxybutoxy)-1,3,5-triazine; monobutyl itaconic ester of 2,4-di-(dipropylamino) - 6 - (beta-hydroxy-butoxy)-1,3,5-triazine; piperazinyl monoamide of itaconic monoester of 2,4-di-(dimethylamino)-6-(beta-hydroxyethoxy)-1,3,5-triazine.

Other methods of preparing the triazine monomers of this invention can also be used. For example, the appropriate itaconyl hydrazido compound and an appropriate cyanuric chloride derivative such as

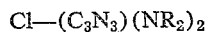

can be reacted in accordance with conditions known in the art for this type of reaction to give the desired triazine monomer.

Various triazine monomers used hereinafter in the examples have the following structures:

Triazine Monomer III–H

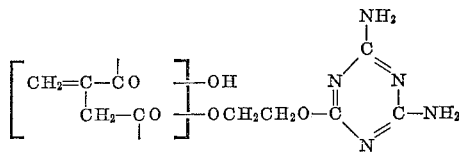

Triazine Monomer IV–H

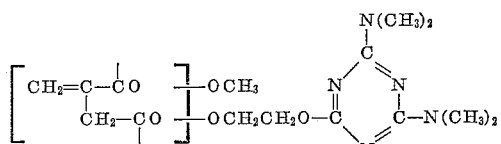

Triazine Monomer VI–H

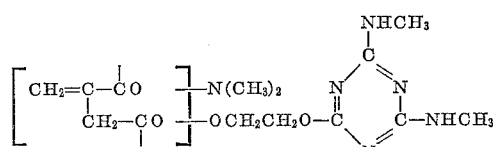

Triazine Monomer VII–H

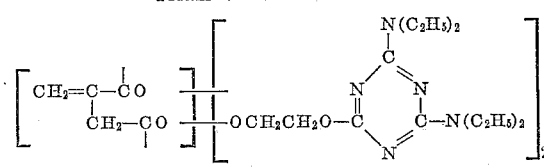

Triazine Monomer VIII–H

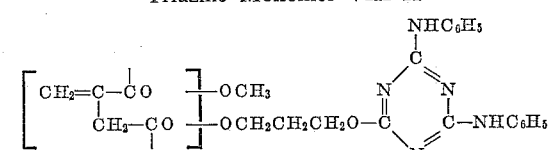

Triazine Monomer IX–H

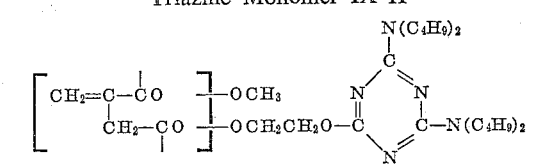

Triazine Monomer X–H

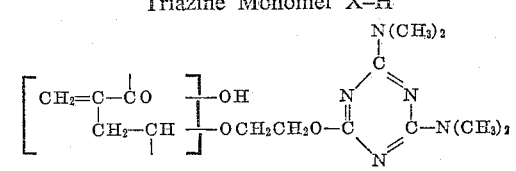

Triazine Monomer XI–H

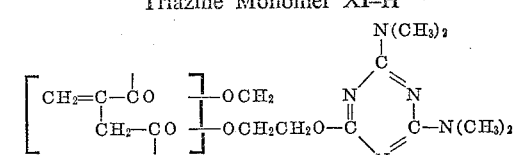

Triazine Monomer XII–H

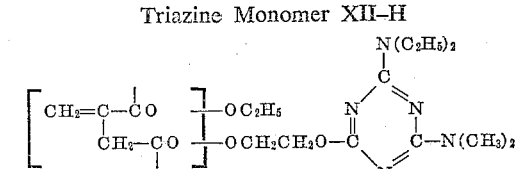

Triazine Monomer XIII–H

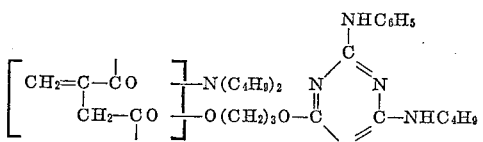

Triazine Monomer XIV–H

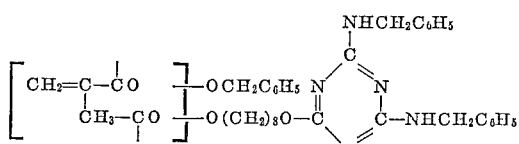

Triazine Monomer XV–H

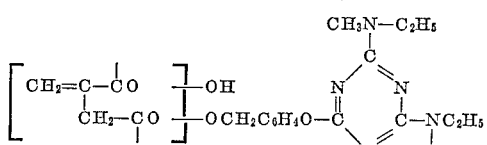

Triazine Monomer XVI–H

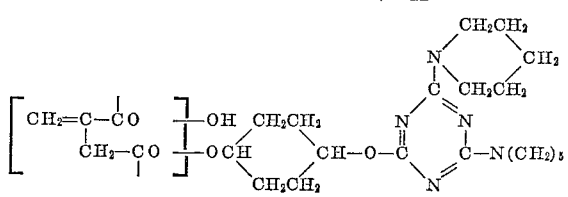

EXAMPLE I-i

*Preparation of Triazine Monomers*

(a) Itaconic anhydride (11.2 parts) in 50 parts of benzene is added slowly and with stirring to a mixture of 22.5 parts of 2,4-bis-(dimethylamino)-6-(beta-aminoethoxy)-1,3,5-triazine and 150 parts of dioxane. Upon completion of the addition of the anhydride, the mixture is refluxed for approximately one hour, after which it is allowed to cool to room temperature. The dioxane and benzene are then evaporated and the amide is recrystallized from dioxane-water mixtures. There is obtained the itaconic acid monoamide of the above triazine compound. Ultimate analyses for carbon, hydrogen, and nitrogen, and molecular weight determination give values which are in close agreement with the theoretical values.

Substitution of equivalent quantities of the various other triazinyl amines described above for the one used in the foregoing procedure yields various monoamides of itaconic acid of this invention. These are identified by ultimate analyses and molecular weight determinations as above. These mono-acid amides can be used as such or can be converted to alkyl esters by reacting their sodium salts in the standard manner, with dialkyl sulfates, as, for example, with dimethyl or diethyl sulfate to produce the corresponding methyl, ethyl, or other alkyl esters. These esters may also be prepared as in the following procedure (b).

(b) Monomethyl itaconyl monochloride (16.3 parts) in 50 parts of diethyl ether is added slowly and with stirring to a mixture of 22.5 parts of 2,4-bis-(dimethylamino)-6-(beta-aminoethoxy)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the amide again washed with water and the product recrystallized from acetone-water mixtures. There is obtained the monomethyl ester of the itaconic monoamide of 2,4-bis-(dimethylamino)-6-(beta-aminoethoxy)-1,3,5-triazine. Ultimate analyses for carbon, hydrogen, and nitrogen, and molecular weight determination, give values which check closely with the theoretical values. Substitution of equivalent quantities of the various itaconic monoesters and of various triazinyl amines, as described above, for the monoester and triazinyl amine of the foregoing procedure yields various itaconic ester-amides of this invention. These are characterized by ultimate analyses and molecular weight determinations as above.

(c) In place of the mono-acid chloride of (b), there is used 16.75 parts of itaconic dichloride, together with 45 parts of 2,4-bis-(dimethylamino)-6-(beta-aminoethoxy)-1,3,5-triazine and 37 parts of tributyl amine, and according to the same procedure for the itaconyl monochloride, there is obtained the itaconic diamide of this triazinyl amine. Ultimate analyses for carbon, hydrogen, and nitrogen, and molecular weight determination give values which check closely with the theoretical values. When the various other triazinyl amines described above are substituted respectively in equivalent quantities in this foregoing procedure, the corresponding itaconic diamides are obtained.

(d) In place of the monomethyl itaconyl monochloride of (b), there is used an equivalent amount of mono-(dimethylamido)-itaconyl monochloride. (This monoamide can be prepared by reacting, mole per mole, dimethylamine and itaconic acid anhydride and subsequently converting the free acid group of the resulting mono-(dimethylamido)-itaconic mono-acid to an acid chloride group by the ordinary methods of converting acids to acyl chlorides, such as, for example, by reacting with thionyl chloride.) The procedure of (b) is followed to produce mono-(dimethylamido)-itaconic monoamide of 2,4-bis-(dimethylamino)-6-(beta-aminoethoxy)-1,3,5-triazine. Ultimate analyses for carbon, hydrogen, and nitrogen, and molecular weight determination, show values which check closely with the theoretical values. Substitution of various other monoamides of itaconic acid, including the morpholino, piperidyl, and piperazinyl monoamides, and of various other triazinyl amines, as described above for the monoamide monochloride and triazinyl amine of the foregoing procedure yields various itaconic mixed diamide triazine monomers of this invention.

The following compounds of this invention, prepared according to the foregoing procedures, show ultimate analyses and molecular weight values which check closely with the theoretical values: morpholino monoamide of itaconic monoamide of 2,4-diamino-6-(gamma-aminopropoxy)-1,3,5-triazine; piperidyl monoamide of itaconic monoamide of 2,4-bis-(dibutylamino)-6-(gamma-amino-n-butoxy)-1,3,5-triazine; and piperazinyl monoamide of itaconic monoamide of 2,4-bis-(dimethylamino)-6-(beta-aminoethoxy)-1,3,5-triazine.

Methods other than shown above can also be used for preparing the amides of this invention. For example

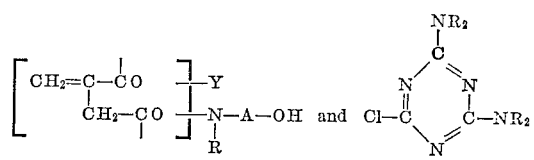

can be reacted together under conditions known in the art for similar condensations to give triazine monomers of this invention.

Various triazine monomers used hereinafter in the examples have the following formulas in which $C_3N_3$ represents the symmetrical trivalent triazine nucleus:

Triazine Monomer III-I

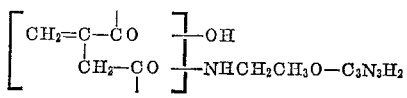

Triazine Monomer IV-I

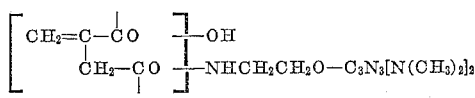

Triazine Monomer VI-I

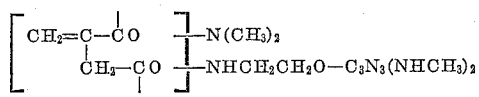

Triazine Monomer VII-I

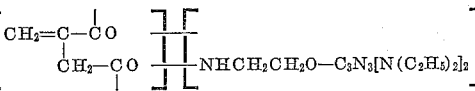

Triazine Monomer VIII-I

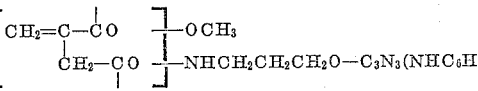

Triazine Monomer IX-I

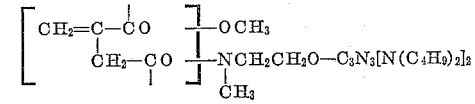

Triazine Monomer X-I

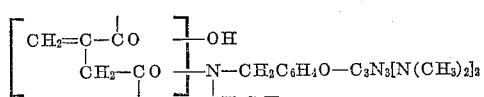

Triazine Monomer XI-I

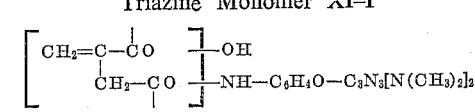

Triazine Monomer XII-I

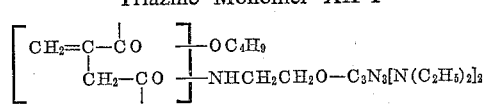

Triazine Monomer XIII-I

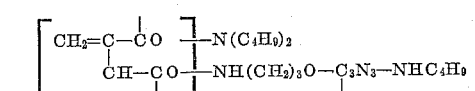

Triazine Monomer XIV-I

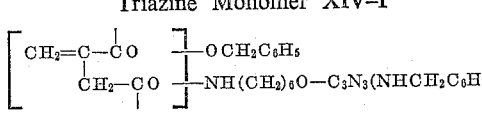

Triazine Monomer XV-I

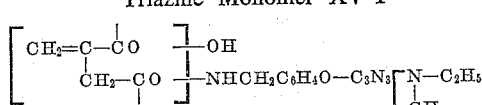

Triazine Monomer XVI-I

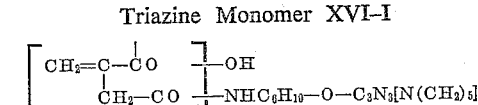

EXAMPLE I-j

*Preparation of Triazine Monomers*

(a) Itaconic anhydride (11.2 parts) in 50 parts of benzene is added slowly and with stirring to a mixture of 27.3 parts of 2,4-bis-(dimethylamino)-6-(meta-aminophenylamino)-1,3,5-triazine, and 150 parts diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the itaconic acid monoamide of the above triazine compound. Ultimate analyses for carbon, hydrogen, and nitrogen, and molecular weight determination give values which are in close agreement with the theoretical values.

Substitution of equivalent quantities of the various other triazinyl amines described above for the one used in the foregoing procedure yields various monoamides of itaconic acid of this invention. These are identified by ultimate analyses and molecular weight determinations as above. These acid monoamides can be used as such or can be converted to alkyl esters by reacting their sodium salts in the standard manner, with dialkyl sulfates, as for example, with dimethyl or diethyl sulfate to produce the corresponding methyl, ethyl, or other alkyl esters. These esters can also be prepared as in the following procedure (b).

(b) Monomethyl itaconyl monochloride (16.3 parts) in 150 parts of diethyl ether is added slowly and with stirring to a mixture of 27.3 parts of 2,4-di-(dimethylamino) - 6-(ortho-aminophenylamino)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the ester-amide again washed with water, and the product recrystallized from acetone-water mixtures. There is obtained the monomethyl ester itaconic amide of 2,4-di-(dimethylamino)-6-(ortho-aminophenylamino)-1,3,5-triazine. Ultimate analyses for carbon, hydrogen, and nitrogen, and molecular weight determination, give values which check closely with the theoretical values. Substitution of equivalent quantities of the various monoesters and of various triazinyl amines, as described above, for the monoester and triazinyl amine of the foregoing procedure yields various itaconic ester-amides of this invention. These are characterized by ultimate analyses and molecular weight determinations as above.

(c) In place of the mono-acid chloride of (b), there is used 16.75 parts of itaconic dichloride, together with 54.6 parts of 2,4-di-(dimethylamin)-6-(ortho-aminophenylamino)-1,3,5-triazine and 37 parts of tributyl amine, and according to the same procedure for the itaconyl monochloride, there is obtained the itaconic diamide of this triazinyl amine. Ultimate analyses for carbon, hydrogen, and nitrogen, and molecular weight determination, give values which check closely with the theoretical values. When the various other triazinyl amines described above are substituted respectively in equivalent quantities in this foregoing procedure, the corresponding itaconic di-amides are obtained.

(d) In place of the monomethyl itaconyl monochloride of (b), there is used an equivalent amount of mono-(dimethylamide)-itaconyl monochloride. (This monoamide can be prepared by reacting, mole per mole, dimethylamine and itaconic acid anhydride and subsequently converting the free acid chloride group by the ordinary methods of converting acids to acyl chlorides, such as, for example, by reacting with thionyl chloride.) The procedure of (b) is followed to produce mono-(dimethylamide)-itaconic monoamide of 2,4-di-(dimethylamino)-6 - (ortho-aminophenylamino)-1,3,5-triazine. Ultimate analyses for carbon, hydrogen, and nitrogen, and molecular weight determination, show values which check closely with the theoretical values. Substitution of various other monoamides of itaconic acid, including the morpholino, piperidyl, and piperazinyl monoamides, and of various other triazinyl amines, as described above, for the monoamide and triazinyl amine of the foregoing procedure yields various itaconic mixed diamide triazine monomers of this invention.

The following compounds of this invention, prepared according to the foregoing procedures, show analytical and molecular weight values which check closely with the theoretical values: morpholino monoamide of itaconic monoamide of 2,4-diamino-6-(ortho-methyl-phenylamino)-1,3,5-triazine; piperidyl monoamide of itaconic monoamide of 2,4-di-(dibutylamino)-6-(para-phenylamino)-1,3,5-triazine; monobutyl ester itaconic monoamide of 2,4-bis-(dipropylamino) - 6 - (para-beta-amino-ethylphenylamino)-1,3,5-triazine; piperazinyl monoamide of itaconic monoamide of 2,4-bis-(dimethylamino)-6-(2-naphthylamino)-1,3,5-triazine.

Other methods can also be used for preparing the amides of this invention. For example, the appropriate itaconyl amide of an aryl diamine, etc., can be reacted with a cyanuric chloride derivative of the formula Cl—$C_3N_3(NR_2)_2$ under conditions known in the art for such condensations.

Various triazine monomers used hereinafter in the examples have the following structures:

Triazine Monomer III-J

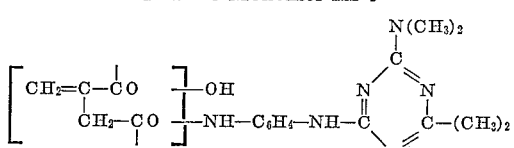

Triazine monomer IV-J

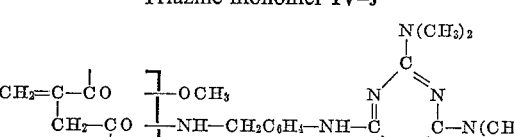

Triazine monomer VI-J

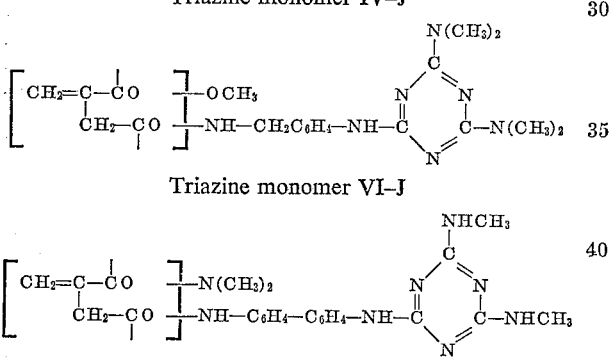

Triazine Monomer VII-J

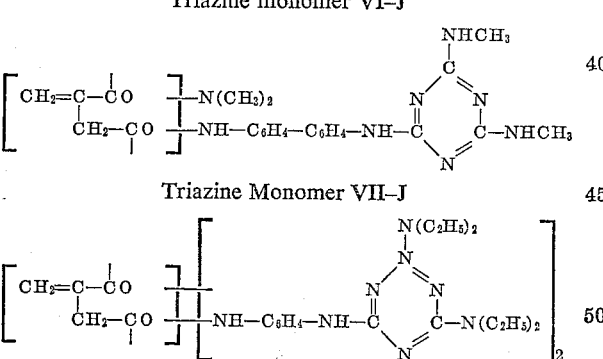

Triazine Monomer VIII-J

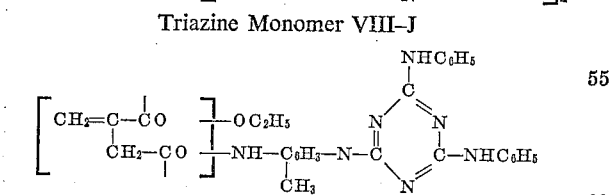

Triazine Monomer IX-J

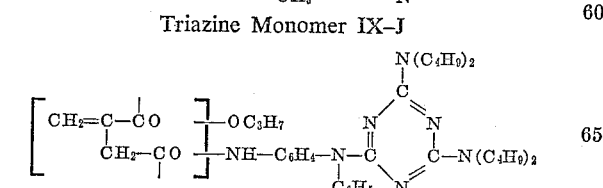

Triazine Monomer X-J

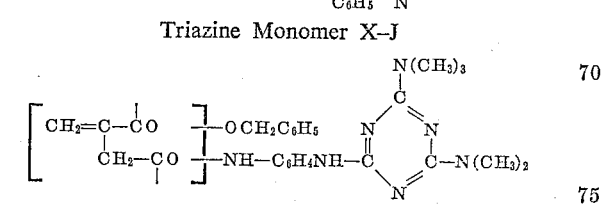

Triazine Monomer XI-J

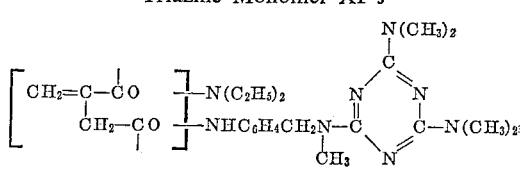

Triazine Monomer XII-J

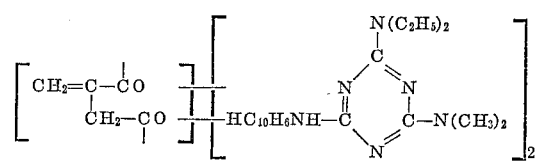

Triazine Monomer XIII-J

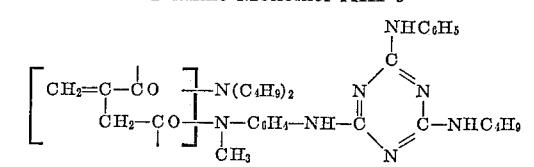

Triazine Monomer XIV-J

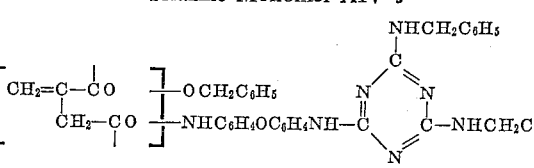

Triazine Monomer XV-J

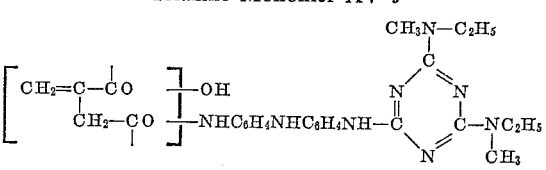

Triazine Monomer XVI-J

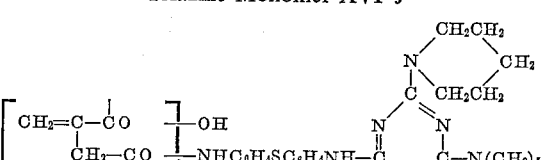

EXAMPLE I-k

*Preparation of Triazine Monomer*

Beta-cyano-acrylyl chloride (23.1 parts) in 50 parts diethyl ether is added slowly and with stirring to a mixture of 45.2 parts of 2,4-bis-(dimethylamino)-6-beta-hydroxyethylamino-1,3,5-triazine and 150 parts of diethyl ether containing 37 parts of tributyl amine. Upon completion of the addition of the acrylyl chloride the mixture is refluxed for approximately one-half hour and allowed to cool to room temperature, after which it is washed with water to remove the amine hydrochloride. The ether is then evaporated and the ester again washed with water and recrystallized from acetone-water mixtures. There is obtained 2,4-bis-(dimethylamino)-6-beta-(beta-cyanoacryloxy)-ethylamino - 1,3,5 - triazine. Ultimate analyses for carbon, hydrogen and nitrogen give values of 51.20%, 6.28%, and 32.25% respectively, and molecular weight determination gives a value of 304.5, all of which values check closely with theoretical values.

Substitution of an equivalent quantity of beta-cyanomethacrylyl chloride in the foregoing procedure yields the corresponding triazine monomer, for which ultimate analyses show values of 52.72%, 6.65% and 30.85% respectively for carbon, hydrogen and nitrogen, and molecular weight determination shows a value of 320.1, all of which values check closely with the theoretical values.

In a similar fashion, 2,4-diamino-6-beta-(betacyanoacryloxy)-ethylamino-1,3,5-triazine is prepared by reacting (without using the tributyl amino) beta-cyanoacrylic anhydride with 2,4-diamino-6-(beta-hydroxy-ethylamino)-1,3,5-triazine, representing specific monomers of the structure

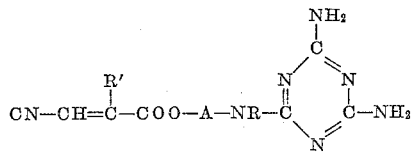

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

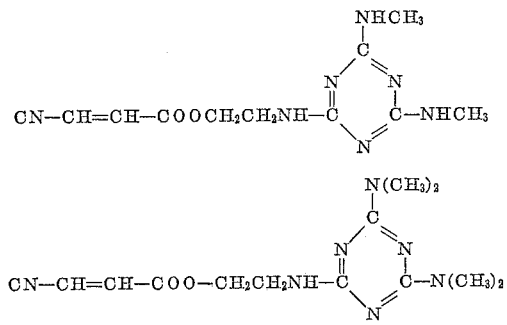

Various other triazine monomers of this invention can be prepared by the foregoing procedure using the appropriate beta-cyano acrylic and triazine intermediates. For example the following monomers prepared accordingly are identified by the analyses and molecular weight indicated:

(a) 2,4-di-(diethylamino) - 6 - [gamma-(betacyanoacryloxy)-propylamino]-1,3,5-triazine; carbon, hydrogen, nitrogen and molecular weight values of 57.66%, 7.80%, 26.23% and 376, respectively;

(b) 2,4-di(phenylamino) - 6 - (beta-cyanoacryloxyethylphenylamino)-1,3,5-triazine; carbon, hydrogen, nitrogen and molecular weight values of 67.98%, 4.88%, 20.75% and 476.5, respectively;

(c) 2,4-di-(monomethylamino) - 6 - [beta-(betacyanoacryloxy)-ethylamino]-1,3,5-triazine; carbon, hydrogen, nitrogen and molecular weight values of 47.7%, 5.46%, 35.52% and 276.4, respectively;

(d) 2,4-di(diethylamino) - 6 - [beta-(betacyanoacryloxy)-ethylamino]-1,3,5-triazine; carbon, hydrogen, nitrogen and molecular weight values of 56.63%, 7.53%, 27.35% and 359.6, respectively;

(e) 2,4-di-amino - 6 - [beta-(betacyanoacryloxy)-ethylamino]-1,3,5-triazine; carbon, hydrogen, nitrogen and molecular weight values of 43.49%, 4.48%, 39.54% and 248.3, respectively.

Other methods of preparing the triazine monomers of this invention can be used. For example, beta-cyanoacrylic acid anhydride, as well as the corresponding beta-cyano-alpha-methyl (beta-cyano-methacrylic) and beta-cyano-alpha-chloro (beta-cyano-chloracrylic) homologs can be used, according to well-known techniques for producing esters, with appropriate triazinyl alcohols to give desired monomers. In certain cases, the triazine monomer can also be prepared by reacting an ester such as methyl beta-cyano-acrylate with a triazinyl alcohol to give the corresponding monomer by displacement of methyl alcohol. In other cases where a stable amino-ester of beta-cyano-acrylic acid can be isolated, such as $$CN-CH=CH-COOCH_2CH_2NH_2$$

it can be reacted with a cyanuric chloride derivative

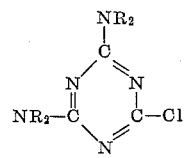

in the presence of an hydrohalide acceptor, such as NaOH, to produce triazine monomers by well-known procedures.

Typical symmetrical triazine alcohols that can be used to give desired monomers of this invention include:

(1) 2,4-di(methylamino)-6-(beta-hydroxy - ethylamino)-1,3,5-triazine;
(2) 2,4-bis-(dimethylamino)-6-(beta - hydroxy - ethylamino)-1,3,5-triazine;
(3) 2,4-di-(ethylamino)-6-(gamma - hydroxy - propylamino)-1,3,5-triazine;
(4) 2,4-di-(butylamino)-6-(beta-hydroxy - ethylamino)-1,3,5-triazine;
(5) 2.4-bis-(dimethylamino)-6-(gamma - hydroxy - propylamino)-1,3,5-triazine;
(6) 2,4-di-(phenylamino)-6-(N-methyl - beta - hydroxyethylamino)-1,3,5-triazine;
(7) 2,4-di-(phenylamino)-6 - (omega - hydroxy - octylamino)-1,3,5-triazine;
(8) 2,4-bis-(diethylamino)-6-[para - (beta - hydroxyethyl)-phenylamino]-1,3,5-triazine.

Various triazine monomers used hereinafter in the examples have the following structures:

Triazine Monomer III-K

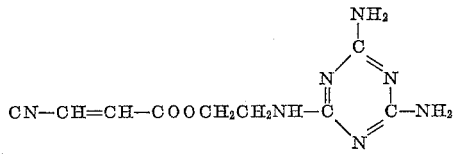

Triazine Monomer IV-K

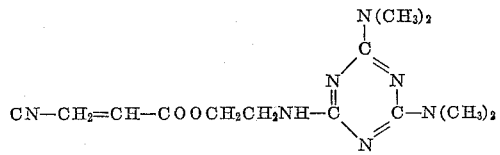

Triazine Monomer VI-K

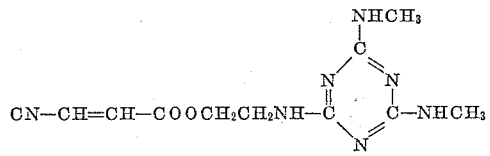

Triazine Monomer VII-K

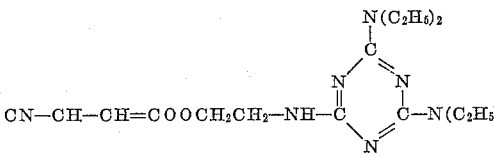

Triazine Monomer VIII-K

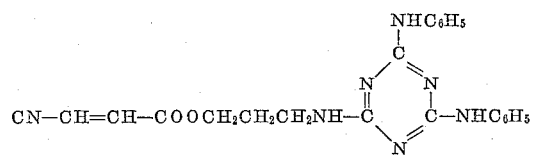

Triazine Monomer IX-K

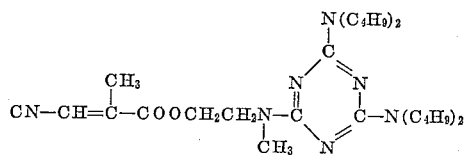

Triazine Monomer X-K

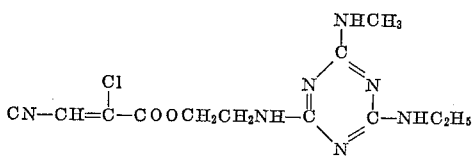

Triazine Monomer XI-K

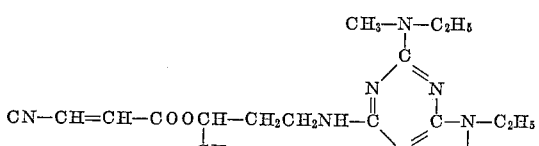

Triazine Monomer XII-K

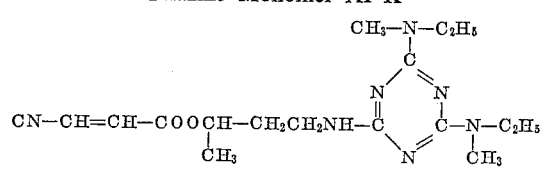

Triazine Monomer XIII-K

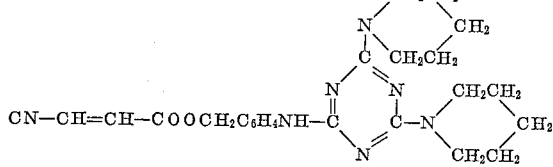

Triazine Monomer XIV-K

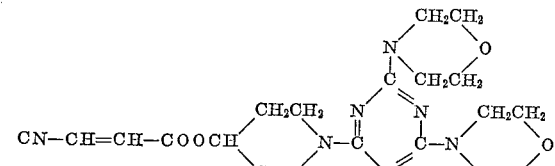

Triazine Monomer XV-K

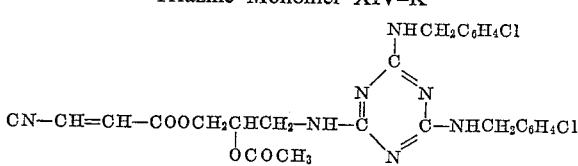

Triazine Monomer XVI-K

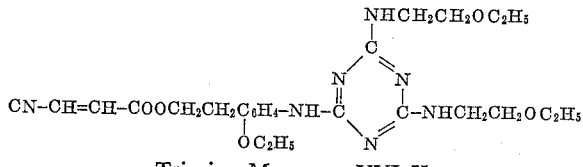

EXAMPLE I-*l*

*Preparation of Triazine Monomer*

Beta-cyano-acrylyl chloride (23.1 parts) in 150 parts of diethyl ether is added slowly and with stirring to a mixture of 43 parts of 2,4-bis-(dimethylamino)-6-(beta-aminoethylamino)-1,3,5-triazine and 150 parts of diethyl ether containing 37 parts of tributyl amine. Upon completion of the addition of the acid chloride the mixture is refluxed for approximately one-half hour and allowed to cool to room temperature, after which it is washed with water to remove the amine hydrochloride. The ether is then evaporated and the ester again washed with water and recrystallized from acetone-water mixtures. There is obtained 2,4-bis(dimethylamino)-6-[beta-(beta-cyano-acrylamido)-ethylamino]-1,3,5-triazine. Ultimate analyses for carbon, hydrogen and nitrogen and molecular weight determination give values of 51.52%, 6.51%, 36.95% and 304.6, respectively, all of which values are in close agreement with the theoretical values.

Substitution of an equivalent quantity of beta-cyanomethacrylyl chloride for the acrylyl chloride in the foregoing procedure, yields the corresponding triazine monomer. Ultimate analyses and molecular weight determination give 52.73% carbon, 6.85% hydrogen, 35.32% nitrogen, and molecular weight of 317.2, all of which values check closely with the theoretical. The corresponding chloracrylic triazine monomer is prepared by the use of b-cyano-chloracrylyl chloride.

In a similar fashion, 2,4-diamino-6-[beta-(beta-cyano-acrylamido)-ethylamino]-1,3,5-triazine is prepared by reacting beta-cyano-acrylyl chloride with 2,4-diamino-6-(beta-aminoethylamino) - 1,3,5 - triazine. This product represents specific monomers of the structure $$CN-CH=CH-CON-A-NR-\underset{\underset{N}{\parallel}}{\overset{NH_2}{\underset{N}{C}}}\underset{N}{\overset{N}{=}}C-NH_2$$
(with R on the nitrogen)

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

$$CN-CH=CH-CONHCH_2CH_2NH-\underset{N}{\overset{NHCH_3}{C}}\cdots C-NHCH_3$$

$$CN-CH=CH-CONHCH_2CH_2NH-\underset{N}{\overset{N(CH_3)_2}{C}}\cdots C-N(CH_3)_2$$

Various other triazine monomers of this invention can be prepared by the foregoing procedure using the appropriate beta-cyano-acrylic and triazine intermediates. For example, the following monomers prepared accordingly are identified by the analyses and molecular weights indicated, all of which check closely with the theoretical values:

(*a*) 2,4-bis-(dibutylamino) - 6 - [beta - (beta - cyano-acrylamido)-ethylamino]-1,3,5-triazine, with carbon, hydrogen, nitrogen and molecular weight values of 63.78%, 9.27%, 23.89% and 473.4, respectively;

(*b*) 2,4-bis-(diethylamino) - 6 - [beta - (beta - cyano-acrylamido)-ethylamino]-1,3,5-triazine, with carbon, hydrogen, nitrogen and molecular weight values of 56.67%, 7.84%, 31.21% and 359.4, respectively;

(*c*) 2,4-diphenylamino-6-[beta - (beta - cyano - acrylamido)-ethylamino]-1,3,5-triazine, with carbon, hydrogen, nitrogen and molecular weight values of 63.16%, 5.08%, 27.91% and 398.8, respectively;

(*d*) 2,4-dipiperidyl-6-[beta-(beta - cyano - chloracrylamido)-propylamino]-1,3,5-triazine, with carbon, hydrogen, nitrogen, chlorine and molecular weight values of 55.45%, 6.78%, 25.98%, 8.16% and 431.7, respectively;

(e) 2,4-bis-(methylethylamino)-6-[beta-(beta - cyanoacrylamido)-alpha-phenyl-ethylamino]-1,3,5-triazine, with carbon, hydrogen, nitrogen and molecular weight values of 61.67%, 6.79%, 27.52% and 407.1, respectively.

Other methods of preparing the triazine monomers of this invention can be used. For example, beta-cyanoacrylic acid anhydride, as well as the corresponding alpha-methyl (methacrylic) and alpha-chloro (chloracrylic) homologs can be used, according to well-known techniques for producing amides, with appropriate triazinyl amines to give desired triazine monomers. In certain cases, the triazine monomer can also be prepared by reacting an amide, such as N,N-dimethyl beta-cyanoacrylamide, with a triazinyl amine to give the corresponding triazine monomer by displacement of dimethyl amine. In other cases, where a stable amino-amide of beta-cyanoacrylic acid can be isolated, such as

CN—CH=CH—CONHCH$_2$CH$_2$NH$_2$ it can be reacted with a cyanuric chloride derivative

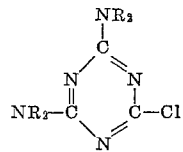

in the presence of an hydrohalide acceptor, such as NaOH, to produce triazine monomers by well-known procedures.

Typical triazinyl amines that can be used to give desired monomers of this invention include:

(1) 

(2) NH$_2$(CH$_2$)$_6$NH—C$_3$N$_3$(NHCH$_3$)$_2$ (3) 
```
    CH₂CH₂        CH₂CH₂
NH⟨      ⟩N—C₃N₃(N⟨      ⟩O)₂
    CH₂CH₂        CH₂CH₂
```

(4) NH$_2$—CH$_2$CH$_2$—N—C$_3$N$_3$(NHC$_6$H$_5$)$_2$
       |
       CH$_2$
       |
    CH$_3$COO—CH$_2$ (5) 
```
              CH₂CH₂
CH₃—NH—CH⟨      ⟩CHNH—C₃N₃(NHCH₃)₂
              CH₂CH₂
```

(6) NH$_2$—CH$_2$CH—CH$_2$NH—C$_3$N$_3$[N(C$_4$H$_9$)$_2$]$_2$
              |
              C$_6$H$_5$ (7) 
```
    CH₂CH₂
NH⟨      ⟩CH—NH—C₂N₃[N(CH₃)₂]₂
    CH₂CH₂
```

Various triazine monomers used hereinafter in the examples have the following structures:

Triazine Monomer III-L

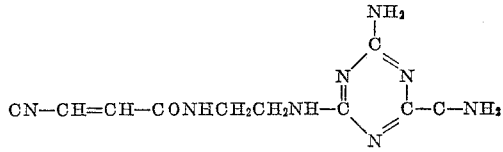

Triazine Monomer IV-L

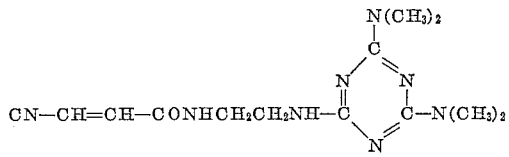

Triazine Monomer VI-L

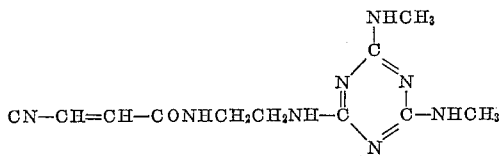

Triazine Monomer VII-L

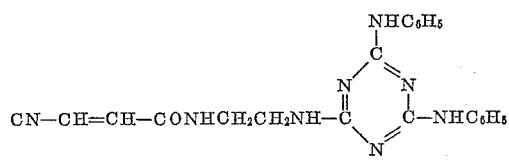

Triazine Monomer VIII-L

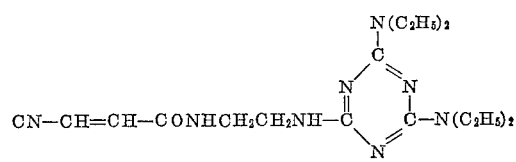

Triazine Monomer IX-L

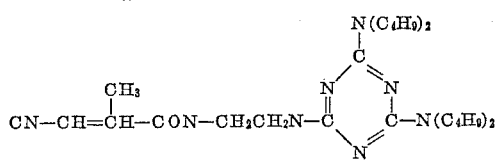

Triazine Monomer X-L

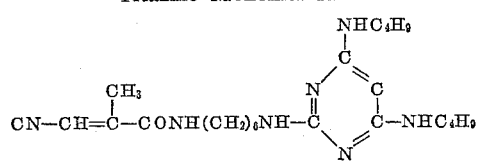

Triazine Monomer XI-L

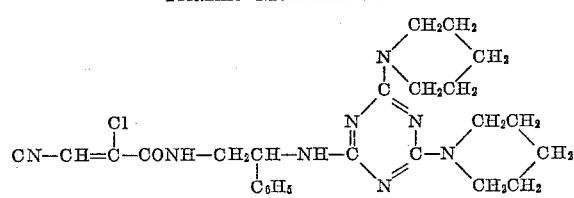

Triazine Monomer XII-L

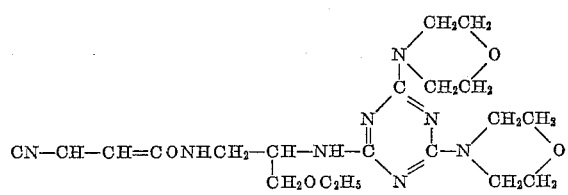

Triazine Monomer XIII-L

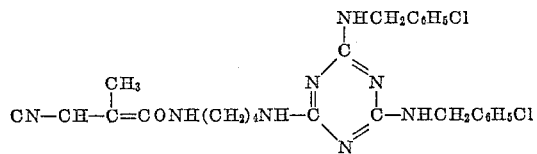

Triazine Monomer XIV-L

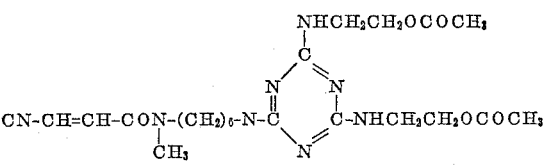

Triazine Monomer XV-L

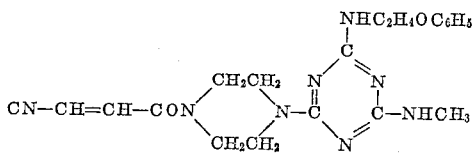

Triazine Monomer XVI-L

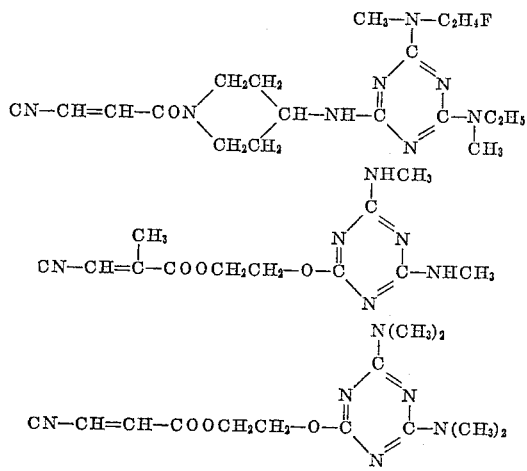

Various other triazine monomers of this invention can be prepared by the foregoing procedures using the appropriate beta-cyano-acrylic and triazine intermediates. For example, the following monomers prepared according to Example I are identified by the analyses and molecular weights indicated, all of which check closely with the theoretical values:

(a) 2,4 - diamino - 6 - [beta - (beta - cyano - acryloxy)-ethoxy] - 1,3,5 - triazine, with carbon, hydrogen, nitrogen and molecular weight values of 43.28%, 4.09%, 33.72% and 248.8, respectively;

(b) 2,4 - bis - (phenylamino) - 6 - [beta - (beta - cyano-acryloxy)-ethoxy]-1,3,5-triazine, with carbon, hydrogen, nitrogen and molecular weight values of 62.61%, 4.59%, 21.03% and 401.1, respectively;

(c) 2,4 -bis - (diethylamino) - 6 - [gamma - (beta-cyano-acryloxy)-propoxy]-1,3,5-triazine, with carbon, hydrogen, nitrogen and molecular weight values of 57.52%, 7.46%, 22.45% and 374.9, respectively;

(d) 2,4 - dimorpholino - 6 - [beta - (beta-cyano-alpha-chloro - acryloxy) - ethylphenoxy] - 1,3,5 - triazine, with carbon, hydrogen, nitrogen, chlorine, and molecular weight values of 55.19%, 4.88%, 16.74%, 7.09% and 501.8, respectively;

(e) 2,4 - dipiperadinyl - 6 - [beta - (beta - cyano-acryloxy) - alpha - acetoxy - ethoxy] - 1,3,5 - triazine, with carbon, hydrogen, nitrogen, and molecular weight values of 56.66%, 6.28%, 19.03% and 445.2, respectively.

EXAMPLE I-m

*Preparation of Triazine Monomer*

Beta-cyano-acrylyl chloride (23.1 parts) in 150 parts of diethyl ether is added slowly and with stirring to a mixture of 45.2 parts of 2,4-bis-(dimethylamino)-6-(beta-hydroxyethoxy)-1,3,5-triazine and 150 parts of diethyl ether containing 37 parts of tributyl amine. Upon completion of the addition of the acid chloride, the mixture is refluxed for approximately one-half hour and allowed to cool to room temperature, after which it is washed with water to remove the amine hydrochloride. The ether is then evaporated and the ester again washed with water and recrystallized from acetone-water mixtures. There is obtained 2,4 - bis - (dimethylamino) - 6 - [beta-(beta-cyano-acryloxy)-ethoxy]-1,3,5-triazine. Ultimate analyses for carbon, hydrogen, and nitrogen and molecular weight determination give values of 50.89%, 5.87%, 27.58% and 306.9, respectively, all of which values are in close agreement with the theoretical values.

Substitution of an equivalent quantity of beta-cyano-methacrylyl chloride for the acrylyl chloride in the foregoing procedure yields the corresponding triazine monomer. Ultimate analyses and molecular weight determination give values of 52.56% carbon, 6.23% hydrogen, 26.37% nitrogen, and molecular weight of 321.1, all of which values check closely with the theoretical values. The corresponding chloroacrylic derivative is prepared by the use of beta-cyano-chloracrylyl chloride.

In a similar fashion, 2,4-diamino-6-[beta-(beta-cyano-acryloxy)-ethoxy]-1,3,5-triazine is prepared by reacting 2,4 - diamino-6-(beta-hydroxy-ethoxy)-1,3,5-triazine with beta-cyano-acrylyl chloride.

Other methods of preparing the triazine monomers of this invention can be used. For example, beta-cyano-acrylic acid anhydride, as well as the corresponding alpha-methyl (methacrylic) and alpha-chloro (chloroacrylic) homologs can be used, according to well-known techniques for producing esters, with appropriate triazinyl alcohols to give desired triazine monomers. In certain cases, the triazine monomer can also be prepared by reacting a beta-cyano-acrylic ester, such as methyl beta-cyanoacrylate, with a triazinyl alcohol to give the corresponding triazine monomer by displacement of methanol. In other cases, where a stable alcohol-ester of a beta-cyano-acrylic acid can be isolated, such as $$CN—CH=CH—COOCH_2CH_2OH$$

it can be reacted with a cyanuric chloride derivative

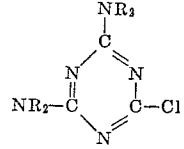

in the presence of an hydrohalide acceptor, such as NaOH, to produce triazine monomers by well-known procedures.

Typical triazinyl amines that can be used to give desired monomers of this invention include:

(1) 2,4,bis-(dimethylamino)-6-(beta-hydroxyethoxy)-1,3,5-triazine;
(2) 2,4-diamino-6-(beta-hydroxyethoxy)-1,3,5-triazine;
(3) 2,4-bis-(monomethylamino)-6-(gamma-hydroxypropoxy)-1,3,5-triazine;
(4) 2,4-di-phenylamino-6-(beta-hydroxy-alpha-phenyl-ethoxy)-1,3,5-triazine;
(5) 2,4-dimorpholino-6-(beta-hydroxy-alpha-methyl-ethoxy)-1,3,5-triazine;
(6) 2,4-dipiperazinyl-6-(beta-hydroxy-ethylphenoxy)-1,3,5-triazine; and
(7) 2,4-dipiperidinyl-6-(gamma-hydroxy-butoxy)-1,3,5-triazine.

Various triazine monomers used hereinafter in the examples have the following structures, in which $C_3N_3$ represents the trivalent symmetrical triazine radical:

Triazine Monomer III-M

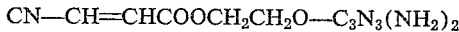

Triazine Monomer IV-M

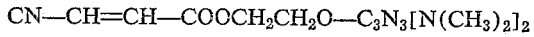

Triazine Monomer VI-M

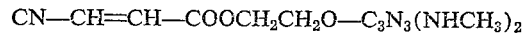

Triazine Monomer VII-M

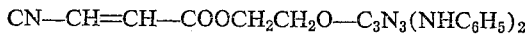

Triazine Monomer VIII-M

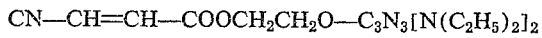

Triazine Monomer IX-M

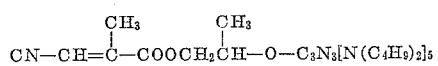

Triazine Monomer X-M

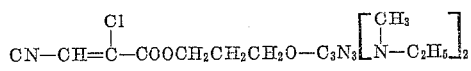

Triazine Monomer XI-M

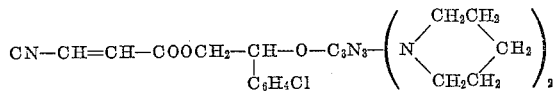

Triazine Monomer XII-M

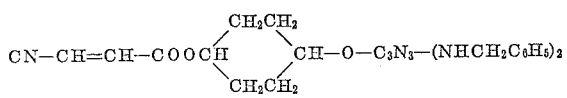

Triazine Monomer XIII-M

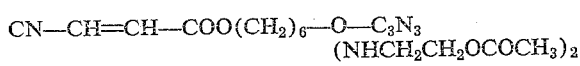

Triazine Monomer XIV-M

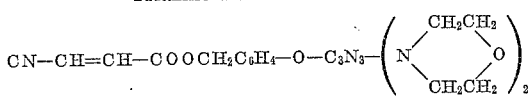

Triazine Monomer XV-M

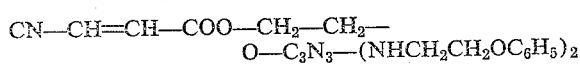

Triazine Monomer XVI-M

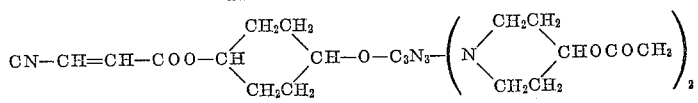

EXAMPLE I-n

*Preparation of Triazine Monomer*

2-chloro - 4,6 - dianilino - 1,3,5 - triazine (29.7 parts) is added to a mixture of 13 parts of beta-hydroxyethyl beta-cyanoacrylamide and 4 parts of sodium hydroxide in 250 parts of dioxane at 50° C. and the whole refluxed for three hours. (The beta-hydroxyethyl beta-cyanoacrylamide is readily prepared from beta-cyanoacrylyl chloride and ethanolamine or by the reaction of ethylene oxide with beta-cyanoacrylamide.) The reaction product is then concentrated by evaporating the dioxane under reduced pressure. Salts and other soluble materials are removed by washing the product with water, and the amide product is recrystallized from aqueous ethanol. Ultimate analyses for carbon, hydrogen and nitrogen and molecular weight determination give values of 62.93%, 4.72%, 24.46% and 401.8, all of which values check closely with the theoretical values for 2,4-dianilino-6-[beta-(beta-cyanoacrylamido)-ethoxy] - 1,3,5 - triazine.

When beta-hydroxyethylmethacrylamide is used in place of its homolog in the foregoing procedure, the corresponding 2,4-dianilino-6-[beta - (beta - cyanomethacrylamido)-ethoxy]-1,3,5-triazine is obtained, for which ultimate analyses and molecular weight determination give values of 63.64% carbon, 5.06% hydrogen, 23.62% nitrogen and molecular weight of 414.6, all of which values check closely with the theoretical values. The corresponding chloracryl triazine monomer is prepared by the use of the corresponding chloracryl intermediate.

The various other triazine monomers of this invention can be prepared by the foregoing procedure using the appropriate beta-cyano-acrylic and triazine intermediates. For example, the following monomers prepared accordingly are identified by the analyses and molecular weights indicated, all of which check closely with the theoretical values:

(a) 2,4-diamino - 6 - [beta-(beta-cyanoacrylamido)-ethoxy]-1,3,5-triazine, with carbon, hydrogen, nitrogen and molecular weight values of 43.32%, 4.43%, 39.25% and 248.4, respectively;

(b) 2,4-bis-(dimethylamino) - 6 - [beta-(beta-cyanoacrylamido)-ethoxy]-1,35-triazine, with carbon, hydrogen, nitrogen and molecular weight values of 51.22%, 6.24%, 32.07% and 305.7, respectively;

(c) 2,4-bis(methylamino) - 6 - [p - beta-(beta-cyanoacrylamido) - ethoxy-phenoxy]-1,3,5-triazine with carbon, hydrogen, nitrogen and molecular weight values of 57.72%, 5.36%, 27.83% and 353.6, respectively;

(d) 2,4-bis-(dimethylamino) - 6 - [beta-(beta-cyanomethacrylamido) - ethoxy]-1,3,5-triazine, with carbon, hydrogen, nitrogen and molecular weight values of 52.71%, 6.57%, 30.72% and 318.3, respectively;

(e) 2,4-bis-(phenylamino) - 6 - [gamma-(beta-cyanochloroacrylamido) - propoxy] - 1,3,5 - triazine, with carbon, hydrogen, nitrogen, chlorine and molecular weight values of 58.82%, 4.44%, 21.82%, 7.91% and 450.2, respectively.

Other methods of preparing the triazine monomers of this invention can be used. For example, beta-cyanoacrylic acid chloride or anhydride, as well as the corresponding beta-cyano - alpha - methyl (beta-cyano-methacrylic) or beta-cyano-alpha-chloro (beta - cyano - chloracrylic) acid chloride or anhydride, can be reacted with an amine of the formula

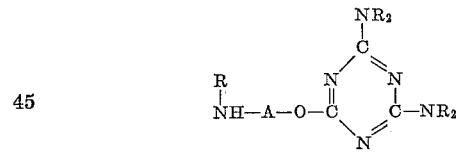

(wherein A and R are as defined above) in accordance with well-known procedures for making amides, to give the triazine amides of this invention. In certain cases, the triazinyl acrylic amide can also be prepared by reacting a beta-cyano-acrylamide, such as N,N-dimethyl-beta-cyanoacrylamide with a triazinyl amine of the above formula to give the corresponding triazine monomer by displacement of the dimethylamine. Typical triazinyl amines that can be used to give desired monomers of this invention include:

(1) $NH_2-CH_2CH_2O-C_3N_3(NHCH_3)_2$
(2) $NH_2-CH_2CH_2O-C_3N_3[N(CH_3)_2]_2$
(3) $NH_2-CH-CH_2O-C_3N_3[N(C_4H_9)_2]_2$
    $\quad\quad\ \ |$
    $\quad\quad CH_3$
(4) $NH_2-(CH_2)_6O-C_3N_3[N(C_2H_5)_2]_2$
(5) $CH_3-NH-CH_2CH_2O-C_3N_3(N\begin{smallmatrix}CH_2CH_2\\ \\CH_2CH_2\end{smallmatrix}CH_2)_2$
(6) $NH_2-CH_2-C_6H_4-O-C_3N_3(N\begin{smallmatrix}CH_2CH_2\\ \\CH_2CH_2\end{smallmatrix}O)_2$
(7) $NH_2-(CH_2)_4O-C_3N_3(NHC_6H_5)_2$
(8) $NH_2-(CH_2)_3O-C_3N_3(NHCH_2C_6H_5)_2$
(9) $CH_3-NH_2-(CH_2)_6O-C_3N_3(NHCH_2CH_2OCOCH_3)_2$
(10) $CH_3-NHC_6H_4O-C_3N_3(NHCH_2CH_2OC_2H_5)_2$ 2,4-diamino - 6 [beta-(beta-cyanoacrylamido)-ethyl-amino]-1,3,5-triazine represents monomers of the structure

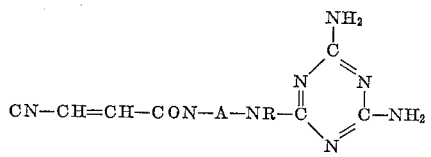

in which the amino groups are unsubstituted. These compounds containing unsubstituted 2,4-amino groups are very useful in the preparation of homopolymers and certain copolymers, but because of their reduced solubility in other monomers, those triazinyl derivatives are preferred in which at least one, and preferably both hydrogens of the amino group are substituted by hydrocarbon groups, e.g.:

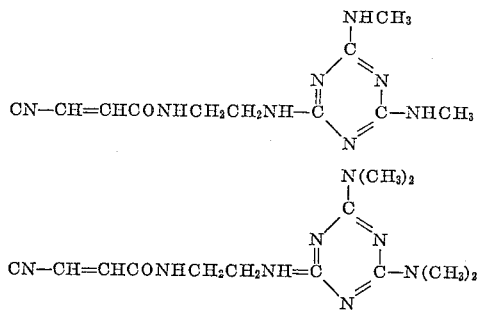

Various triazine monomers used hereinafter in the examples have the following structures in which $C_3N_3$ represents the trivalent symmetrical triazine nucleus:

Triazine Monomer III-N $$CN—CH=CHCONHCH_2CH_2O—C_3N_3(NH_2)_2$$

Triazine Monomer IV-N $$CN—CH=CHCONHCH_2CH_2O—C_3N_3[N(CH_3)_2]_2$$

Triazine Monomer VI-N $$CN—CH=CH—CONHCH_2C_6H_4O—C_3N_3(NHCH_3)_2$$

Triazine Monomer VII-N $$CN—CH=CHCONHCH_2CH_2O—C_3N_3(NHC_6H_5)_2$$

Triazine Monomer VIII-N $$CN—CN=CNCONHCH_2CH_2CH_2O—$$
$$C_3N_3[N(C_2H_5)_2]_2$$

Triazine Monomer IX-N

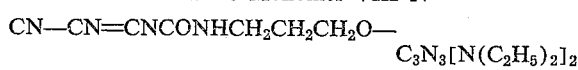

Triazine Monomer X-N

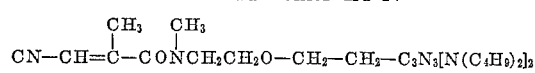

Triazine Monomer XI-N

Triazine Monomer XII-N $$CN—CH=CH—CONH—C_6H_4—O—$$
$$C_3N_3(NHCH_2C_6H_5)_2$$

Triazine Monomer XIII-N

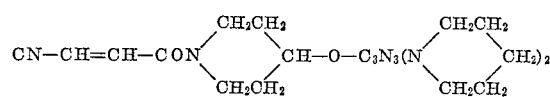

Triazine Monomer XIV-N

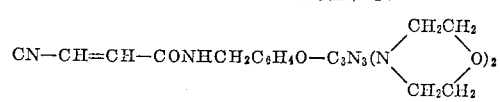

Triazine Monomer XV-N

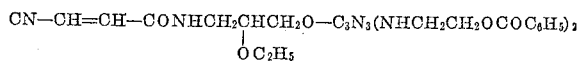

Triazine Monomer XVI-N

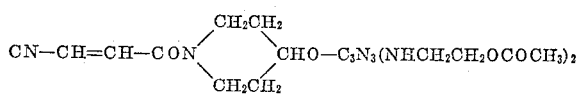

EXAMPLE I-o

*Preparation of Triazine Monomer*

Beta-cyanoacrylyl chloride 23.1 parts) in 150 parts of diethyl ether is added slowly and with stirring to a mixture of 54.6 parts of 2,4-bis-(dimethylamino)-6-(ortho-aminophenyl)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-bis-(dimethylamino) - 6 - [ortho - (beta - cyanoacrylamide)-phenylamine]-1,3,5-triazine. Ultimate analyses for carbon, hydrogen, and nitrogen and molecular weight determination gives values of 57.91%, 5.66%, 31.72% and 353.1% respectively, all of which values are in close agreement with the theoretical values.

Substitution of an equivalent quantity of beta-cyanomethacrylyl chloride for its homolog in the foregoing procedure, yields the corresponding triazine monomer. Ultimate analyses and molecular weight determination give 58.98% carbon, 6.03% hydrogen, 30.62% nitrogen and molecular weight of 367.1, all of which values agree closely with the theoretical values for 2,4-bis-(dimethylamino)-6-[ortho-(beta - cyanomethacrylamido) - phenylamino]-1,3,5-triazine. The corresponding chloracylic derivative can be similarly prepared by use of beta-cyanochloracrylyl chloride. Likewise the corresponding acids and acid anhydrides can be used, with obvious modifications, in place of the acid chlorides.

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4 - bis - (dimethylamino) - 6 - [ortho - methylpara - (beta - cyanoacrylamido) - phenylamino] - 1,3,5-triazine, with carbon, hydrogen, nitrogen and molecular weight values of 59.06, 5.98%, 30.68% and 365.4, respectively;

(b) 2,4 - bis - (dimethylamino) - 6 - [para - (para-beta - cyanoacrylamidophenyl) - phenylamino] - 1,3,5-triazine, with carbon, hydrogen, nitrogen and molecular weight values of 64.42%, 5.61%, 26.10% and 428.9, respectively;

(c) 2,4 - bis - (phenylamino) - 6 - [4 - (beta - cyanoacrylamido)-naphthyl-1-amino]-1,3,5-triazine, with carbon, hydrogen, nitrogen and molecular weight values of 69.72%, 4.41%, 22.53% and 496.9, respectively;

(d) 2,4 - bis - (methylamino) - 6 - [meta - (beta-cyano - chloracrylamido) - phenylamino] - 1,3,5-triazine, with carbon, hydrogen, nitrogen, chlorine and molecular weight values of 50.01%, 4.16%, 31.23%, 9.92% and 357.2, respectively.

Other methods of preparing the triazine monomers of this invention can be used. For example, as indicated above, the beta-cyanoacrylic acid anhydride, as well as the corresponding alpha-methyl (methacrylic) and alpha-chloro (chloroacrylic) homologs can be used, according to well-known techniques for producing amides, with appropriate triazinyl amines to give desired triazine monomers.

In certain cases the triazinyl acrylic amide can also be prepared by reacting an acrylic amide, such as N,N-dimethyl-beta-cyanoacrylamide, with a triazinyl amine to give the corresponding triazine monomer by displacement of dimethyl amine. In other cases, where stable aminoacrylamide of beta-cyanoacrylic acid can be isolated, such as CN—CH=CHCONHC$_6$H$_4$NHC$_2$H$_5$, it can be reacted with a cyanuric chloride derivative

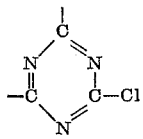

in the presence of a hydrohalide acceptor, such as NaOH, to produce triazine monomers by well-known procedures.

Typical triazinyl amines that can be used to give desired monomers of this invention include:

(1) NH$_2$—C$_6$H$_4$—NH—C$_3$N$_3$(NHCH$_3$)$_2$
(2) NH$_2$—C$_6$H$_4$—NH—C$_3$N$_3$[N(C$_2$H$_5$)$_2$]$_2$
(3) NH$_2$—C$_6$H$_4$—NH—C$_3$N$_3$(N⟨CH$_2$CH$_3$ / CH$_2$CH$_3$⟩)$_2$
(4) NH$_2$—C$_6$H$_4$—NH—C$_3$N$_3$(N⟨CH$_2$CH$_2$ / CH$_2$CH$_2$⟩O)$_2$
(5) NH$_2$—C$_6$H$_4$—NH—C$_3$N$_3$—(NHC$_6$H$_5$)$_2$
(6) NH$_2$—C$_{10}$H$_6$—NH—C$_3$N$_3$[N(C$_4$H$_9$)$_2$]$_2$
(7) NH$_2$—CH$_2$C$_6$H$_4$NH—C$_3$N$_3$(NHCH$_3$)$_2$
(8) NH$_2$—CH$_2$C$_6$H$_4$NH—C$_3$N$_3$[N(C$_2$H$_5$)$_2$]$_2$
(9) NH$_2$—CH$_2$CH$_2$C$_6$H$_4$NH—C$_3$N$_3$(N⟨CH$_2$CH$_2$ / CH$_2$CH$_2$⟩)$_2$
(10) NH$_2$—C$_6$H$_4$CH$_2$CH$_2$NH—C$_3$N$_3$(N⟨CH$_2$CH$_2$ / CH$_2$CH$_2$⟩NH)$_2$
(11) NH$_2$—C$_6$H$_4$—CH$_2$—C$_6$H$_4$—NH—C$_3$N$_3$(NHC$_6$H$_5$)$_2$
(12) NH$_2$—C$_{10}$H$_6$—CH$_2$—NH—C$_3$N$_3$[N(C$_4$H$_9$)$_2$]$_2$ 2,4-diamino-6-[para-(beta-cyanoacrylamido) - phenylamino]-1,3,5-triazine represents monomers of the structure

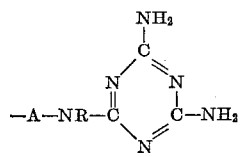

in which the amino groups are unsubstituted. These compounds containing unsubstituted 2,4-amino groups are very useful in the preparation of homopolymers and certain copolymers, but because of their reduced solubility in other monomers, those triazinyl derivatives are peferred in which at least one, and preferably both hydrogens of the amino group are substituted by hydrocarbons groups, e.g.:

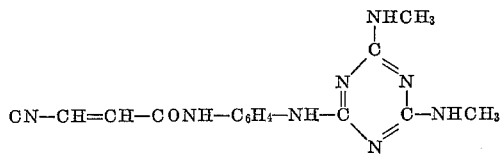

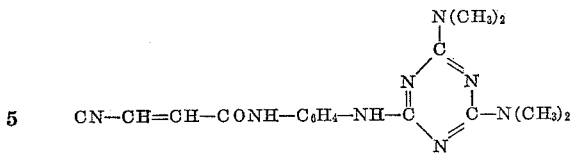

Various triazine monomers used hereinafter in the Examples have the following structures in which C$_3$N$_3$ represents the trivalent symmetrical triazine nucleus:

Triazine Monomer III–O

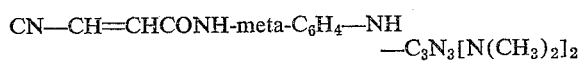

Triazine Monomer IV–O

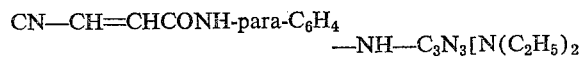

Triazine Monomer VI–O

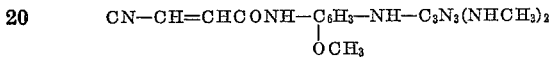

Triazine Monomer VII–O

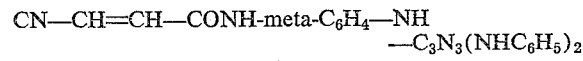

Triazine Monomer VIII–O

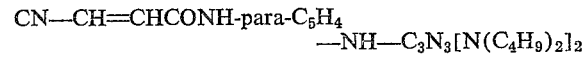

Triazine Monomer IX–O

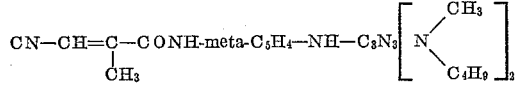

Triazine Monomer X–O

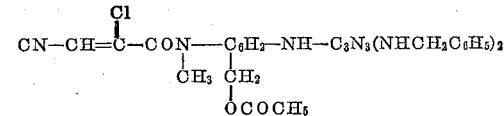

Triazine Monomer XI–O

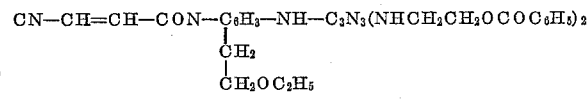

Triazine Monomer XII–O

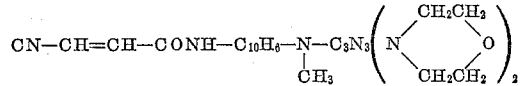

Triazine Monomer XIII–O

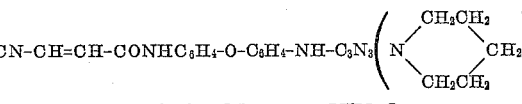

Triazine Monomer XIV–O

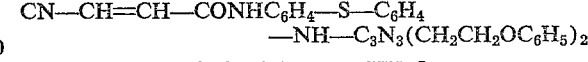

Triazine Monomer XV–O

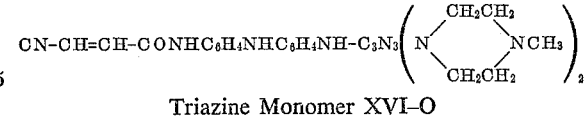

Triazine Monomer XVI–O

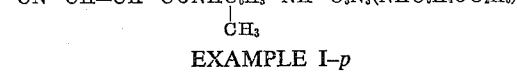

EXAMPLE I–p

*Preparation of Triazine Monomers*

(a) Maleic anhydride (9.8 parts) in 50 parts of benzene is added slowly and with stirring to a mixture of 22.6 parts of 2,4 - bis-(dimethylamino)-6-(beta-hydroxyethylamino)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid monoester of the above triazine compound. Ultimate analyses for carbon, hydrogen, and nitrogen give values of 48.24%, 6.23%, and 26.07%, and molecular weight determination shows a value of 325.1, respectively, all of which values are in close agreement with the theoretical values.

Substitution of equivalent quantities of the various other triazinyl alcohols described above for the one used in the foregoing procedure yields various monoesters of maleic acid of this invention. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl, or other alkyl esters. These esters may also be prepared as in the following procedure (b).

(b) The procedure of (a) is repeated using 14.85 parts of monomethyl fumaryl chloride in 50 parts of diethyl ether instead of the maleic anhydride solution and also using 18.5 parts of tributyl amine in the solution of the triazine. The monomethyl fumaric ester of 2,4-bis-(dimethylamino)-6-(beta - hydroxyethylamino)-1,3,5-triazine is obtained which gives analyses of 49.84% carbon, 6.64% hydrogen, 24.98% nitrogen, and a molecular weight of 336.8, all of which values check closely with the theoretical values. The fumaryl monochloride is similarly used to prepare the fumaric mono-acid triazine monoester. The corresponding monomethyl maleic chloride is similarly used to prepare the corresponding mixed ester. Substitution of equivalent quantities of the various monoesters and of various triazinyl alcohols, as described above, for the monoester and triazinyl alcohol of the foregoing procedure, yields various corresponding esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diester of 2,4-bis-dimethylamino)-6-(beta-hydroxyethylamino) - 1,3,5-triazine is obtained which gives analyses of 49.78% carbon, 6.85% hydrogen, 31.82% nitrogen, and a molecular weight of 531.8, all of which values check closely with the theoretical values. Maleic dichloride is used similarly to produce the corresponding triazine diester. When the various other triazinyl alcohols described above are substituted respectively in equivalent quantities in this foregoing procedure, the corresponding diesters are obtained.

(d) The procedure of (b) is repeated using 16.15 parts of mono(dimethylamido)-maleic chloride instead of the 14.85 parts of monomethyl maleic chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as for example, by reacting with thionyl chloride.) There is obtained the mono-(dimethylamido) maleic ester of 2,4-di-(dimethylamino)-6-(beta-hydroxyethylamino)-1,3,5-triazine which gives analyses of 51.37% carbon, 7.22% hydrogen, 28.21% nitrogen, and a molecular weight of 352.4, all of which values check closely with the theoretical values. The corresponding fumaryl monoamide monochloride is used similarly to produce the corresponding amide ester. Substitution of various other monoamides, and of various other triazinyl alcohols, as described above for the monoamide and triazinyl alcohol of the foregoing procedure yields various amide ester triazine monomers of this invention.

Various other triazine monomers of this invention can be prepared by the foregoing procedures using the appropriate ethenedioic acid derivatives and triazine intermediates. For example, the following monomers prepared accordingly are identified by the analyses and molecular weights indicated, all of which check closely with the theoretical values:

(e) Morpholino monoamide of maleic monoester of 2,4-diamino-6-(gamma-hydroxypropylamino) - 1,3,5-triazine, with carbon, hydrogen, nitrogen and molecular weight values of 47.98%, 6.05%, 28.17%, and 348.6, respectively.

(f) Piperidyl monoamide of fumaryl monoester of 2,4-bis-(dibutylamino)-6-(gamma-hydroxybutylamino)-1,3,5-triazine, with carbon, hydrogen, nitrogen, and molecular weight values of 65.61%, 9.80%, 16.92%, and 588.2, respectively.

(g) Monobutyl alpha-chlormaleic monoester of 2,4-bis-(dipropylamino) - 6 - (beta-hydroxyethylphenylamino)-1,3,5-triazine, with carbon, hydrogen, nitrogen, chlorine, and molecular weight values of 61.82%, 7.88%, 14.21%, 6.03%, and 604.2, respectively.

(h) Piperazinyl monoamide of alpha-methylmaleic monoester of 2,4-bis-(dimethylamino)-6-(beta-hydroxyethylamino)-1,3,5-triazine, with carbon, hydrogen, nitrogen, and molecular weight values of 52.04%, 7.48%, 28.71%, and 394.6, respectively.

Various other methods can also be used for the preparation of the monomers. For example, appropriate compounds of the formulas

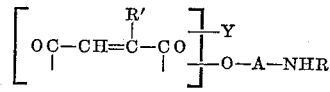

and

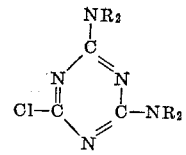

can be condensed in the presence of a hydrohalide acceptor such as sodium hydroxide under conditions known in the art for similar cyanuric chloride condensations, to produce desired triazine monomers.

As a further example of such other methods, such triazine monomers can also be prepared by using an appropriate triazine alcohol, as indicated above, to displace a low molecular weight alcohol from corresponding ethenedioic esters such as the methyl ester of maleic, fumaric, mesaconic, citraconic, chloromaleic, and chlorofumaric acids.

Various triazine monomers used hereinafter in the examples have the following structures wherein $C_3N_3$ represents the trivalent triazine nucleus:

Triazine Monomer III–P

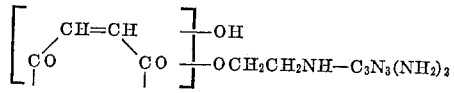

Triazine Monomer IV–P

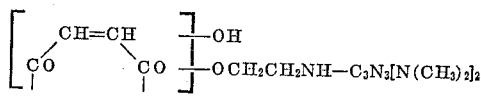

Triazine Monomer VI–P

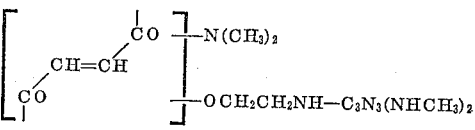

Triazine Monomer VII–P

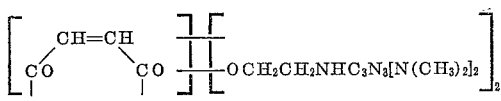

Triazine Monomer VIII–P

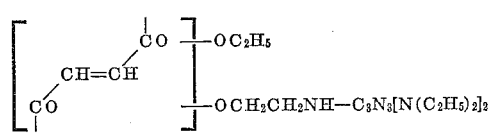

Triazine Monomer IX–P

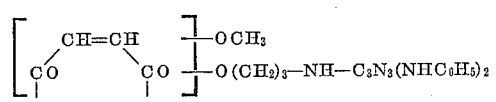

Triazine Monomer X–P

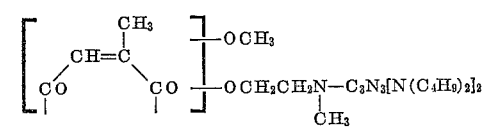

Triazine Monomer XI–P

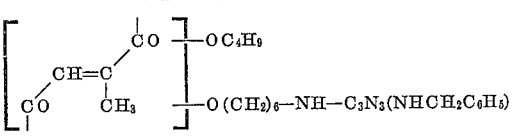

Triazine Monomer XII–P

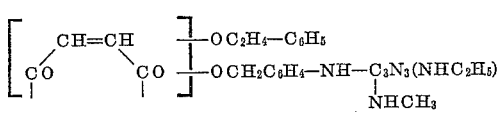

Triazine Monomer XIII–P

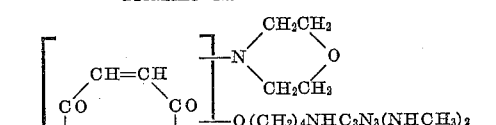

Triazine Monomer XIV–P

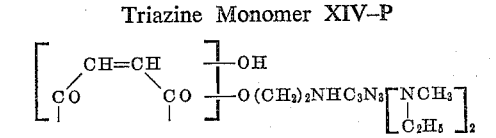

Triazine Monomer XV–P

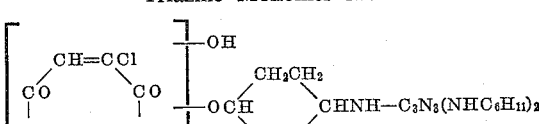

Triazine Monomer XVI–P

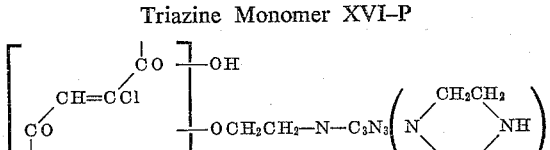

EXAMPLE I-q

*Preparation of Triazine Monomers*

(a) Maleic anhydride (9.8 parts) in 150 parts of benzene is added slowly and with stirring to a mixture of 22.5 parts of 2,4-bis-(dimethylamino)-6-(beta-aminoethylamino)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the product is recrystallized from acetone-water mixtures. There is obtained the maleic acid monoamide of the above triazine compound. Ultimate analyses for carbon, hydrogen, and nitrogen, and molecular weight determination give values which are in close agreement with the theoretical.

Substitution of equivalent quantities of the various other triazinyl amines indicated above for the one used in the foregoing procedure yields various monoamides of maleic acid of this invention. Corresponding fumaric, mesaconic, citraconic, chloromaleic, and chlorofumaric derivatives are prepared by using the corresponding acid anhydride according to the above procedure, or by using the corresponding acid chloride according to the procedure given below. These are identified by ultimate analyses and molecular weight determinations as above. These monoacid amides can be used as such or can be converted to alkyl ester-amides by reacting their sodium salts in the standard manner, with dialkyl sulfates, as for example, with dimethyl or diethyl sulfate to produce the corresponding methyl, ethyl, or other alkyl esters. These ester-amides can also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributyl amine in the solution of the triazine. After refluxing, the reaction mixture is cooled and washed with water to remove the amine hydrochloride before solvent removal and recrystallization as in (a). The monomethyl fumaric ester of 2,4-bis-(dimethylamino)-6-(beta-aminoethylamino)-1,3,5-triazine is obtained which gives ultimate analyses and molecular weight values which check closely with the theoretical values. The fumaryl monochloride is similarly used to prepare the fumaric monoacid triazine monoamide. The corresponding monomethyl maleic chloride is similarly used to prepare the corresponding ester-amide. Substitution of equivalent quantities of the various ethene-1,2-dioic monoester chlorides and of various triazinyl amines, as indicated above, for the monoester chloride and triazinyl amine of the foregoing procedure, yields various corresponding ester-amides of this invention. These are characterized by ultimate analyses and molecular weight determination as above.

(c) The procedure of (b) is repeated using 7.65 parts of fumaryl dichloride instead of the 14.85 parts of monomethyl fumaryl chloride. The fumaryl diamide of 2,4-bis - (dimethylamino) - 6-(beta-aminoethylamino)-1,3,5-triazine is obtained which gives ultimate analyses and molecular weight values which check closely with the theoretical values. Maleic dichloride and the other dichlorides of the other acids indicated above are used similarly to produce the corresponding triazine amides. When the various other triazinyl amines described above are substituted respectively in equivalent quantities in this foregoing procedure, corresponding amides are obtained.

(d) The procedure of (b) is repeated using 16.15 parts of mono(dimethylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido)maleic monoacid to the acid chloride by the ordinary methods of converting acids to acyl chlorides, such as for example, by reacting with thionyl chloride). There is obtained the mono-(dimethylamido)maleic monoamide of 2,4-bis-(dimethylamino)-6-(beta-aminoethylamino)-1,3,5-triazine which gives ultimate analyses and molecular weight values which check closely with the theoretical values. The corresponding fumaryl monoamide monochloride is used similarly to produce the corresponding mixed amide. Substitution of various other ethene-1,2-dioic monoamides, and of various triazinyl amines, as indicated above for the monoamide and triazinyl amine of the foregoing procedure, yields various mixed amide triazine monomers of this invention.

Various other triazine monomers of this invention can be prepared by the foregoing procedures using the appropriate ethene-1,2-dioic acid derivatives and triazine intermediates. For example, the following monomers prepared accordingly are identified by the analyses and molecular weight determinations, all of which check closely with the theoretical values: morpholino monoamide of maleic monoamide of 2,4-diamino-6-(gamma-aminopropylamino)-1,3,5-triazine; piperidyl monoamide of fumaryl monoamide of 2,4-bis-(dibutylamino)-6-(gamma-aminobutylamino)-1,3,5-triazine; monobutyl ester of alpha-chlormaleic monoamide of 2,4-bis-(dipropylamino)-6-(beta-aminoethylphenylamino)-1,3,5-triazine; piperazinyl monoamide of alpha-methyl-maleic monoamide of 2,4-bis - (dimethylamino) - 6-)(beta-aminoethylamino)-1,3,5-triazine.

Various other methods can also be used for the preparation of the monomers. For example, appropriate compounds of the formulas

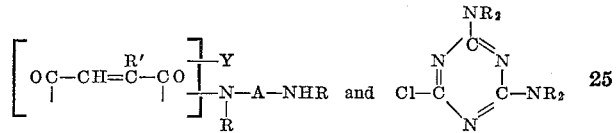

can be condensed in the presence of a hydrohalide acceptor such as sodium hydroxide under conditions known in the art for similar cyanuric chloride condensations, to produce desired triazine monomers.

Various triazine monomers used hereinafter in the examples have the following structures wherein $C_3N_3$ represents the trivalent triazine nucleus:

Triazine Monomer III-Q

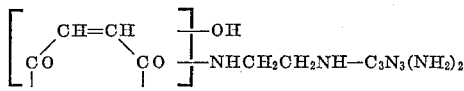

Triazine Monomer IV-Q

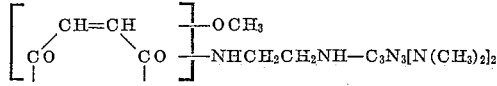

Triazine Monomer VI-Q

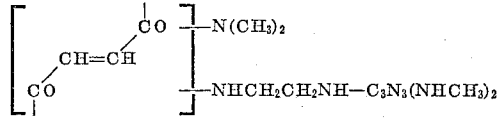

Triazine Monomer VII-Q

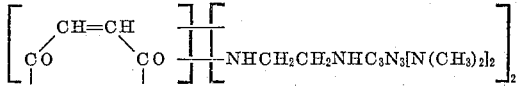

Triazine Monomer VIII-Q

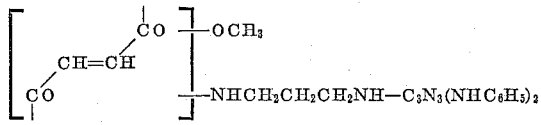

Triazine Monomer IX-Q

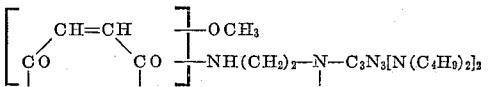

Triazine Monomer X-Q

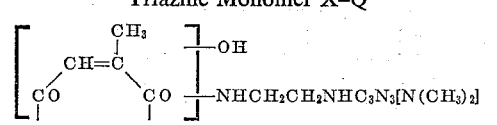

Triazine Monomer XI-Q

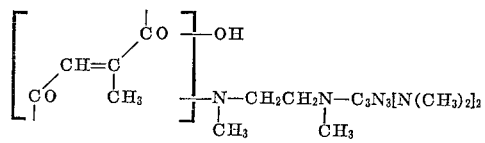

Triazine Monomer XII-Q

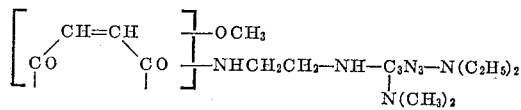

Triazine Monomer XIII-Q

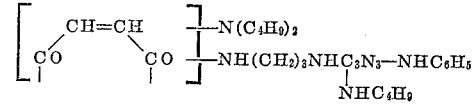

Triazine Monomer XIV-Q

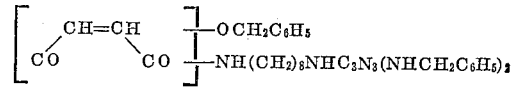

Triazine Monomer XV-Q

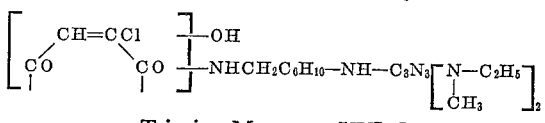

Triazine Monomer XVI-Q

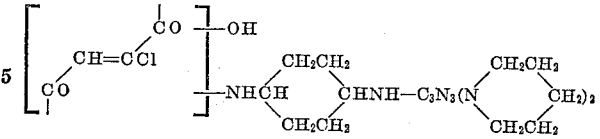

EXAMPLE I-r

Preparation of Triazine Monomers (a) Maleic anhydride (9.8 parts) in 150 parts of benzene is added slowly and with stirring to a mixture of 22.5 parts of 2,4-bis-(dimethylamino)-6-(beta-hydroxyethoxy)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the product is recrystallized from acetone-water mixtures. There is obtained the maleic acid monoester of the above triazine compound. Ultimate analyses for carbon, hydrogen, and nitrogen, and molecular weight determination, give values which are in close agreement with the theoretical values.

Substitution of equivalent quantities of the various other triazinyl alcohols indicated above for the one used in the foregoing procedure yields various monoesters of maleic acid of this invention. Corresponding fumaric, mesaconic, citraconic, chloromaleic, and chlorofumaric derivatives are prepared by using the corresponding acid anhydried or acid monochloride. These are identified by ultimate analyses and molecular weight determinations as above. These mono-acid esters can be used as such or can be converted to alkyl mixed esters by reacting their sodium salts in the standard manner, with dialkyl sulfates, as for example with dimethyl or diethyl sulfate to produce the corresponding methyl, ethyl, or other alkyl esters. These mixed esters can also be prepared as in the following procedure (b).

(b) The procedure of (a) is repeated using 14.85 parts of monomethyl fumaryl monochloride in 150 parts of diethyl ether instead of the maleic anhydride solution and also using 18.5 parts of tributyl amine in the solution of the triazine. After refluxing, the reaction mixture is cooled and washed with water to remove the amine hydrochloride before solvent removal and recrystallization as in (a). The monomethyl fumaric ester of 2,4-bis-(dimethylamino) - 6-(beta-hydroxyethoxy)-1,3,5-triazine is obtained which gives ultimate analyses and molecular weight values which check closely with the theoretical values. The fumaryl monochloride is similarly used to prepare the fumaric mono-acid triazine monoester. The corresponding monomethyl maleic chloride is similarly used to prepare the corresponding mixed ester. Substitution of equivalent quantities of the various ethenedioic monoesters and chlorides of various triazinyl alcohols, as described above, for the monoester chloride and triazinyl alcohol of the foregoing procedure, yields various corresponding mixed esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diester of 2,4-bis-(dimethylamino) - 6-(beta-hydroxyethoxy)-1,3,5-triazine is obtained which gives ultimate analyses and molecular weight values which check closely with the theoretical values. Maleic dichloride and the dichlorides of the other acids indicated above are used similarly to produce the corresponding triazine diesters. When the various other triazinyl alcohols described above are substituted respectively in equivalent quantities in this foregoing procedure, corresponding diesters are obtained.

(d) The procedure of (b) is repeated using 16.15 parts of mono(di-methylamido)-maleic chloride instead of the 14.85 parts of monomethyl maleic chloride. (This monoamide can be prepared by reacting, mole per mole, dimethylamine and maleic anhydride and subsequently converting the free acid group of the resulting mono-(dimethylamido)-maleic monacid to the acid chloride by the ordinary methods of converting acids to acyl chlorides, such as, for example, by reacting with thionyl chloride.) There is obtained the mono-(dimethylamido) maleic ester of 2,4-di-(dimethylamino)-6-(beta-hydroxyethoxy)-1,3,5-triazine which gives ultimate analyses and molecular weight values which check closely with the theoretical values. The corresponding fumaryl monoamide monochloride is used similarly to produce the corresponding amide ester. Substitution of various other ethenedioic monoamides, and of various other triazinyl alcohols, as described above for the monamide and triazinyl alcohol of the foregoing procedure yields various amide ester triazine monomers of this invention.

Various other triazine monomers of this invention can be prepared by the foregoing procedures using the appropriate ethenedioic acid derivatives and triazine intermediates. For example, the following monomers prepared accordingly are identified by the analyses and molecular weight determinations, all of which check closely with the theoretical values: morpholino monoamide of malic monoester of 2,4-diamino-6-(gamma-hydroxy propoxy)-1,3,5-triazine; piperidyl monoamide of fumaryl monoester of 2,4-bis-(dibutylamino)-6-(gamma-hydroxy butoxy)-1,3,5-triazine; monobutyl ester of alpha-chlormaleic monoester of 2,4-bis-(dipropylamino)-6-(beta-hydroxyethylphenoxy)-1,3,5-triazine; piperazinyl monoamide of alpha-methylmaleic monoester of 2,4-bis-(dimethylamino)-6-(beta-hydroxyethoxy)-1,3,5-triazine.

Various other methods can also be used for the preparation of the monomers. For example, appropriate compounds of the formulas

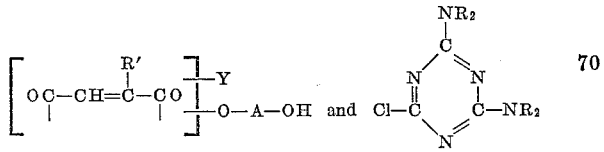

can be condensed in the presence of a hydrohalide acceptor such as sodium hydroxide under conditions known in the art for similar cyanuric chloride condensations, to produce desired triazine monomers.

As a further example of such other methods, such triazine monomers can also be prepared by using an appropriate triazine alcohol as indicated above, to displace a low molecular weight alcohol from corresponding ethenedioic esters, such as the methyl ester of maleic, fumaric, mesaconic, citraconic, chloromaleic, and chlorofumaric acids.

Various triazine monomers used hereinafter in the examples have the following structures wherein $C_3N_3$ represents the trivalent triazine nucleus:

Triazine Monomer III-R

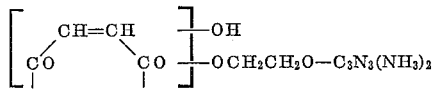

Triazine Monomer IV-R

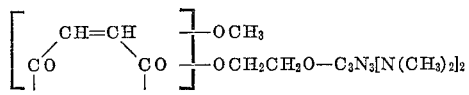

Triazine Monomer VI-R

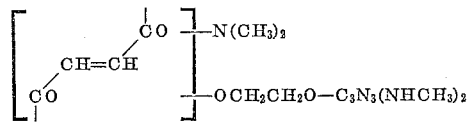

Triazine Monomer VII-R

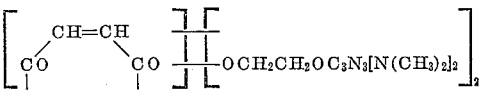

Triazine Monomer VIII-R

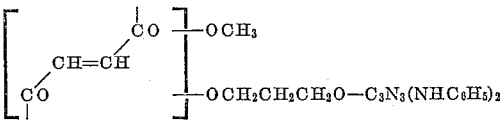

Triazine Monomer IX-R

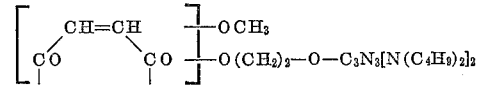

Triazine Monomer X-R

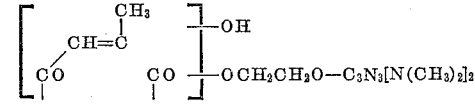

Triazine Monomer XI-R

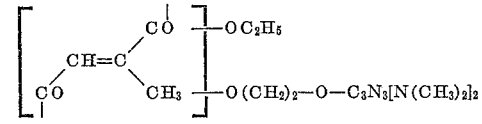

Triazine Monomer XII-R

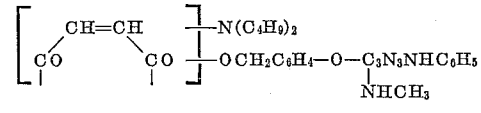

Triazine Monomer XIII-R

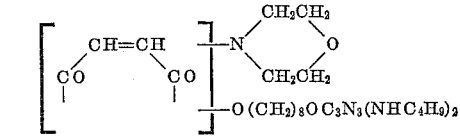

Triazine Monomer XIV–R

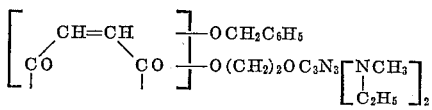

Triazine Monomer XV–R

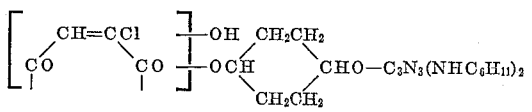

Triazine Monomer XVI–R

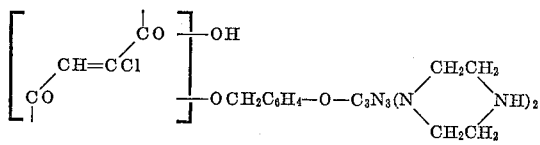

EXAMPLE I–s

Preparation of Triazine Monomers (a) Maleic anhydride (9.8 parts) in 50 parts of benzene is added slowly and with stirring to a mixture of 22.5 parts of 2,4-bis-(dimethylamino)-6-(beta-aminoethoxy)-1,3,5-triazine and 150 parts of dioxane. Upon completion of the addition of the anhydride, the mixture is refluxed for approximately one hour, after which the dioxane and benzene are evaporated. The amide is recrystallized from dioxane-water mixtures. There is obtained the maleic acid monoamide of the above triazine compound. Ultimate analyses for carbon, hydrogen, and nitrogen, and molecular weight determination, give values which are in close agreement with the theoretical values.

Substitution of equivalent quantities of the various other triazinyl amines indicated above for the one used in the foregoing procedure yields various monoamides of maleic acid of this invention. Corresponding fumaric, mesaconic, citraconic, chloromaleic, and chlorofumaric derivatives are prepared by using the corresponding acid anhydride according to the above procedure, or using the corresponding acid chloride according to the procedure (b) given below. These are identified by ultimate analyses and molecular weight determinations as above. These mono-acid amides can be used as such or can be converted to alkyl ester-amides by reacting their sodium salts in the standard manner, with dialkyl sulfates, as for example with dimethyl or diethyl sulfate to produce the corresponding methyl, ethyl, or other alkyl esters. These ester-amides can also be prepared as in the following procedure (b).

(b) The procedure of (a) is repeated using 14.85 parts of monomethyl fumaryl monochloride in 50 parts of diethyl ether instead of the maleic anhydride solution and also using 18.5 parts of tributyl amine in the solution of the triazine. After refluxing the reaction mixture is cooled and washed with water to remove the butylamine hydrochloride. Thus the solvent is evaporated and the product recrystallized as in (a). The monomethyl ester of fumaric monoamide of 2,4-bis-(dimethylamino)-6-(beta-aminoethoxy)-1,3,5-triazine is obtained which gives ultimate analyses and molecular weight values which check closely with the theoretical values. The fumaryl acid monochloride is similarly used to prepare the fumaric monoacid triazine monoamide. The corresponding monomethyl maleic chloride is similarly used to prepare the corresponding ester-amide. Substitution of equivalent quantities of the various ethenedioic monoester monochlorides and of various triazinyl amines, as indicated above, for the monoester chloride and triazinyl amine of the foregoing procedure, yields various corresponding ester-amides of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diamide of 2,4-bis-(dimethylamino)-6-(beta-aminoethoxy)-1,3,5-triazine is obtained which gives ultimate analyses and molecular weight values which check closely with the theoretical values. Maleic dichloride and the dichlorides of the other ethenedioic acids are used similarly to produce the corresponding triazine diamides. When the various other triazinyl amines described above are substituted respectively in equivalent quantities in this foregoing procedure, corresponding diamides are obtained.

(d) The procedure of (b) is repeated using 16.15 parts of mono(dimethylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as for example, by reacting with thionyl chloride.) There is obtained the mono-(dimethylamido) maleic monoamide of 2,4-bis-(dimethylamino)-6-(beta-aminoethoxy)-1,3,5-triazine which gives ultimate analyses and molecular weight values which check closely with the theoretical values. The corresponding fumaryl monoamide monochloride is used similarly to produce the corresponding mixed amides. Substitution of various other ethenedioic monoamides, and of various other triazinyl amines, as indicated above for the monoamide and triazinyl amine of the foregoing procedure yields various mixed amide triazine monomers of this invention.

Various other triazine monomers of this invention can be prepared by the foregoing procedures using the appropriate ethenedioic acid derivatives and triazine intermediates. For example, the following monomers prepared accordingly are identified by the analyses and molecular weight determinations, all of which check closely with the theoretical values: morpholino monoamide of maleic amide of 2,4-diamino-6-(gamma-aminopropoxy)-1,3,5-triazine; piperidyl monoamide of fumaryl monoamide of 2,4-bis-(dibutylamino)-6-(gamma-aminobutoxy)-1,3,5-triazine; monobutyl esters of alpha-chlormaleic monoamide of 2,4-bis-(dipropylamino)-6-(beta-aminoethylphenoxy)-1,3,5-triazine; piperazinyl monoamide of alpha-methyl-maleic monoamide of 2,4-bis-(dimethylamino)-6-(beta-aminoethoxy)1,3,5-triazine.

Various other methods can also be used for the preparation of the monomers. For example, appropriate compounds of the formulas

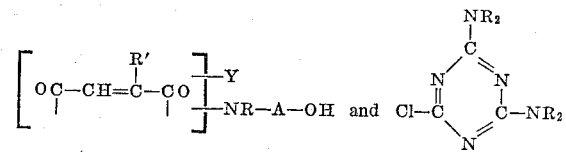

can be condensed in the presence of a hydrohalide acceptor such as sodium hydroxide under conditions known in the art for similar cyanuric chloride condensations, to produce desired triazine monomers.

Various triazine monomers used hereinafter in the examples have the following structures wherein $C_3N_3$ represents the trivalent triazine nucleus:

Triazine Monomer III–S

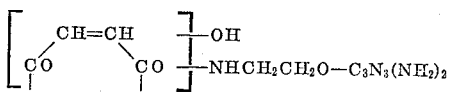

Triazine Monomer IV–S

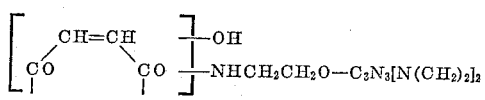

Triazine Monomer VI-S

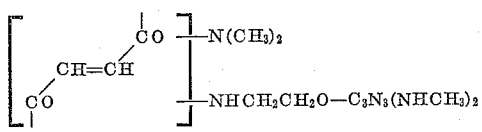

Triazine Monomer VII-S

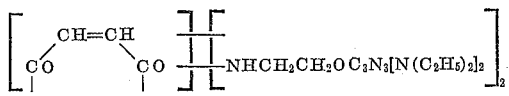

Triazine Monomer VIII-S

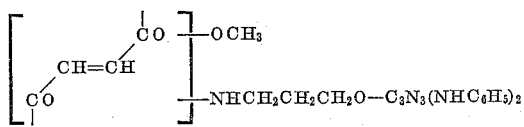

Triazine Monomer IX-S

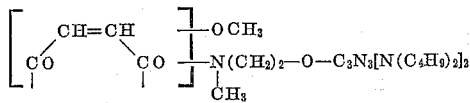

Triazine Monomer X-S

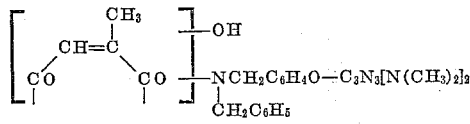

Triazine Monomer XI-S

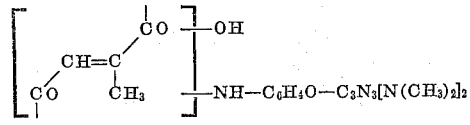

Triazine Monomer XII-S

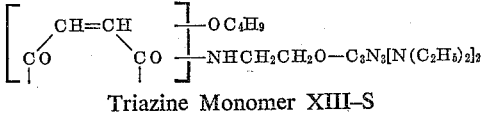

Triazine Monomer XIII-S

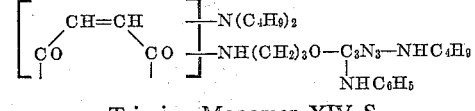

Triazine Monomer XIV-S

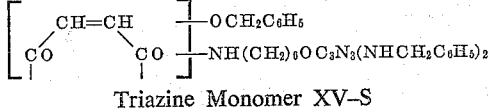

Triazine Monomer XV-S

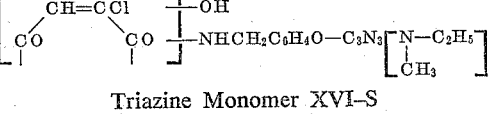

Triazine Monomer XVI-S

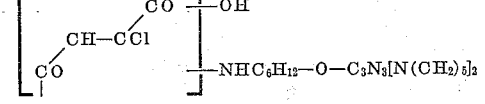

EXAMPLE I-t

*Preparation of Triazine Monomers*

(a) Maleic anhydride (9.8 parts) in 50 parts of benzene is added slowly and with stirring to a mixture of 27.3 parts of 2,4-bis-(dimethylamino)-6-(meta-amino-phenyl-amino)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the product is recrystallized from acetone-water mixtures. There is obtained the maleic acid monoamide of the above triazine compound. Ultimate analyses for carbon, hydrogen, and nitrogen, and moleculer weight determination, give values which are in close agreement with the theoretical values.

Substitution of equivalent quantities of the various other triazinyl amines described above for the one used in the foregoing procedure yields various monoamides of maleic acid of this invention. Corresponding fumaric, mesaconic, citraconic, chloromaleic, and chlorofumaric derivatives are prepared by using the corresponding acid anhydride according to the above procedure or by using the corresponding acid chloride according to the procedure (b) given below. These are identified by ultimate analyses and molecular weight determinations as above. These monoacid amides can be used as such or can be converted to alkyl ester-amides by reacting their sodium salts in the standard manner, with dialkyl sulfates, as for example, with dimethyl or diethyl sulfate to produce the corresponding methyl, ethyl, or other alkyl esters. These ester-amides can also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributyl amine in the solution of the triazine. After refluxing the reaction mixture is cooled and washed with water to remove the amine hydrochloride before solvent removal and recrystallization as in (a). The monomethyl ester of fumaric monoamide of 2,4-bis-(dimethylamino)-6-(meta-amino-phenyl-amino)-1,3,5-triazine is obtained which gives ultimate analyses and molecular weight values which check closely with the theoretical values. The fumaryl monochloride is similarly used to prepare the fumaric monoacid triazine monoamide. The corresponding monomethyl maleic chloride is similarly used to prepare the corresponding mixed ester-amide. Substitution of equivalent quantities of the various monoesters and of various triazinyl amines, as described above, for the monoester and triazinyl amine of the foregoing procedure, yields various corresponding ester-amides of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diamide of 2,4-bis(dimethylamino)-6-(meta-phenyl-amino)-1,3,5-triazine is obtained which gives ultimate analyses and molecular weight values which check closely with the theoretical values. Maleic dichloride and the dichlorides of the other acids indicated above are used similarly to produce the corresponding triazine diamides. When the various other triazinyl amines described above are substituted respectively in equivalent quantities in this foregoing procedure, corresponding diamides are obtained.

(d) The procedure of (b) is repeated using 16.15 parts of mono(dimethylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as for example, by reacting with thionyl chloride.) There is obtained the mono-(dimethylamide) maleic monoamide of 2,4-di-(dimethylamino)-6-(meta-aminophenylamino)-1,3,5-triazine which gives ultimate analyses and molecular weight values which check closely with the theoretical values. The corresponding fumaryl monoamide monochloride is used similarly to produce the corresponding amide. Substitution of various other ethene-1,2-dioic monoamides, and of various other triazinyl amines, as described above, for the monoamide and triazinyl amine of the foregoing procedure yields various mixed amide triazine monomers of this invention.

Various other triazine monomers of this invention can be prepared by the foregoing procedures using the appropriate ethene-1,2-dioic acid derivatives and triazine intermediates. For example, the following monomers prepared accordingly are identified by the analyses and molecular weight determinations, all of which check closely with the theoretical values: morpholino monoamide of maleic monoamide of 2,4-diamino-6-[para-(aminomethyl)-phenylamino]-1,3,5-triazine; piperidyl monoamide of fumaryl monoamide of 2,4-bis-(dibutylamino)-6-naphthylamino-1,3,5-triazine; monobutyl ester of alpha-chlormaleic monoamide of 2,4-bis-(dipropylamino)-6-[para-(beta-aminoethyl)phenylamino]-1,3,5-triazine; piperazinyl monoamide of alpha-methylmaleic monoamide of 2,4-bis-(dimethylamino)-6-(5-amino-naphthyl-1-amino)-1,3,5-triazine.

Various other methods can also be used for the preparation of the monomers. For example appropriate compounds of the formulas

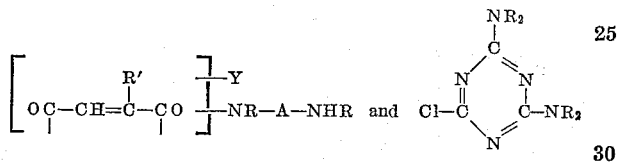

can be condensed in the presence of a hydrohalide acceptor such as sodium hydroxide under conditions known in the art for similar cyanuric chloride condensations, to produce desired triazine monomers.

Various triazine monomers used hereinafter in the examples have the following structures wherein $C_3N_3$ represents the trivalent triazine nucleus:

Triazine Monomer III-T

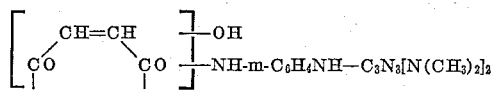

Triazine Monomer IV-T

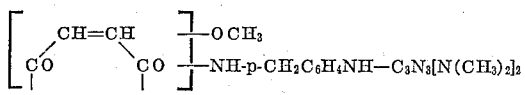

Triazine Monomer VI-T

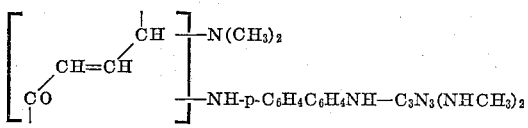

Triazine Monomer VII-T

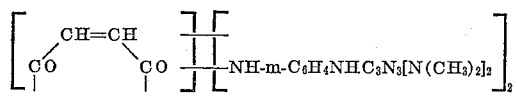

Triazine Monomer VIII-T

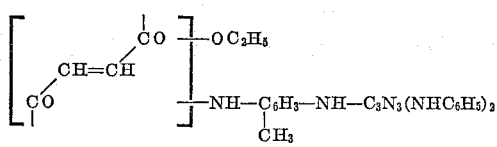

Triazine Monomer IX-T

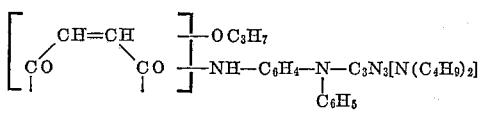

Triazine Monomer X-T

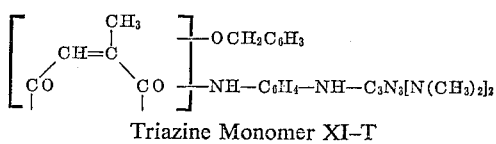

Triazine Monomer XI-T

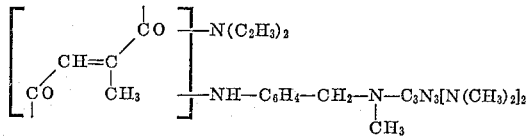

Triazine Monomer XII-T

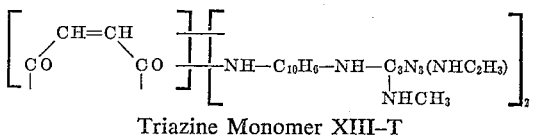

Triazine Monomer XIII-T

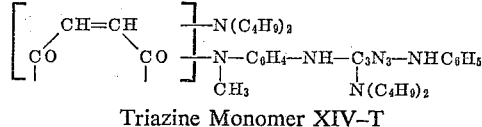

Triazine Monomer XIV-T

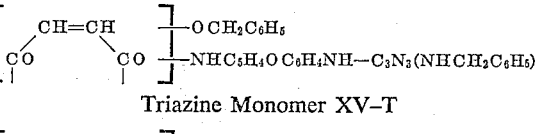

Triazine Monomer XV-T

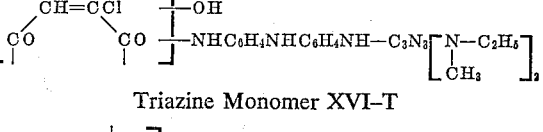

Triazine Monomer XVI-T

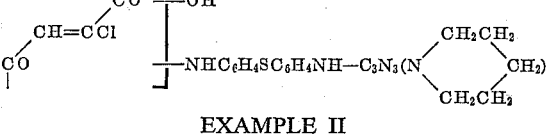

EXAMPLE II

*Homopolymerization of Triazine Monomer*

One hundred parts of the monomer prepared in Examples I-a to I-t are slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for six hours, at which time a yield of about 90 percent solid polymer is precipitated. The resulting polymer has a molecular weight over 10,000. Some of the polymer is dissolved in N,N-dimethyl acetamide and a film cast from the resultant solution. When this film is dyed according to the technique described in Example III hereof, the film shows a dense and deep shade of blue.

Other monomers of this invention are similarly polymerized.

The proportions of the triazine in the polymerization products of the invention may vary over a wide range, ranging from all or substantially all triazine down to very small amounts of triazine monomer such as may be employed in acrylonitrile polymers to impart dye susceptibility thereto. Although even smaller amounts are somewhat effective, the improvement in susceptibility of acrylonitrile copolymers to dyes becomes particularly noticeable when the triazine monomer content of the copolymer is about 0.1 percent and the susceptibility increases as the amount of triazine monomer is increased. Ordinarily sufficient improvement in dye susceptibility is obtained with amounts of the triazine monomer ranging up to about 10 or 15 percent but it may be advantageous for reasons such as in the preparation of ion-exchange polymers or as additives to improve dyeing properties to have a major proportion of triazine monomer in the acrylonitrile copolymer. In such cases, the concentration can range up to or approaching 100 percent. Within these proportions acrylonitrile copolymers of the invention show great affinity toward many dyes especially basic, acidic, vat and cellulose acetate dyes.

In addition to the improvements effected in the resulting copolymers, the use of the aforesaid triazinyl derivatives has certain other advantages over the use of the corresponding acids. For example, these triazinyl derivatives are more soluble in acrylonitrile than the acids. Thus, it is generally easier to get complete copolymerization of the triazine monomer with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetra-methylene sulfone, etc. N,N-dimethyl methyl urethane of the formula $(CH_3)_2NCOOCH_3$, ethylene carbamate, N-methyl-2-pyrrolidone, etc. may also be used as solvents either by themselves or with the secondary solvents mentioned above. Nitroalkanes, such as nitro-methane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength such as vinyl chloride, may often be dissolved in acetone or mixtures of acetone or acetone with water and solvents of the above types.

EXAMPLE III

Five polymers of acrylonitrile are prepared in each case from the following monomer compositions containing individually as the triazine monomer those identified above as Triazne Monomer III-A, III-B, III-C, III-D, III-E, III-F, III-G, III-H, III-I, III-J, III-K, III-L, III-M, III-N, III-O, III-P, III-Q, III-R, III-S, and III-T respectively.

| Polymer | Acrylonitrile, parts | Triazine monomer, parts |
| --- | --- | --- |
| A | 100 | 0.0 |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for 6 hours, at which time a yield of about 90 percent solid polymer is precipitated. The resulting polymers have molecular weights over 10,000. Each polymer is dissolved in N,N-dimethyl acetamide and a film cast from each solution.

A water solution of methylene blue dye (a basic dye) is prepared by making a paste of the dye and then diluting to a 1 percent by weight dye solution. This type solution is kept boiling for one hour while the aforementioned films are immersed therein for one hour. The dyed films are then removed and separately subjected to washing with boiling water for one hour the boiling water being changed frequently to remove the desorbed dye. The unmodified polyacrylonitrile film shows only a light tint, whereas the copolymers are a dense and deep shade. Identical films, cold-drawn and heat-treated, show dyeing characteristics similar to the undrawn films.

Fibers are spun from the same N,N-dimethyl acetamide solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers.

Instead of the specific triazine monomers used in this example, the various other related triazine monomers as disclosed above, can be used with similar results.

EXAMPLE IV

Five polymers of acrylonitrile are prepared in each case from the following monomer compositions using individually as the triazine monomer those identified above as Triazine Monomer IV-A, IV-B, IV-C, IV-D, IV-E, IV-F, IV-G, IV-H, IV-I, IV-J, IV-K, IV-L, IV-M, IV-N, IV-O, IV-P, IV-Q, IV-R, IV-S, and IV-T respectively.

| Polymer | Acrylonitrile, parts | Triazine monomer, parts |
| --- | --- | --- |
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three in a suitable reactor, is added 1 part sodium dodecyl benzene sulfonate, 1.0 part of ammonium persulfate, 0.5 part of sodium bisulfite, and 100 parts of monomer or monomer mixture.

The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer in each case is isolated by filtration.

The polymer is then washed with water and with methyl alcohol. A portion of the polymer is dissolved in ethylene carbonate and a film cast from the solution. The film is washed entirely free of solvent and stretched at a ratio of about 8:1 in a glycerine bath at 135–145° C. The film is then washed with water and dyed in a bath containing 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile has little or no color, all of the copolymers are dyed a deep blue shade.

Fibers are spun from the same solutions either by dry spinning or by wet spinning. The fibers are substantially free from solvent and dried. After cold-drawing the dried fibers 600–900 percent at 120–145° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethylsulfone, butyrolactone, formyl morpholine, etc.

Instead of the monomers of the preceding examples, the various other triazine monomers can be used as embraced by the formula given above, such as, for example, those identified above as Triazine Monomers X–XVI inclusive.

EXAMPLE V

Five parts of each of the copolymer fibers D of Examples III–A, III–B, III–C, III–D, III–E, III–F, III–G, III–H, III–I, III–J, III–K, III–L, III–M, III–N, III–O, III–P, III–Q, III–R, III–S, and III–T respectively, are dyed to a green shade using the vat color dimethoxy-dibenzanthrone at 70° C. in a bath containing 0.5 part of dye, 0.25 part sodium hydroxide, 0.5 part sodium hydrosulfite, and 100 parts of water (20:1 bath-fiber ratio). After the first 15 minutes of heating 0.25 part of Glauber's salt is added. The sample fibers are then oxidized in a 0.5 percent sodium dichromate-1.0 percent acetic acid aqueous solution at 70° C. for 30 minutes in a 20:1 bath-fiber ratio. The dyed fibers are scoured in a 0.5 percent boiling soap solution. A sample of yarn prepared from the unmodified polyacrylonitrile and dyed under the same conditions results in a light shade of color.

When 1,5-di-p-anisoylamino-4,8-dihydroxy-anthraquinone is used as the vat dye, the fiber is dyed a strong violet color.

EXAMPLE VI

The procedure of Example III is repeated in each case for the polymerization of the following monomer compositions using individually as the triazine monomer, those identified above as Triazine Monomers VI–A, VI–B, VI–C, VI–D, VI–E, VI–F, VI–G, VI–H, VI–I, VI–J, VI–K, VI–L, VI–M, VI–N, VI–O, VI–P, VI–Q, VI–R, VI–S, and VI–T respectively:

| Polymer | Acrylonitrile, Parts | Vinyl Chloride, Parts | Triazine Monomer, Parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$Me. |
| E | 57 | 40 | 3 | NO$_2$Me. |
| F | 37 | 60 | 3 | Acetone. |

Sometimes copolymers D and E, when dissolved in nitromethane (NO$_2$Me) may have gelled, partially dissolved particles known as fisheyes. In such cases, the solubility may be improved by the addition of small amounts of materials which are good solvents for acrylonitrile polymers, such as butyrolactone, dimethyl formamide, dimethyl acetamide, dimethylsulfone, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those in Example III.

Instead of this specific triazine monomer, other triazine monomers, such as identified above as Triazine Monomers X–A – XVI–T inclusive, can be used with similar results.

EXAMPLE VII

The procedure of Example III is repeated in each case for the polymerization of the following monomer compositions containing individually as the triazine monomers those identified above as Triazine Monomers VII–A, VII–B, VII–C, VII–D, VII–E, VII–F, VII–G, VII–H, VII–I, VII–J, VII–K, VII–L, VII–M, VII–N, VII–O, VII–P, VII–R, VII–S, and VII–T respectively:

| Polymer | Acrylonitrile, Parts | Styrene, Parts | Triazine Monomer, Parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example III. In place of styrene, various styrene derivatives may be used, such as alpha-methyl-styrene; nuclear substituted chloro-styrenes, i.e., ortho-, meta-, and para-chloro styrenes, dichloro-styrenes, for example, the 2,3-, 2,4-, 2,5-, 2,6-, 3,4-, and 3,5-dichloro-styrenes, trichloro-styrenes; cyanostyrenes, such as ortho-, meta-, and para-cyano-styrenes, dicyano-styrenes; nuclear-substituted alkyl-styrenes, such as mono- and dimethyl-styrenes, mono- and diethyl-styrenes, mono- and di-isopropyl styrenes; aryl-substituted styrenes, i.e., para-phenyl-styrene, etc., cycloaliphatic substituted styrenes, such as para-cyclohexyl-styrene; fluoro-styrenes, such as ortho-, meta-, para-fluoro-styrene, difluoro-styrenes, etc.; trifluoromethyl-styrenes, such as ortho-, meta-, and para-trifluoromethyl - styrenes, di - (trifluoromethyl) - styrenes, and various other styrenes or mixtures of any number of these with each other or with styrene.

Instead of this specific triazine monomer, various other triazine monomers, such as idendified above as Triazine Monomers X–A – XVI–T inclusive, can be used with similar results.

EXAMPLE VIII

The procedure of Example III is repeated in each case for the polymerization of the following monomer compositions containing individually as the triazine monomers those identified above as Triazine Monomers VIII–A, VIII–B, VIII–C, VIII–D, VIII–E, VIII–F, VIII–G, VIII–H, VIII–I, VIII–J, VIII–K, VIII–L, VIII–M, VIII–N, VIII–O, VIII–P, VIII–Q, VIII–R, VIII–S, and VIII–T respectively:

| Polymer | Acrylonitrile, Parts | Vinylidene Chloride, Parts | Triazine Monomer, Parts | Copolymer Soluble, in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and divinylidene chloride of at least 85 percent in the polymer molecules, only the more active solvents, such as butyrolactone, N,N-dimethyl acetamide, N,N-dimethyl formamide, etc., can be used as solvents. The above copolymers dye more readily and thoroughly than similar copolymers containing no triazine monomer groups.

In addition to copolymerization such as described above, it is also advantageous to polymerize the triazine monomers in the presence of preformed polymers and copolymers, for example polymers and copolymers of acrylonitrile. It is particularly advantageous, and excellent results are obtained, when one or more triazine monomers is added to a polymerization system in which acrylonitrile, for example, has just been homo- or copolymerized and in which the catalyst has not yet been deactivated and the polymer not yet separated therefrom, and polymerization is continued so as to polymerize or copolymerize the triazine monomers with the still-active polymer of acrylonitrile, etc. Good results are also obtained even when the prepolymer has been separated from the polymerization system and is resuspended in a polymerization system in which the triazine monomer subsequently is polymerized in its presence. The proportions and other conditions in both cases are similar to those used in various examples shown herein. For example, excellent results are obtained when Examples III, IV, VI, VII and VIII are repeated except that the triazine monomer is withheld and is added one hour before the end of the polymerization period. Excellent dyeing results in each case when tested according to Example V.

EXAMPLE IX

The procedure of Example III is repeated in each case for the polymerization of the following monomer compositions containing individually as the triazine monomers those identified above as Triazine Monomers IX–A, IX–B, IX–C, IX–D, IX–E, IX–F, IX–G, IX–H, IX–I, IX–J, IX–K, IX–L, IX–M, IX–N, IX–O, IX–P, IX–Q, IX–R, IX–S, and IX–T respectively:

| Polymer | Acrylonitrile, Parts | Vinylidene Chloride, Parts | Vinyl Chloride, Parts | Triazine Monomer, Parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example III.

Instead of this specific triazine monomer various other triazine monomers, such as identified above as Triazine Monomers X–A – XVI–T inclusive, can be used with similar results.

Instead of copolymerizing the above esters with the acrylonitrile, the esters may be polymerized independently as shown in Example II to produce homopolymers and the prepared polymer used to modify polyacrylonitrile or other acrylonitrile copolymers. The acrylonitrile polymers may be blended with up to 10 percent or more of the modifying polymers without serious loss in the physical or chemical properties of the resulting dyed structures, or may be added to acrylonitrile monomer and the mixture polymerized. The following example is illustrative.

EXAMPLE X

A 10 percent solution in dimethyl formamide is prepared from each of the polymers made in Example II and is added to an individual dimethyl formamide solution of polyacrylonitrile, containing 20 percent polymer so that a composition consisting of 90 parts of polyacrylonitrile and 10 parts of each of the above polymers is obtained. The solution is heated to 130° C. after which the solution is filtered. Films and fibers prepared from this mixture are dyed in accordance with the process of Example III and satisfactory dyed, shaped articles are obtained. The unmodified polyacrylonitrile without the addition of the homopolymer shows little or no dye retention.

Instead of using the homopolymers of this example, copolymers of the triazine monomers, including those with other monomers, such as polymers D and E of Example IV, may be used as modifiers for the homopolymers or copolymers of acrylonitrile. For example, each of the polymers E of Example IV, which consist of 80 parts of acrylonitrile and 20 parts of a triazine monomer, has excellent compatibility with polymers of acrylonitrile and has little or no detrimental effect on the physical properties of oriented fibers and films. In many cases, it is desirable to use as modifiers copolymers which have even a higher ratio of the triazine monomer, as for example, 50 to 70 parts of the triazine monomer copolymerized with acrylonitrile or methacrylonitrile. In other cases, the copolymers of the triazine monomer with other monomers are satisfactory, such as, for example, copolymers of styrene, vinyl chloride, vinylidene chloride, alpha-methylstyrene, vinylidene cyanide, etc.

When it is desired to modify an acrylonitrile copolymer, such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus, as there are present in the acrylonitrile copolymer structural units derived from the acrylonitrile and styrene, it is desirable to have present in the modifying copolymer structural units derived from styrene in addition to those derived from acrylonitrile and the triazine monomer. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the triazine monomers of the present invention have in the polymer molecule a plurality of repeating units of the formula given above and will contain additional repeating units of the formula

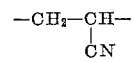

when the triazine monomer is copolymerized with acrylonitrile.

In addition, the copolymers may contain any number of repeating units of the type obtained by the copolymerization of the triazine monomer or a mixture of acrylonitrile and the triazine monomer with one or more copolymerizable ethylenic compounds, such as, for example, vinylidene chloride, vinyl chloride, styrene, alpha-methyl-styrene, methacrylonitrile, fumaro-nitrile, beta-cyanoacrylamide, and methyl beta-cyanoacrylate, etc.

As previously indicated, the solvent resistance of such copolymers as contain one or more monomer units in addition to those formed by the acrylonitrile and the triazine monomer is affected by the type and proportion of copolymerizing monomer or monomers used to replace part of the acrylonitrile. For example, copolymers containing small amounts of the triazine monomer units may contain various proportions of such monomer units as obtained from vinylidene chloride, methacrylonitrile, fumaro-nitrile, and beta-cyano-acrylamide without considerable reduction in solvent resistance. Replacement of acrylonitrile units in the copolymers by vinyl chloride, styrene and alpha-methylstyrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example the tensile strength of an acrylonitrile triazine monomer type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta - cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the esters used in the practice of this invention include one or more of the following:

acrylates, e.g., methyl acrylate; methacrylates, e.g., methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene cyanide, vinylidene fluoride, tetrafluoroethylene, trifluorochloroethylene; vinyl aryls, such as vinyl naphthalenes and substituted styrenes as listed in Example VII, etc.

The polymerization products of this invention may be prepared by various polymerization systems, such as emulsion, suspension, mass and solution polymerizations. In addition to the monomers, the polymerizable mass may also contain other materials such as catalysts, e.g., peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., azo-catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc. can be used as a precipitating bath for N,N-dimethyl acetamide dimethyl sulfone, butyrolactone and other solvent compositions of these copolymers. The extruded fibers, from which substantially all of the solvent has been removed in the spinning step, about 1–10 percent remaining in the shaped articles, can then be cold-drawn about 100–900 percent, preferably about 300–600 percent; and the drawn fiber heat-treated, usually at substantially constant length, at about 100–160° C. to effect further crystallization and the removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent triazine monomer in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the triazine monomer, the proportion of acrylonitrile in the copolymers can be much less than 85 percent without destroying the capacity for molecular orientation. Molecularly oriented, cold-drawn, shaped articles of particular usefulness are prepared from copolymer compositions containing the polymer molecules 69–99.9 percent acrylonitrile, 0.1–15 percent, advantageously 0.1–5 percent, triazine monomer, with or without one or more monomers of the class consisting of vinylidene chloride, vinylidene cyanide, vinyl chloride, styrene, alpha-methyl-styrene, methacrylonitrile, fumaronitrile, beta-cyanoacrylamide and methyl beta-cyanoacrylate, the effects of the presence of the monomers of this class being noticeable when the monomer is present in the polymer molecule in amounts of 1 percent or more.

For example, cold-drawn fibers of excellent properties are prepared from copolymers containing about 60–98.9 percent acrylonitrile, about 0.1–5 percent triazine monomer and about 1–39.9 percent or one or more compounds selected from the class consisting of vinyl chloride, vinylidene chloride, styrene, alpha-methyl-styrene, methacrylonitrile, fumaronitrile, beta-cyano-acrylamide and methyl beta-cyano-acrylate.

The copolymerization products of this invention show great affinity for the acetate, basic, acidic, and vat dyes. The cellulose acetate dyes which are effective with these polymerization products are mainly amino-anthra-quinone derivatives. The basic dyestuffs toward which these polymerization products show great affinity are preferably those which contain amide, alkyl-amide, or ammonium groups, such as —NH$_2$—N(CH$_3$)$_2$, —N(C$_2$H$_5$)$_2$,

—NHC$_6$H$_5$

—N(CH$_3$)$_3$OH, etc. and which may also be used in the form of their salts, i.e., the hydrochlorides, sulfates or oxalates. Some of these basic dyes are Methylene Blue, Rhodamine B, Indamine Blue, Auramine, Meldola's Blue, Chrysoidine Y, Acridine Yellow Magenta, Crystal Violet, Thioflavine T, Saffranine and Bismark Brown. The cellulose acetate dyes which are effective with these polymerization products are mainly amino-anthraquinone derivatives basic azo compounds and other basic substances, such as the Duranol, Dispersol, Sericol, etc, dyestuffs.

The basic dyes listed above by their common names, namely Methylene Blue, etc., are identified in the literature. Lubs monograph on "The Chemistry of Synthetic Dyes and Pigments," published by Reinhold Publishing Company in 1955, shows the formula for Methylene Blue on page 266, for Rhodamine B, on page 296, Auramine on page 245, Acridine Yellow on page 232, Crystal Violet on page 229, Saffranine on page 238, and Bismark Brown on page 114. Whitmore's "Organic Chemistry," published in 1937 by D. Van Nostrand Co. shows the formula for Meldola's Blue on page 920, and for Magenta on page 847. The third edition of "An Outline of Organic Chemistry," by Degering et al., published in 1939 by Barnes and Noble, Inc. shows the formula for Indamine Blue on page 252. The Rawson and Laycock "Dictionary of Dyes, Mordants, etc.," published in 1901 by Charles Griffin and Company Ltd. (London), shows Chrysoidine Y on page 90. The "Condensed Chemical Dictionary," published by Reinhold Publishing Corp. in 1956, shows Thioflavine T on page 1088.

A number of other acidic dyes that can be used are anthranilic acid→1-(4' sulfophenyl), 3-methyl-5-pyrazolone 1,5 - diamino - 4,8 - dihydroxyanthraquinone - 3-sulfonic acid; 1-aminonaphthalene-4-sulfonic acid→alpha-naphthol-4-sulfonic acid; the sodium salt of sulfanilic acid→aniline→2 - benzoyl - amino - 5 - naphthol - 7 - sulfonic acid; the sodium salt of 4,4'-diaminostilbene, 2,2'-disulfonic acid ⇄ (phenol)₂ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-aminobenzoic acid→o-anisidine) phosgenated; the sodium salt of 2-napthol-6,8-disulfonic acid←benzidine→phenol; ethylated dimethoxy-dibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in order of 4 to 6 grams per denier. Moreover, these properties make the fibers desirable in the manufacture of hosiery and for such all-purpose fabrics as used for blouses, shirts, suits, etc.

The following triazine intermediates can be used in the preparation of the above triazine monomers, the various symbols representing groups as defined above:

(1) HO—A—NR″—$C_3N_3(NR'_2)_2$
(2) HO—A—O—$C_3N_3(NR'_2)_2$
(3) R'HN—A—NR″—$C_3N_3(NR'_2)_2$
(4) R'HN—A—O—$C_3N_3(NR'_2)_2$

In general these are prepared by the reaction of the appropriate glycol, diamine compound, hydroxy amine compound, hydroxy nitro or cyano compound (with subsequent reduction), etc., with the appropriate diamino-chloro-triazine, or with trichloro-triazine to replace only one chlorine and subsequently replacing the remaining two chlorine atoms with the desired amino groups on the triazine nucleus.

Obviously, the proportions and conditions of reaction will be used to favor the type of derivatives desired. For example, in preparing compounds of the second and third formulas given above, an excess over the stoichiometric amount of the appropriate glycol or diamino compound generally will be used to repress di-substitution on the glycol or diamine. Then the excess glycol or diamine can be separated by crystallization, extraction, distillation, or other appropriate means depending on the particular compounds being used.

Moreover, in preparing compounds of the first and fourth of the above formulas, the reagents and conditions will be selected to favor the attachment of the appropriate group to the triazine nucleus, or reagents will be selected which favor the particular type of attachment desired. For example, the preparation of compounds of the first of the above formulas is favored by the direct reaction of an amino hydroxy compound with a chloro-diamino triazine in the presence of alkali. When it is desired to have the attachment take place through the oxygen of the hydroxy group to give intermediates of the fourth of the above formulas, conditions favoring that reaction can be used, such as using a nitro alkanol compound and subsequently reducing the nitro group. In certain cases, such as illustrated in the preparations of Examples I-d and I-n, it may be desirable to avoid the preparation of intermediates of the fourth formula above by taking advantage of the greater reactivity of the amino group of the appropriate amino-hydroxy compound and to react it first with the unsaturated acid, such as acrylic, cyanoacrylic, maleic, itaconic, etc., to give the appropriate amided having an unreacted hydroxy group which can be reacted with the appropriate triazine compound, e.g., chloro-diamino-triazine, etc.

The positions to be occupied by the $NR'_2$ groups can be thus occupied when the triazine monomers are being prepared. The two $NR'_2$ groups on the triazine ring are not very reactive even when R' is hydrogen and do not interfere with the various prepartions since they act more like amide groups than amino groups.

In some cases it may be desirable to have these two positions occupied by chlorine during the reaction which effects the attachment of —A—NR— to the triazine. Eventually, reaction can be conducted with the chloro compound in the presence of a low molecular weight amine, such as tributyl amine, to absorb the hydrogen chloride split off by the reaction. The two remaining chlorine groups on the triazine nucleus can be replaced subsequently by the desired $NR'_2$ groups.

These preparations are illustrated by the following examples in which parts and percentages, unless otherwise indicated, are parts by weight and percentages by weight.

The Cl—$C_3N_3(NR'_2)_2$ compounds are readily producible in excellent yields from cyanuric chloride by displacing two chlorine atoms by appropriate amino groups by the method shown by Thurston et al., Journal of the American Chemical Society, 73, 2981 (1951). These diamino monochloro triazines are readily convertible in good yield to the hydroxy-hydrocarbon-amino derivatives, etc., by reacting them with a hydroxy-amino-hydrocarbon, such as an alkanol amine, etc., according to the method of Kaiser et al., Journal of the American Chemical Society, 73, 2984 (1951). The method shown by Banks et al., Journal of the American Chemical Society, 66, 1771 (1944), for the preparation of 2-chloro-4,6-di-(beta-hydroxyethylamino)-1,3,5-triazine and 2-chloro-4,6-di-(beta-hydroxy-n-propylamino)-1,3,5-triazine can be used to give the monohydroxy-alkyl-amino derivatives, as well as the corresponding aromatic compounds, by keeping the temperature at 5° C.

These preparations are illustrated by the following examples in which parts and percentages, unless otherwise indicated, are parts by weight and percentages by weight.

*Intermediate Preparation 1*

To a rapidly stirred slurry of 29 parts of 2,4-diamino-6-chloro-1,3,5-triazine in 400 parts of water and a few drops of phenolphthalein indicator solution there is added 12.2 parts of ethanol amine, followed by the addition of 16.9 parts of sodium carbonate. The mixture is heated to reflux with the evolution of $CO_2$ beginning at 90° C., and held at reflux for two hours. The hot solution is filtered, then cooled to below room temperature by an ice water bath. The solid product is removed by filtration and dried. A yield of 20–21 parts is obtained. Upon concentration of the filtrate by evaporation, an additional 8–9 parts of product is obtained. The melting point upon recrystallization from water is found to be 230–233° C. The ultimate analysis is found to be 35.63 percent carbon, 5.52 percent hydrogen, and 49.87 percent nitrogen. These values are found to agree closely with the theoretical values for 2,4-diamino-6-(beta-hydroxyethylamino)1,3,5-triazine, which are 35.3, 5.8, and 49.4 percent respectively.

In another procedure 185 parts of cyanuric chloride in 90 parts of dimethyl amine are added to a solution of 80 parts of sodium hydroxide in 400 parts of water and stirred rapidly while maintaining the temperature at 40–50° C. for approximately an hour to give 2,4-bis(dimethylamino)-6-chloro-1,3,5-triazine. Then a solution of 40 parts of sodium hydroxide in 100 parts of water is added and also 61 parts of ethanol amine are added gradually, after which the reaction mixture is refluxed at 80–100° C. for two hours. The hot solution is filtered, cooled, and processed according to the procedure of the preceding paragraph to obtain a good yield of 2,4-bis-(dimethylamino) - 6 - (beta - hydroxy - ethylamino) - 1,3,5-triazine.

When the foregoing procedures are repeated using other monochloro-triazines having the various other $NR'_2$ groups described above, such as monomethylamino, diethylamino, benzylamino, phenylamino, cyclohexylamino, etc., and using various other alkanol amines as well as aromatic hydroxy amino compounds as described herein, the corresponding triazine derivatives having the formula HO—A—NR″—C$_3$N$_3$(NR′$_2$)$_2$ are prepared which can be used as intermediates in the preparation of the various compounds of this invention. Illustrative of these intermediates prepared by the foregoing procedures are the triazine hydroxy compounds listed above after Example I–a in the paragraph preceding Triazine Monomer III–A.

*Intermediate Preparation 2*

2,4 - bis - (dimethylamino) - 6 - chloro - 1,3,5 - triazine (202 parts), prepared as above, and 124 parts of ethylene glycol are added to a solution of 40 parts of sodium hydroxide in 400 parts of water. The mixture is heated to reflux for two hours, after which the hot solution is filtered, then cooled to below room temperature, and the solid precipitate recovered as above in Intermediate Preparation 1. A good yield of 2,4-bis-(dimethylamine)-6-(beta-hydroxy-ethoxy)-1,3,5-triazine is recovered and identified by ultimate analyses. Other dihydroxy compounds having A groups as defined herein, when substituted for the ethylene glycol, give corresponding intermediates that can be used in preparing the monomers of this invention and when triazine derivatives are used having other amino groups substituted in place of the dimethylamino groups of the monochloro-bis-dimethylamino-1,3,5-triazine compound used above, the corresponding derivatives are prepared which can also be used in preparing the monomers of this invention. Illustrative of the intermediates prepared by the foregoing procedure and having the formula HO—A—O—C$_3$N$_3$(NR′$_2$)$_2$ are those listed after Example I–c in the paragraph preceding Triazine Monomer III–C.

*Intermediate Preparation 3*

(a) The 2,4-bis-(dimethylamino)-6-chloro-1,3,5-triazine (202 parts) prepared as above, and 102 parts of the monoacetamide of ethylene diamine are added to a solution of 80 parts of sodium hydroxide and 400 parts of water and the temperature maintained at 80° C. for two hours. Then the temperature is raised to reflux for three hours to effect saponification of the acetamide by the excess sodium hydroxide. The 2,4-bis(dimethylamino)-6-(beta-amino ethylamino)-1,3,5-triazine product is recovered in good yield when processed as in the preceding procedure.

(b) If desired the acrylic or various other unsaturated acid derivatives of this invention can be prepared directly from the acetamide compound prepared in the preceding paragraph by omitting the saponification step and performing an interchange of the acetic acid and acrylic acid groups according to standard procedures.

(c) 202 parts of 2,4-bis-(dimethylamino)-6-chloro-1,3,5-triazine and 56 parts of amino-acetonitrile are added to a solution of 40 parts of sodium hydroxide in 400 parts of water and maintained at 80° C. for two hours. The 2,4 - bis - (dimethyl amino) - 6 - (cyano - methylamino)-1,3,5-triazine is recovered in good yield and is recrystallized from water-acetone solution. The product is dried and then reacted in ether solution with 132 parts of lithium aluminum hydride at 50° C. for three hours. The ether solution is then cooled and filtered. After removal of the solvent by evaporation, the 2,4-bis-(dimethylamino)-6-(beta-amino ethylamino)-1,3,5-triazine is recovered in good yield and is recrystallized from water solution as above.

By substituting various other starting compounds having different NR′$_2$ groups and different A groups as defined herein, the above procedures are also used satisfactorily for preparing the other intermediate amino compounds of the formula R″HN—A—NR″—C$_3$N$_3$(NR′$_2$)$_2$ used in making various compounds of this invention.

Typical of the intermediates prepared by the above procedure and those listed after Examples I–b and I–e in the paragraph preceding Triazine Monomer III–B and Triazine Monomer III–E.

*Intermediate Preparation 4*

2,4 - bis - (dimethylamino) - 6 - chloro - 1,3,5 - triazine (202 parts) in 91 parts of beta-nitro-ethanol are added to a solution of 40 parts of sodium hydroxide in 400 parts of water and refluxed for two hours. The hot solution is then filtered and cooled to below room temperature and recovered as above in Intermediate Preparation 1. The recovered 2,4-bis-(dimethylamino)-6-(beta-nitro-ethoxy)-1,3,5-triazine is then reacted in 200 parts of ether with 132 parts of lithium aluminum hydride at 50° C. for two hours. The solution is then cooled to room temperature, filtered, and the ether removed by evaporation. The resultant 2,4-bis-(dimethylamino)-6-(beta-amino-ethoxy)-1,3,5-triazine is obtained in good yield and after recrystallization from water-acetone as above is identified by ultimate analyses.

By substituting other hydroxy nitro compounds, in which the A group is as defined above, for the beta-nitro ethanol and also substituting other amino groups for the dimethylamino groups of the starting monochlorotriazine starting compound, other intermediates of the formula R″HN—A—O—C$_3$N$_3$(NR′$_2$)$_2$, of which typical examples are listed above after Example I–d (in the paragraph preceding Triazine Monomer III–D), can be prepared for use as starting materials in the preparation of monomers of this invention.

As pointed out above, it may be desirable in some cases to start with intermediate compounds which have the unsaturated acid group reacted first with the more reactive amino group of an amino hydroxy compound and thereafter react the free hydroxy group of such intermediate with a monochloro-triazine compound such as used above to attach the intermediate unsaturated amide by displacing it and connecting it to the oxygen of the aforesaid hydroxy group. Such intermediate amides are prepared very easily by using the corresponding unsaturated acid chloride, such as acrylyl chloride, or anhydride, such as maleic anhydride, itaconic anhydride, etc., with the appropriate amino hydroxy compound, such as ethanol amine, isopropanol amine, etc. Typical intermediates of this type are listed above after Example I–d.

Preparation of various monochloro-triazine compounds Cl—C$_3$N$_3$(NR′$_2$)$_2$ having the various NR′$_2$ groups as described above is effected by following the procedure shown in the cited Thurston et al. reference, using the appropriate amines to give the desired amino groups substituted on the 2,4 positions of the triazine ring.

This application is a continuation in part of applicant's copending applications, Serial Nos. 732,151, 732,152, 732,153, 732,154, 732,156, 732,159, 732,160, 732,161, 732,162, 732,164, 732,167 732,168, 732,169, 732,170, 732,172, 732,175, 732,176, 732,177, 732,178, and 732,180, all filed on May 1, 1958, all now abandoned.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. As a new composition of matter, a compound having the formula

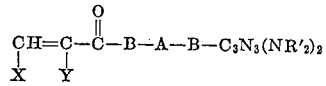

wherein B is selected from the class consisting of oxygen and —N(R″)—; A is a divalent hydrocarbon radical selected from the class consisting of aliphatic, cycloaliphatic and aromatic hydrocarbons, free of acetylenic unsaturation, having up to 20 carbon atoms therein and having at least two carbon atoms between said valencies and derivatives thereof having only one substituent group thereon, said substituent group being selected from the class consisting of chloro, fluoro, alkoxy, aryloxy, and acyloxy groups, said alkoxy, aryloxy and acyloxy groups having up to 10 carbon atoms therein, and with the proviso that where the B to which the $$\overset{O}{\underset{\|}{-C-}}$$

group is attached in the above formula is oxygen, that part of A to which B is attached is aliphatic; X is selected from the class consisting of hydrogen, cyano, —C(O)OR, —C(O)NR'$_2$, and —C(O)—B—A—B—C$_3$N$_3$(NR'$_2$)$_2$ groups; Y is selected from the class consisting of hydrogen, alkyl groups of no more than 6 carbon atoms, and when X is hydrogen, Y is also selected from the class consisting of chloro, fluoro, bromo, iodo, —CH$_2$C(O)OR, —CH$_2$C(O)NR'$_2$ and —C(O)—B—A—B—C$_3$N$_3$(NR'$_2$)$_2$ groups; C$_3$N$_3$ is the trivalent symmetrical triazine nucleus; R is selected from the class consisting of hydrogen and monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to to 10 carbon atoms therein; R' is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein, and portions of heterocyclic rings in which two R's together with the N to which they are attached represent a heterocyclic group selected from the class consisting of piperidinyl, piperazinyl, and morpholino groups; R" is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein.

2. 2,4-bis - (dimethylamino) - 6 - (beta-acryloxyethylamino)-1,3,5-triazine.

3. 2,4 - bis - (dimethylamino)-6-(beta-acrylamidoethylamino)-1,3,5-triazine.

4. 2,4, - bis(dimethylamino) - 6-(beta-acryloxyethoxy)-1,3,5-triazine.

5. 2,4-bis(dimethylamino)-6-(beta-acrylamidoethoxy)-1,3,5-triazine.

6. 2,4 - bis-(dimethylamino)-6-(acrylamidohexamethyleneamino)-1,3,5-triazine.

7. 2,4 - bis-(dimethylamino)-6-(beta-monoitaconoxyethylamino)-1,3,5-triazine.

8. 2,4 -bis-(dimethylamino)-6-(beta-monoitaconamidoethylamino)-1,3,5-triazine.

9. 2,4 - bis-(dimethylamino)-6-(beta-monoitaconoxyethoxy)-1,3,5-triazine.

10. 2,4 - bis(dimethylamino) - 6-)beta-monitaconamidoethoxy)-1,3,5-triazine.

11. 2,4 - bis-(dimethylamino)-6-[beta-(betacyanoacryloxy)-ethylamino]-1,3,5-triazine.

12. 2,4 - bis-(dimethylamino)-6-[beta-(betacyanoacrylamido)-ethylamino]-1,3,5-triazine.

13. 2,4 - bis-(dimethylamino)-6-(beta-monomaleoxyethoxy)-1,3,5-triazine.

14. 2,4 - bis-(dimethylamino) - 6-(beta-monomaleamidoethoxy)-1,3,5-triazine.

15. 2,4 - bis - (dimethylamino)-6-(beta-monomaleamidoethylamino)-1,3,5-triazine.

16. A cold drawn fiber having molecular orientation, said fiber comprising a copolymer consisting essentially of about 60–98.9 percent by weight acrylonitrile, about 0.1 to 5 percent by weight of a compound of claim 1, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

17. A polymerization product having in the polymer molecule a plurality of repeating units having the formula $$\underset{X \quad OC-B-A-B-C_3N_3(NR'_2)_2}{-CH-\overset{Y}{\underset{|}{C}}-}$$

wherein B is selected from the class consisting of oxygen and —N(R")—; A is a divalent hydrocarbon radical selected from the class consisting of aliphatic, cycloaliphatic and aromatic hydrocarbons, free of acetylenic unsaturation, having up to 20 carbon atoms therein and having at least two carbon atoms between said valencies and derivatives thereof having only one substituent group thereon, said substituent group being selected from the class consisting of chloro, fluoro, alkoxy, aryloxy, and acyloxy groups, said alkoxy, aryloxy and acyloxy groups having up to 10 carbon atoms therein, and with the proviso that where the B to which the $$\overset{O}{\underset{|}{-C-}}$$

group is attached in the above formula is oxygen, that part of A to which B is attached is aliphatic; X is selected from the class consisting of hydrogen, cyano, —C(O)OR, —C(O)NR'$_2$ and —C(O)—B—A—B—C$_3$N$_3$(NR'$_2$)$_2$ groups; Y is selected from the class consisting of hydrogen, alkyl groups of no more than 6 carbon atoms, and when X is hydrogen, Y is also selected from the class consisting of chloro, fluoro, bromo, iodo, —CH$_2$C(O)OR, —CH$_2$C(O)NR'$_2$, and —C(O)—B—A—B—C$_3$N$_3$(NR'$_2$)$_2$ groups; C$_3$N$_3$ is the trivalent symmetrical triazine nucleus; R is selected from the class consisting of hydrogen and monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein R' is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein, and portions of heterocyclic rings in which two R's together with the N to which they are attached represent a heterocyclic group selected from the class consisting of piperidinyl, piperazinyl, and morpholino groups; R" is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein.

18. A polymerization product of claim 17, also having in the polymer molecule a plurality of repeating units having the formula

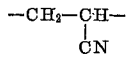

said

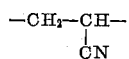

repeating units representing at least 50 percent by weight of said polymer molecule.

References Cited in the file of this patent

UNITED STATES PATENTS

| | | |
|---|---|---|
| 2,694,687 | De Benneville et al. | Nov. 16, 1954 |
| 2,899,406 | De Benneville et al. | Aug. 11, 1959 |
| 2,934,525 | Fekete | Apr. 26, 1960 |
| 2,993,877 | D'Alelio | July 25, 1961 |
| 3,047,532 | D'Alelio | July 31, 1962 |